(12) United States Patent
Commons

(10) Patent No.: US 12,124,954 B1
(45) Date of Patent: Oct. 22, 2024

(54) INTELLIGENT CONTROL WITH HIERARCHICAL STACKED NEURAL NETWORKS

(71) Applicant: Michael Lamport Commons, Cambridge, MA (US)

(72) Inventor: Michael Lamport Commons, Cambridge, MA (US)

( * ) Notice: Subject to any disclaimer, the term of this patent is extended or adjusted under 35 U.S.C. 154(b) by 47 days.

(21) Appl. No.: 18/070,442

(22) Filed: Nov. 28, 2022

Related U.S. Application Data

(63) Continuation of application No. 15/875,789, filed on Jan. 19, 2018, now Pat. No. 11,514,305, which is a continuation of application No. 14/691,439, filed on Apr. 20, 2015, now Pat. No. 9,875,440, which is a
(Continued)

(51) Int. Cl.
| | |
|---|---|
| G06N 3/08 | (2023.01) |
| B60W 30/00 | (2006.01) |
| G01C 21/36 | (2006.01) |
| G06N 3/04 | (2023.01) |
| G06N 3/045 | (2023.01) |
| F02D 41/14 | (2006.01) |
| F03D 7/04 | (2006.01) |
| G06N 3/00 | (2023.01) |
| G06N 3/02 | (2006.01) |
| G06N 7/04 | (2006.01) |

(52) U.S. Cl.
CPC .............. *G06N 3/08* (2013.01); *B60W 30/00* (2013.01); *G01C 21/3602* (2013.01); *G06N 3/04* (2013.01); *G06N 3/045* (2023.01); *F02D 41/1405* (2013.01); *F03D 7/046* (2013.01); *G05B 2219/25255* (2013.01); *G05B 2219/41054* (2013.01); *G06N 3/00* (2013.01); *G06N 3/02* (2013.01); *G06N 7/046* (2013.01); *Y10S 128/925* (2013.01)

(58) Field of Classification Search
CPC ............................... G06N 7/046; B60W 30/00
See application file for complete search history.

(56) References Cited

U.S. PATENT DOCUMENTS

| | | | |
|---|---|---|---|
| 4,468,617 A | 8/1984 | Ringwall | |
| 4,763,276 A | 8/1988 | Perreirra et al. | |
| 4,852,018 A | 7/1989 | Grossberg et al. | |

(Continued)

OTHER PUBLICATIONS

Kosmatopoulos "Control of Unknown Nonlinear Systems With Efficient Transient Performance Using Concurrent Exploitation and Exploration", IEEE TNN, 2010, pp. 1245-1261.*
(Continued)

*Primary Examiner* — Li Wu Chang
(74) *Attorney, Agent, or Firm* — Hoffberg & Associates; Steven M. Hoffberg

(57) ABSTRACT

A method of processing information is provided. The method involves receiving a message; processing the message with a trained artificial neural network based processor, having at least one set of outputs which represent information in a non-arbitrary organization of actions based on an architecture of the artificial neural network based processor and the training; representing as a noise vector at least one data pattern in the message which is incompletely represented in the non-arbitrary organization of actions; and analyzing the noise vector distinctly from the trained artificial neural network.

20 Claims, 8 Drawing Sheets

Related U.S. Application Data continuation of application No. 13/281,347, filed on Oct. 25, 2011, now Pat. No. 9,015,093.

(60) Provisional application No. 61/406,781, filed on Oct. 26, 2010.

(56) References Cited

U.S. PATENT DOCUMENTS

| | | |
|---|---|---|
| 4,914,708 A | 4/1990 | Carpenter et al. |
| 5,040,214 A | 8/1991 | Grossberg et al. |
| 5,040,215 A | 8/1991 | Amano et al. |
| 5,056,897 A | 10/1991 | Akiyama et al. |
| 5,058,184 A | 10/1991 | Fukushima |
| 5,063,603 A | 11/1991 | Burt |
| 5,086,479 A | 2/1992 | Takenaga et al. |
| 5,092,343 A | 3/1992 | Spitzer et al. |
| 5,129,038 A | 7/1992 | Kohda et al. |
| 5,129,039 A | 7/1992 | Hiraiwa |
| 5,133,021 A | 7/1992 | Carpenter et al. |
| 5,140,530 A | 8/1992 | Guha et al. |
| 5,148,514 A | 9/1992 | Arima et al. |
| 5,166,938 A | 11/1992 | Chung |
| 5,167,006 A | 11/1992 | Furuta et al. |
| 5,177,746 A | 1/1993 | Chung |
| 5,179,624 A | 1/1993 | Amano et al. |
| 5,185,816 A | 2/1993 | Takatori et al. |
| 5,214,743 A | 5/1993 | Asai et al. |
| 5,218,646 A | 6/1993 | Sirat et al. |
| 5,220,373 A | 6/1993 | Kanaya |
| 5,235,439 A | 8/1993 | Stoll |
| 5,245,672 A | 9/1993 | Wilson et al. |
| 5,259,039 A | 11/1993 | Akamatsu |
| 5,259,064 A | 11/1993 | Furuta et al. |
| 5,272,723 A | 12/1993 | Kimoto et al. |
| 5,283,855 A | 2/1994 | Motomura et al. |
| 5,293,453 A | 3/1994 | Frazier |
| 5,293,457 A | 3/1994 | Arima et al. |
| 5,295,227 A | 3/1994 | Yokono |
| 5,327,522 A | 7/1994 | Furuta et al. |
| 5,333,125 A | 7/1994 | Yamamoto |
| 5,333,241 A | 7/1994 | Furuta et al. |
| 5,345,539 A | 9/1994 | Webb |
| 5,349,646 A | 9/1994 | Furuta et al. |
| 5,355,435 A | 10/1994 | DeYong et al. |
| 5,381,513 A | 1/1995 | Tsuboka |
| 5,383,042 A | 1/1995 | Robinson |
| 5,388,186 A | 2/1995 | Bose |
| 5,390,284 A | 2/1995 | Ogata et al. |
| 5,408,586 A | 4/1995 | Skeirik |
| 5,408,588 A | 4/1995 | Ulug |
| 5,420,964 A | 5/1995 | Sugasaka et al. |
| 5,428,711 A | 6/1995 | Akiyama et al. |
| 5,432,883 A | 7/1995 | Yoshihara |
| 5,434,883 A | 7/1995 | Kimoto et al. |
| 5,444,819 A | 8/1995 | Negishi |
| 5,448,476 A | 9/1995 | Kurokawa et al. |
| 5,465,320 A | 11/1995 | Enbutsu et al. |
| 5,467,428 A | 11/1995 | Ulug |
| 5,481,621 A | 1/1996 | Kuratomi et al. |
| 5,481,644 A | 1/1996 | Inazumi |
| 5,485,545 A | 1/1996 | Kojima et al. |
| 5,485,548 A | 1/1996 | Oteki et al. |
| 5,504,838 A | 4/1996 | Furuta et al. |
| 5,506,998 A | 4/1996 | Kato et al. |
| 5,517,598 A | 5/1996 | Sirat |
| 5,519,805 A | 5/1996 | King |
| 5,524,086 A | 6/1996 | Kiyuna et al. |
| 5,524,178 A | 6/1996 | Yokono |
| 5,526,465 A | 6/1996 | Carey et al. |
| 5,530,953 A | 6/1996 | Nagazumi |
| 5,532,938 A | 7/1996 | Kondo et al. |
| 5,533,565 A | 7/1996 | Kodaira et al. |
| 5,544,050 A | 8/1996 | Abe et al. |
| 5,544,336 A | 8/1996 | Kato et al. |
| 5,548,512 A | 8/1996 | Quraishi |
| 5,548,684 A | 8/1996 | Wang et al. |
| 5,566,102 A | 10/1996 | Kubo |
| 5,566,270 A | 10/1996 | Albesano et al. |
| 5,576,632 A | 11/1996 | Petsche et al. |
| 5,579,440 A | 11/1996 | Brown |
| 5,581,662 A | 12/1996 | Furuta et al. |
| 5,583,860 A | 12/1996 | Iwakawa et al. |
| 5,588,090 A | 12/1996 | Furuta et al. |
| 5,600,843 A | 2/1997 | Kato et al. |
| 5,602,761 A | 2/1997 | Spoerre et al. |
| 5,604,529 A | 2/1997 | Kuga et al. |
| 5,604,840 A | 2/1997 | Asai et al. |
| 5,611,753 A | 3/1997 | Kondo et al. |
| 5,613,042 A | 3/1997 | Chung et al. |
| 5,617,484 A | 4/1997 | Wada et al. |
| 5,618,243 A | 4/1997 | Kondo et al. |
| 5,619,617 A | 4/1997 | Furuta et al. |
| 5,619,619 A | 4/1997 | Shinohara et al. |
| 5,627,944 A | 5/1997 | Fujimoto et al. |
| 5,630,023 A | 5/1997 | Oteki |
| 5,632,006 A | 5/1997 | Peterson et al. |
| 5,634,067 A | 5/1997 | Nagazumi |
| 5,636,292 A | 6/1997 | Rhoads |
| 5,638,359 A | 6/1997 | Peltola et al. |
| 5,642,434 A | 6/1997 | Nakao et al. |
| 5,649,066 A | 7/1997 | Lacher et al. |
| 5,655,995 A | 8/1997 | Kondo et al. |
| 5,657,737 A | 8/1997 | Ishida et al. |
| 5,659,764 A | 8/1997 | Sakiyama et al. |
| 5,671,327 A | 9/1997 | Akamine et al. |
| 5,671,336 A | 9/1997 | Yoshida et al. |
| 5,673,367 A | 9/1997 | Buckley |
| 5,694,389 A | 12/1997 | Seki et al. |
| 5,696,882 A | 12/1997 | Herault |
| 5,701,397 A | 12/1997 | Steimle et al. |
| 5,708,727 A | 1/1998 | Tanaka et al. |
| 5,710,834 A | 1/1998 | Rhoads |
| 5,719,480 A | 2/1998 | Bock et al. |
| 5,721,807 A | 2/1998 | Tschirk |
| 5,732,113 A | 3/1998 | Schmidl et al. |
| 5,732,288 A | 3/1998 | Muramatsu |
| 5,739,811 A | 4/1998 | Rosenberg et al. |
| 5,748,763 A | 5/1998 | Rhoads |
| 5,748,783 A | 5/1998 | Rhoads |
| 5,748,848 A | 5/1998 | Tresp |
| 5,754,709 A | 5/1998 | Moriya et al. |
| 5,761,384 A | 6/1998 | Inoue et al. |
| 5,764,853 A | 6/1998 | Watari et al. |
| 5,764,856 A | 6/1998 | Jaenecke |
| 5,764,860 A | 6/1998 | Yatsuzuka |
| 5,778,279 A | 7/1998 | Kawai et al. |
| 5,787,393 A | 7/1998 | Inazumi |
| 5,790,757 A | 8/1998 | Meijer |
| 5,793,932 A | 8/1998 | Kuratomi et al. |
| 5,794,204 A | 8/1998 | Miyazawa et al. |
| 5,794,623 A | 8/1998 | Forbes |
| 5,809,461 A | 9/1998 | Inazumi |
| 5,822,077 A | 10/1998 | Sasaki et al. |
| 5,822,436 A | 10/1998 | Rhoads |
| 5,826,248 A | 10/1998 | de Garis et al. |
| 5,832,119 A | 11/1998 | Rhoads |
| 5,832,183 A | 11/1998 | Shinohara et al. |
| 5,839,103 A | 11/1998 | Mammone et al. |
| 5,841,959 A | 11/1998 | Guiremand |
| 5,841,978 A | 11/1998 | Rhoads |
| 5,842,168 A | 11/1998 | Miyazawa et al. |
| 5,845,048 A | 12/1998 | Masumoto |
| 5,848,197 A | 12/1998 | Ebihara |
| 5,850,481 A | 12/1998 | Rhoads |
| 5,852,816 A | 12/1998 | Thaler |
| 5,862,260 A | 1/1999 | Rhoads |
| 5,867,164 A | 2/1999 | Bornstein et al. |
| 5,867,593 A | 2/1999 | Fukuda et al. |
| 5,872,864 A | 2/1999 | Imade et al. |
| 5,875,108 A | 2/1999 | Hoffberg et al. |
| 5,875,284 A | 2/1999 | Watanabe et al. |
| 5,899,972 A | 5/1999 | Miyazawa et al. |
| 5,909,676 A | 6/1999 | Kano |
| 5,917,891 A | 6/1999 | Will |

(56) References Cited

U.S. PATENT DOCUMENTS

| | | |
|---|---|---|
| 5,920,839 A | 7/1999 | Iso |
| 5,940,824 A | 8/1999 | Takahashi |
| 5,943,662 A | 8/1999 | Baba et al. |
| 5,946,658 A | 8/1999 | Miyazawa et al. |
| 5,953,693 A | 9/1999 | Sakiyama et al. |
| 5,956,702 A | 9/1999 | Matsuoka et al. |
| 5,960,391 A | 9/1999 | Tateishi et al. |
| 5,963,663 A | 10/1999 | Tani |
| 5,978,107 A | 11/1999 | Murai et al. |
| 5,978,820 A | 11/1999 | Mase et al. |
| 5,983,186 A | 11/1999 | Miyazawa et al. |
| 5,991,720 A | 11/1999 | Galler et al. |
| 5,995,952 A | 11/1999 | Kato |
| 5,999,922 A | 12/1999 | Tanaka et al. |
| 6,000,827 A | 12/1999 | Hosogi et al. |
| 6,004,015 A | 12/1999 | Watanabe et al. |
| 6,009,418 A | 12/1999 | Cooper |
| 6,014,653 A | 1/2000 | Thaler |
| 6,021,369 A | 2/2000 | Kamihira et al. |
| 6,026,178 A | 2/2000 | Toda |
| 6,026,193 A | 2/2000 | Rhoads |
| 6,028,626 A | 2/2000 | Aviv |
| 6,032,139 A | 2/2000 | Yamaguchi et al. |
| 6,041,299 A | 3/2000 | Schuster et al. |
| 6,044,375 A | 3/2000 | Shmueli et al. |
| 6,063,028 A | 5/2000 | Luciano |
| 6,064,996 A | 5/2000 | Yamaguchi et al. |
| 6,067,369 A | 5/2000 | Kamei |
| 6,070,139 A | 5/2000 | Miyazawa et al. |
| 6,092,045 A | 7/2000 | Stubley et al. |
| 6,108,648 A | 8/2000 | Lakshmi et al. |
| 6,111,954 A | 8/2000 | Rhoads |
| 6,119,111 A | 9/2000 | Gross et al. |
| 6,122,403 A | 9/2000 | Rhoads |
| 6,125,201 A | 9/2000 | Zador |
| 6,148,274 A | 11/2000 | Watanabe et al. |
| 6,151,548 A | 11/2000 | Kamihira et al. |
| 6,175,554 B1 | 1/2001 | Jang et al. |
| 6,186,953 B1 | 2/2001 | Narimatsu |
| 6,205,456 B1 | 3/2001 | Nakao |
| 6,208,963 B1 | 3/2001 | Martinez et al. |
| 6,233,365 B1 | 5/2001 | Teruhiko |
| 6,236,736 B1 | 5/2001 | Crabtree et al. |
| 6,243,492 B1 | 6/2001 | Kamei |
| 6,247,002 B1 | 6/2001 | Steels |
| 6,252,963 B1 | 6/2001 | Rhoads |
| 6,259,988 B1 | 7/2001 | Galkowski et al. |
| 6,266,430 B1 | 7/2001 | Rhoads |
| 6,272,261 B1 | 8/2001 | Matsuoka |
| 6,272,480 B1 | 8/2001 | Tresp et al. |
| 6,278,799 B1 | 8/2001 | Hoffman |
| 6,278,985 B1 | 8/2001 | Hatayama |
| 6,278,986 B1 | 8/2001 | Kamihira et al. |
| 6,286,036 B1 | 9/2001 | Rhoads |
| 6,289,304 B1 | 9/2001 | Grefenstette |
| 6,290,566 B1 | 9/2001 | Gabai et al. |
| 6,304,862 B1 | 10/2001 | Yamaguchi et al. |
| 6,304,863 B1 | 10/2001 | Murai |
| 6,311,174 B1 | 10/2001 | Kato |
| 6,314,412 B1 | 11/2001 | Yamaguchi et al. |
| 6,317,731 B1 | 11/2001 | Luciano |
| 6,321,288 B1 | 11/2001 | Ho |
| 6,324,529 B1 | 11/2001 | Kamihira et al. |
| 6,324,530 B1 | 11/2001 | Yamaguchi et al. |
| 6,324,573 B1 | 11/2001 | Rhoads |
| 6,330,335 B1 | 12/2001 | Rhoads |
| 6,343,138 B1 | 1/2002 | Rhoads |
| 6,347,297 B1 | 2/2002 | Asghar et al. |
| 6,349,281 B1 | 2/2002 | Miyazawa et al. |
| 6,353,672 B1 | 3/2002 | Rhoads |
| 6,363,159 B1 | 3/2002 | Rhoads |
| 6,363,369 B1 | 3/2002 | Liaw et al. |
| 6,366,293 B1 | 4/2002 | Hamilton et al. |
| 6,381,341 B1 | 4/2002 | Rhoads |
| 6,392,591 B1 | 5/2002 | Hsu et al. |
| 6,400,827 B1 | 6/2002 | Rhoads |
| 6,404,898 B1 | 6/2002 | Rhoads |
| 6,408,331 B1 | 6/2002 | Rhoads |
| 6,411,945 B1 | 6/2002 | Nakajima |
| 6,430,302 B2 | 8/2002 | Rhoads |
| 6,438,231 B1 | 8/2002 | Rhoads |
| 6,442,451 B1 | 8/2002 | Lapham |
| 6,449,379 B1 | 9/2002 | Rhoads |
| 6,456,697 B1 | 9/2002 | Chang et al. |
| 6,456,989 B1 | 9/2002 | Kawamura et al. |
| 6,458,157 B1 | 10/2002 | Suaning |
| 6,473,746 B1 | 10/2002 | Zakrzewski |
| 6,489,741 B1 | 12/2002 | Genov et al. |
| 6,493,691 B1 | 12/2002 | Neuneier et al. |
| 6,496,591 B1 | 12/2002 | Rhoads |
| 6,496,815 B1 | 12/2002 | Kawashima |
| 6,519,352 B2 | 2/2003 | Rhoads |
| 6,526,167 B1 | 2/2003 | Numaoka |
| 6,529,816 B1 | 3/2003 | Yamaguchi et al. |
| 6,539,095 B1 | 3/2003 | Rhoads |
| 6,542,618 B1 | 4/2003 | Rhoads |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,553,129 B1 | 4/2003 | Rhoads |
| 6,560,349 B1 | 5/2003 | Rhoads |
| 6,560,350 B2 | 5/2003 | Rhoads |
| 6,567,533 B1 | 5/2003 | Rhoads |
| 6,567,535 B2 | 5/2003 | Rhoads |
| 6,567,780 B2 | 5/2003 | Rhoads |
| 6,580,808 B2 | 6/2003 | Rhoads |
| 6,581,046 B1 | 6/2003 | Ahissar |
| 6,587,821 B1 | 7/2003 | Rhoads |
| 6,587,846 B1 | 7/2003 | LaMuth |
| 6,590,997 B2 | 7/2003 | Rhoads |
| 6,590,998 B2 | 7/2003 | Rhoads |
| 6,606,580 B1 | 8/2003 | Zedda et al. |
| 6,636,631 B2 | 10/2003 | Miyazaki et al. |
| 6,636,781 B1 | 10/2003 | Shen et al. |
| 6,643,627 B2 | 11/2003 | Liaw et al. |
| 6,647,128 B1 | 11/2003 | Rhoads |
| 6,647,129 B2 | 11/2003 | Rhoads |
| 6,647,130 B2 | 11/2003 | Rhoads |
| 6,654,887 B2 | 11/2003 | Rhoads |
| 6,675,146 B2 | 1/2004 | Rhoads |
| 6,678,640 B2 | 1/2004 | Ishida et al. |
| 6,681,029 B1 | 1/2004 | Rhoads |
| 6,686,712 B2 | 2/2004 | Numaguchi et al. |
| 6,686,853 B2 | 2/2004 | Shen et al. |
| 6,697,711 B2 | 2/2004 | Yokono et al. |
| 6,700,990 B1 | 3/2004 | Rhoads |
| 6,711,528 B2 | 3/2004 | Dishman et al. |
| 6,721,445 B1 | 4/2004 | Azencott |
| 6,724,364 B2 | 4/2004 | Tani |
| 6,728,691 B1 | 4/2004 | Neuneier et al. |
| 6,744,544 B1 | 6/2004 | Nagashima et al. |
| 6,751,320 B2 | 6/2004 | Rhoads |
| 6,754,560 B2 | 6/2004 | Fujita et al. |
| 6,760,463 B2 | 7/2004 | Rhoads |
| 6,768,808 B2 | 7/2004 | Rhoads |
| 6,775,392 B1 | 8/2004 | Rhoads |
| 6,785,647 B2 | 8/2004 | Hutchison |
| 6,792,412 B1 | 9/2004 | Sullivan et al. |
| 6,792,413 B2 | 9/2004 | Tani |
| 6,799,141 B1 | 9/2004 | Stoustrup et al. |
| 6,799,171 B1 | 9/2004 | Van Kommer |
| 6,813,366 B1 | 11/2004 | Rhoads |
| 6,816,078 B2 | 11/2004 | Onoda et al. |
| 6,816,611 B1 | 11/2004 | Hagiwara et al. |
| 6,816,756 B2 | 11/2004 | Shin et al. |
| 6,879,701 B1 | 4/2005 | Rhoads |
| 6,904,335 B2 | 6/2005 | Solomon |
| 6,911,006 B2 | 6/2005 | Suzuki et al. |
| 6,915,283 B2 | 7/2005 | Tani |
| 6,925,361 B1 | 8/2005 | Sinnock |
| 6,941,199 B1 | 9/2005 | Bottomley et al. |
| 6,944,298 B1 | 9/2005 | Rhoads |
| 6,947,890 B1 | 9/2005 | Kitazoe et al. |
| 6,959,166 B1 | 10/2005 | Gabai et al. |

(56) References Cited

U.S. PATENT DOCUMENTS

| | | |
|---|---|---|
| 6,959,386 B2 | 10/2005 | Rhoads |
| 6,961,060 B1 | 11/2005 | Mochizuki et al. |
| 6,968,057 B2 | 11/2005 | Rhoads |
| 6,973,446 B2 | 12/2005 | Mamitsuka et al. |
| 6,980,689 B1 | 12/2005 | Deco et al. |
| 6,980,889 B2 | 12/2005 | Ito |
| 6,982,659 B2 | 1/2006 | Shen et al. |
| 6,983,051 B1 | 1/2006 | Rhoads |
| 6,987,862 B2 | 1/2006 | Rhoads |
| 7,002,585 B1 | 2/2006 | Watanabe et al. |
| 7,016,516 B2 | 3/2006 | Rhoads |
| 7,024,276 B2 | 4/2006 | Ito |
| 7,028,271 B2 | 4/2006 | Matsugu et al. |
| 7,035,427 B2 | 4/2006 | Rhoads |
| 7,039,233 B2 | 5/2006 | Mori et al. |
| 7,043,052 B2 | 5/2006 | Rhoads |
| 7,054,465 B2 | 5/2006 | Rhoads |
| 7,054,724 B2 | 5/2006 | Koshizen et al. |
| 7,058,697 B2 | 6/2006 | Rhoads |
| 7,072,875 B2 | 7/2006 | Tani |
| 7,082,421 B2 | 7/2006 | Tani |
| 7,088,860 B2 | 8/2006 | Matsugu et al. |
| 7,089,219 B2 | 8/2006 | Tani |
| 7,092,857 B1 | 8/2006 | Steiner |
| 7,107,107 B2 | 9/2006 | Morikawa et al. |
| 7,110,526 B1 | 9/2006 | Dezonno |
| 7,113,596 B2 | 9/2006 | Rhoads |
| 7,113,614 B2 | 9/2006 | Rhoads |
| 7,116,781 B2 | 10/2006 | Rhoads |
| 7,127,497 B2 | 10/2006 | Nonaka |
| 7,133,744 B2 | 11/2006 | Ito |
| 7,143,045 B2 | 11/2006 | Sekiguchi |
| 7,152,051 B1 | 12/2006 | Commons et al. |
| 7,171,016 B1 | 1/2007 | Rhoads |
| 7,171,042 B2 | 1/2007 | Hartmann et al. |
| 7,177,787 B2 | 2/2007 | Rey-Fabret et al. |
| 7,181,022 B2 | 2/2007 | Rhoads |
| 7,206,770 B2 | 4/2007 | Tsui et al. |
| 7,216,112 B2 | 5/2007 | Ohtani et al. |
| 7,219,064 B2 | 5/2007 | Nakakita et al. |
| 7,221,797 B2 | 5/2007 | Koshizen et al. |
| 7,236,963 B1 | 6/2007 | LaMuth |
| 7,242,790 B2 | 7/2007 | Rhoads |
| 7,248,717 B2 | 7/2007 | Rhoads |
| 7,251,582 B2 | 7/2007 | Singh et al. |
| 7,263,458 B2 | 8/2007 | Hall et al. |
| 7,274,819 B2 | 9/2007 | Matsugu |
| 7,296,005 B2 | 11/2007 | Minamino et al. |
| 7,299,261 B1 | 11/2007 | Oliver et al. |
| 7,308,110 B2 | 12/2007 | Rhoads |
| 7,308,432 B2 | 12/2007 | Torii et al. |
| 7,313,251 B2 | 12/2007 | Rhoads |
| 7,321,882 B2 | 1/2008 | Jaeger |
| 7,324,870 B2 | 1/2008 | Lee |
| 7,324,980 B2 | 1/2008 | Ito et al. |
| 7,330,563 B2 | 2/2008 | Rhoads |
| 7,342,589 B2 | 3/2008 | Miserocchi |
| 7,346,595 B2 | 3/2008 | Aoyama et al. |
| 7,349,555 B2 | 3/2008 | Rhoads |
| 7,359,528 B2 | 4/2008 | Rhoads |
| 7,369,889 B2 | 5/2008 | Astrom et al. |
| 7,369,991 B2 | 5/2008 | Manabe et al. |
| 7,370,020 B1 | 5/2008 | Azvine et al. |
| 7,373,333 B2 | 5/2008 | Ito et al. |
| 7,386,388 B2 | 6/2008 | Akazaki et al. |
| 7,395,251 B2 | 7/2008 | Linsker |
| 7,415,129 B2 | 8/2008 | Rhoads |
| 7,426,501 B2 | 9/2008 | Nugent |
| 7,426,920 B1 | 9/2008 | Petersen |
| 7,435,978 B2 | 10/2008 | Nakasugi et al. |
| 7,437,430 B2 | 10/2008 | Rhoads |
| 7,444,000 B2 | 10/2008 | Rhoads |
| 7,447,285 B2 | 11/2008 | Matsumoto et al. |
| 7,461,136 B2 | 12/2008 | Rhoads |
| 7,464,061 B2 | 12/2008 | Grothmann et al. |
| 7,466,840 B2 | 12/2008 | Rhoads |
| 7,471,997 B2 | 12/2008 | Tezuka |
| 7,482,775 B2 | 1/2009 | Zaier |
| 7,483,864 B2 | 1/2009 | Osoda et al. |
| 7,486,799 B2 | 2/2009 | Rhoads |
| 7,499,564 B2 | 3/2009 | Rhoads |
| 7,499,892 B2 | 3/2009 | Aoyama et al. |
| 7,502,764 B2 | 3/2009 | Son et al. |
| 7,512,271 B2 | 3/2009 | Matsugu et al. |
| 7,515,733 B2 | 4/2009 | Rhoads |
| 7,536,555 B2 | 5/2009 | Rhoads |
| 7,552,669 B1 | 6/2009 | Denis et al. |
| 7,564,992 B2 | 7/2009 | Rhoads |
| 7,567,686 B2 | 7/2009 | Rhoads |
| 7,576,278 B2 | 8/2009 | Urata |
| 7,580,587 B2 | 8/2009 | Matsugu et al. |
| RE40,919 E | 9/2009 | Rhoads |
| 7,583,059 B2 | 9/2009 | Cho |
| 7,603,325 B2 | 10/2009 | Jacobson |
| 7,606,390 B2 | 10/2009 | Rhoads |
| 7,613,165 B2 | 11/2009 | Shin et al. |
| 7,613,663 B1 | 11/2009 | Commons et al. |
| 7,617,163 B2 | 11/2009 | Ben-Hur et al. |
| 7,620,200 B2 | 11/2009 | Rhoads |
| 7,620,607 B1 | 11/2009 | Ershov |
| 7,620,609 B2 | 11/2009 | Ramakrishnan |
| 7,627,454 B2 | 12/2009 | LaComb et al. |
| 7,630,521 B2 | 12/2009 | Kim et al. |
| 7,650,009 B2 | 1/2010 | Rhoads |
| 7,653,210 B2 | 1/2010 | Rhoads |
| 7,657,497 B2 | 2/2010 | Nandy |
| 7,664,094 B1 | 2/2010 | ONeil |
| 7,668,605 B2 | 2/2010 | Braun et al. |
| 7,668,795 B2 | 2/2010 | Okamoto et al. |
| 7,672,910 B1 | 3/2010 | Kumar |
| 7,672,920 B2 | 3/2010 | Ito et al. |
| 7,676,059 B2 | 3/2010 | Rhoads |
| 7,676,441 B2 | 3/2010 | Matsugu et al. |
| 7,676,442 B2 | 3/2010 | Ben-Hur et al. |
| 7,680,666 B2 | 3/2010 | Manabe et al. |
| 7,680,886 B1 | 3/2010 | Cooley |
| 7,685,081 B2 | 3/2010 | Reil |
| 7,693,965 B2 | 4/2010 | Rhoads |
| 7,697,719 B2 | 4/2010 | Rhoads |
| 7,698,237 B2 | 4/2010 | Talbot |
| 7,702,511 B2 | 4/2010 | Rhoads |
| 7,702,660 B2 | 4/2010 | Chan et al. |
| 7,711,143 B2 | 5/2010 | Rhoads |
| 7,724,920 B2 | 5/2010 | Rhoads |
| 7,725,412 B2 | 5/2010 | Aoyama et al. |
| 7,751,588 B2 | 7/2010 | Rhoads |
| 7,751,596 B2 | 7/2010 | Rhoads |
| 7,752,544 B2 | 7/2010 | Cheng et al. |
| 7,783,585 B2 | 8/2010 | Sabe et al. |
| 7,787,653 B2 | 8/2010 | Rhoads |
| 7,805,500 B2 | 9/2010 | Rhoads |
| 7,840,508 B2 | 11/2010 | Yoshiike et al. |
| 7,848,565 B2 | 12/2010 | Goerick et al. |
| 7,849,030 B2 | 12/2010 | Ellingsworth |
| 7,877,338 B2 | 1/2011 | Tani et al. |
| 7,881,524 B2 | 2/2011 | Matsugu et al. |
| 7,889,886 B2 | 2/2011 | Matsugu et al. |
| 7,912,253 B2 | 3/2011 | Suzuki et al. |
| 7,916,354 B2 | 3/2011 | Rhoads |
| 7,936,900 B2 | 5/2011 | Rhoads |
| 7,937,185 B2 | 5/2011 | Zaier |
| 7,937,346 B2 | 5/2011 | Kato et al. |
| 7,945,781 B1 | 5/2011 | Rhoads |
| 7,945,938 B2 | 5/2011 | Takenezawa et al. |
| 7,953,270 B2 | 5/2011 | Rhoads |
| 7,953,683 B2 | 5/2011 | Minamino et al. |
| 7,965,059 B2 | 6/2011 | Plett |
| 7,970,167 B2 | 6/2011 | Rhoads |
| 7,978,905 B2 | 7/2011 | Yamamoto et al. |
| 7,987,094 B2 | 7/2011 | Rhoads |
| 7,987,245 B2 | 7/2011 | Rhoads |
| 7,991,719 B2 | 8/2011 | Ishii et al. |
| 7,992,003 B2 | 8/2011 | Rhoads |
| 7,995,805 B2 | 8/2011 | Suzuki et al. |

(56) References Cited

U.S. PATENT DOCUMENTS

| | | |
|---|---|---|
| 7,996,448 B2 | 8/2011 | Kim et al. |
| 8,005,254 B2 | 8/2011 | Rhoads |
| 8,010,468 B2 | 8/2011 | Tsai |
| 8,010,632 B2 | 8/2011 | Rhoads |
| 8,015,130 B2 | 9/2011 | Matsugu et al. |
| 8,023,692 B2 | 9/2011 | Rhoads |
| 8,023,695 B2 | 9/2011 | Rhoads |
| 8,027,520 B2 | 9/2011 | Rhoads |
| 8,051,294 B2 | 11/2011 | Rhoads |
| 8,055,012 B2 | 11/2011 | Rhoads |
| 8,068,679 B2 | 11/2011 | Rhoads |
| 8,072,612 B2 | 12/2011 | Sato et al. |
| 8,073,933 B2 | 12/2011 | Rhoads |
| 8,077,246 B2 | 12/2011 | Mori et al. |
| 8,078,697 B2 | 12/2011 | Rhoads |
| 8,099,181 B2 | 1/2012 | Sterzing et al. |
| 8,116,411 B2 | 2/2012 | Chockalingam et al. |
| 8,116,516 B2 | 2/2012 | Rhoads |
| 8,122,002 B2 | 2/2012 | Ito et al. |
| 8,144,589 B2 | 3/2012 | Meylan et al. |
| 8,145,492 B2 | 3/2012 | Fujita |
| 8,150,032 B2 | 4/2012 | Rhoads |
| 8,159,373 B2 | 4/2012 | Markram |
| 8,160,978 B2 | 4/2012 | Schafer et al. |
| 8,175,686 B2 | 5/2012 | Utsugi et al. |
| 8,180,106 B2 | 5/2012 | Matsugu et al. |
| 8,184,849 B2 | 5/2012 | Rhoads |
| 8,184,851 B2 | 5/2012 | Rhoads |
| 8,190,713 B2 | 5/2012 | Rhoads |
| 8,195,586 B2 | 6/2012 | Aoyama et al. |
| 8,204,222 B2 | 6/2012 | Rhoads |
| 8,223,625 B2 | 7/2012 | Malladi et al. |
| 8,224,369 B2 | 7/2012 | Ohwatari et al. |
| 8,235,894 B2 | 8/2012 | Nakagawa |
| 8,255,119 B2 | 8/2012 | Komori et al. |
| 8,259,848 B2 | 9/2012 | Malladi |
| 8,259,972 B2 | 9/2012 | Hockley |
| 8,260,441 B2 | 9/2012 | Scheega et al. |
| 8,271,043 B2 | 9/2012 | Kim et al. |
| 8,285,002 B2 | 10/2012 | Mori et al. |
| 8,290,887 B2 | 10/2012 | Ito et al. |
| 8,306,930 B2 | 11/2012 | Ito et al. |
| 8,311,272 B2 | 11/2012 | Matsugu et al. |
| 8,315,305 B2 | 11/2012 | Petre et al. |
| 8,315,454 B2 | 11/2012 | Tanaka et al. |
| 8,326,459 B2 | 12/2012 | Zaier |
| 8,332,070 B2 | 12/2012 | Glaser et al. |
| 8,340,789 B2 | 12/2012 | Wintrich et al. |
| 8,352,389 B1 | 1/2013 | Martinez et al. |
| 8,355,514 B2 | 1/2013 | Rhoads |
| 8,359,089 B2 | 1/2013 | Makdissi |
| 8,363,606 B2 | 1/2013 | Montojo et al. |
| 8,385,631 B2 | 2/2013 | Yamamoto et al. |
| 8,391,306 B2 | 3/2013 | Ito et al. |
| 8,391,541 B2 | 3/2013 | Rhoads |
| 8,392,191 B2 | 3/2013 | Qing et al. |
| 8,399,827 B1 | 3/2013 | Grothe |
| 8,411,898 B2 | 4/2013 | Rhoads |
| 8,419,804 B2 | 4/2013 | Herr et al. |
| 8,447,706 B2 | 5/2013 | Schneegaβ et al. |
| 8,447,708 B2 | 5/2013 | Sabe |
| 8,452,448 B2 | 5/2013 | Pack et al. |
| 8,457,093 B2 | 6/2013 | Tenny |
| 8,457,265 B2 | 6/2013 | Sampath |
| 8,457,409 B2 | 6/2013 | Lo |
| 8,463,718 B2 | 6/2013 | Ben-Hur et al. |
| 8,467,623 B2 | 6/2013 | Izhikevich et al. |
| 8,478,009 B2 | 7/2013 | Leong Chung Wei |
| 8,498,639 B2 | 7/2013 | Chen et al. |
| 8,502,137 B2 | 8/2013 | Grothe |
| 8,505,108 B2 | 8/2013 | Rhoads |
| 8,509,951 B2 | 8/2013 | Gienger |
| 8,515,136 B2 | 8/2013 | Mori et al. |
| 8,521,673 B2 | 8/2013 | Todorokihara |
| 8,521,850 B2 | 8/2013 | Rhoads |
| 8,527,037 B2 | 9/2013 | Poree et al. |
| 8,536,521 B2 | 9/2013 | Grothe |
| 8,554,707 B2 | 10/2013 | Schafer et al. |
| 8,566,264 B2 | 10/2013 | Schafer et al. |
| 8,598,515 B2 | 12/2013 | Grothe |
| 8,605,808 B2 | 12/2013 | Chockalingam et al. |
| 8,630,256 B2 | 1/2014 | Tinnakornsrisuphap et al. |
| 8,639,644 B1 | 1/2014 | Hickman et al. |
| 8,646,271 B2 | 2/2014 | Yasui et al. |
| 8,676,223 B2 | 3/2014 | Montojo et al. |
| 8,687,489 B2 | 4/2014 | Chaponniere |
| 8,687,879 B2 | 4/2014 | Cotman et al. |
| 8,706,670 B2 | 4/2014 | Hsieh et al. |
| 8,711,919 B2 | 4/2014 | Kumar |
| 8,712,424 B2 | 4/2014 | Luo et al. |
| 8,735,009 B2 | 5/2014 | Matsubayashi et al. |
| 8,751,042 B2 | 6/2014 | Lee et al. |
| 8,762,307 B2 | 6/2014 | Hashimoto et al. |
| 8,775,341 B1 | 7/2014 | Commons |
| 8,778,441 B2 | 7/2014 | Sky |
| 8,786,198 B2 | 7/2014 | De Groot |
| 8,788,439 B2 | 7/2014 | Martinez et al. |
| 8,788,441 B1 | 7/2014 | Commons et al. |
| 8,793,205 B1 | 7/2014 | Fisher et al. |
| 8,794,219 B2 | 8/2014 | Yasui et al. |
| 8,812,417 B2 | 8/2014 | Martinez et al. |
| 8,824,601 B2 | 9/2014 | Malladi |
| 8,825,306 B2 | 9/2014 | Dankers |
| 8,830,818 B2 | 9/2014 | Damnjanovic |
| 8,849,017 B2 | 9/2014 | Ito et al. |
| 8,891,489 B2 | 11/2014 | Attar et al. |
| 8,908,078 B2 | 12/2014 | Takanezawa et al. |
| 8,941,512 B2 | 1/2015 | Markram |
| 8,942,436 B2 | 1/2015 | Mori et al. |
| 8,958,912 B2 | 2/2015 | Blumberg et al. |
| 8,972,315 B2 | 3/2015 | Szatmary et al. |
| 8,990,131 B2 | 3/2015 | Wada et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,053,431 B1 | 6/2015 | Commons |
| 9,070,039 B2 | 6/2015 | Richert |
| 9,081,870 B2 | 7/2015 | Sax et al. |
| 9,111,226 B2 | 8/2015 | Richert |
| 9,137,370 B2 | 9/2015 | Elkington et al. |
| 9,165,213 B2 | 10/2015 | Nobuta et al. |
| 9,186,793 B1 | 11/2015 | Meier |
| 9,194,369 B2 | 11/2015 | Dixon et al. |
| 9,218,563 B2 | 12/2015 | Szatmary et al. |
| 9,224,090 B2 | 12/2015 | Piekniewski et al. |
| 9,235,800 B2 | 1/2016 | Grothmann et al. |
| 9,239,985 B2 | 1/2016 | Piekniewski |
| 9,242,372 B2 | 1/2016 | Laurent et al. |
| 9,248,569 B2 | 2/2016 | Laurent et al. |
| 9,875,440 B1 | 1/2018 | Commons |
| 2001/0003817 A1 | 6/2001 | Mamitsuka et al. |
| 2001/0005423 A1 | 6/2001 | Rhoads |
| 2001/0010730 A1 | 8/2001 | Rhoads |
| 2001/0012377 A1 | 8/2001 | Rhoads |
| 2001/0016051 A1 | 8/2001 | Rhoads |
| 2001/0019618 A1 | 9/2001 | Rhoads |
| 2001/0028339 A1 | 10/2001 | Tani |
| 2001/0055407 A1 | 12/2001 | Rhoads |
| 2002/0001396 A1 | 1/2002 | Rhoads |
| 2002/0016782 A1 | 2/2002 | Cooper |
| 2002/0018127 A1 | 2/2002 | Tani |
| 2002/0018572 A1 | 2/2002 | Rhoads |
| 2002/0029253 A1 | 3/2002 | Rhoads |
| 2002/0038294 A1 | 3/2002 | Matsugu |
| 2002/0048387 A1 | 4/2002 | Rhoads |
| 2002/0067857 A1 | 6/2002 | Hartmann et al. |
| 2002/0078146 A1 | 6/2002 | Rhoads |
| 2002/0080993 A1 | 6/2002 | Rhoads |
| 2002/0085718 A1 | 7/2002 | Rhoads |
| 2002/0114492 A1 | 8/2002 | Rhoads |
| 2002/0118831 A1 | 8/2002 | Rhoads |
| 2002/0136430 A1 | 9/2002 | Rhoads |

(56) References Cited

U.S. PATENT DOCUMENTS

| | | |
|---|---|---|
| 2002/0156752 A1 | 10/2002 | Torii et al. |
| 2002/0158599 A1 | 10/2002 | Fujita et al. |
| 2002/0164049 A1 | 11/2002 | Rhoads |
| 2002/0169733 A1 | 11/2002 | Peters |
| 2002/0176601 A1 | 11/2002 | Rhoads |
| 2002/0178131 A1 | 11/2002 | Tani |
| 2002/0181765 A1 | 12/2002 | Mori et al. |
| 2002/0181775 A1 | 12/2002 | Matsugu |
| 2002/0181799 A1 | 12/2002 | Matsugu et al. |
| 2002/0186886 A1 | 12/2002 | Rhoads |
| 2002/0198854 A1 | 12/2002 | Berenji et al. |
| 2003/0002710 A1 | 1/2003 | Rhoads |
| 2003/0007682 A1 | 1/2003 | Koshizen et al. |
| 2003/0009670 A1 | 1/2003 | Rhoads |
| 2003/0018467 A1 | 1/2003 | Sekiguchi |
| 2003/0018790 A1 | 1/2003 | Nonaka |
| 2003/0020739 A1 | 1/2003 | Cohen et al. |
| 2003/0021440 A1 | 1/2003 | Rhoads |
| 2003/0023347 A1 | 1/2003 | Konno et al. |
| 2003/0026451 A1 | 2/2003 | Rhoads |
| 2003/0028083 A1 | 2/2003 | Suzuki et al. |
| 2003/0031341 A1 | 2/2003 | Rhoads |
| 2003/0046042 A1 | 3/2003 | Butler et al. |
| 2003/0048922 A1 | 3/2003 | Rhoads |
| 2003/0050902 A1 | 3/2003 | Buczak et al. |
| 2003/0050903 A1 | 3/2003 | Liaw et al. |
| 2003/0065633 A1 | 4/2003 | Neuneier et al. |
| 2003/0069863 A1 | 4/2003 | Sadakuni |
| 2003/0074337 A1 | 4/2003 | Sadakuni |
| 2003/0086585 A1 | 5/2003 | Rhoads |
| 2003/0091189 A1 | 5/2003 | Rhoads |
| 2003/0093390 A1 | 5/2003 | Onoda et al. |
| 2003/0095151 A1 | 5/2003 | Shackleford et al. |
| 2003/0097056 A1 | 5/2003 | Suzuki et al. |
| 2003/0102660 A1 | 6/2003 | Rhoads |
| 2003/0105597 A1 | 6/2003 | Tsui et al. |
| 2003/0123732 A1 | 7/2003 | Miyazaki et al. |
| 2003/0130851 A1 | 7/2003 | Nakakita et al. |
| 2003/0133611 A1 | 7/2003 | Deco et al. |
| 2003/0142094 A1 | 7/2003 | Zhang |
| 2003/0142847 A1 | 7/2003 | Rhoads |
| 2003/0144764 A1 | 7/2003 | Yokono et al. |
| 2003/0154432 A1 | 8/2003 | Scott et al. |
| 2003/0158709 A1 | 8/2003 | Ishida et al. |
| 2003/0167153 A1 | 9/2003 | Alexander |
| 2003/0167454 A1 | 9/2003 | Iordanov et al. |
| 2003/0171122 A1 | 9/2003 | Kim et al. |
| 2003/0171921 A1 | 9/2003 | Manabe et al. |
| 2003/0174831 A1 | 9/2003 | Dezonno et al. |
| 2003/0174860 A1 | 9/2003 | Rhoads |
| 2003/0182006 A1 | 9/2003 | Shin et al. |
| 2003/0189420 A1 | 10/2003 | Hashimoto et al. |
| 2003/0204380 A1 | 10/2003 | Dishman et al. |
| 2003/0218818 A1 | 11/2003 | Bement et al. |
| 2003/0227382 A1 | 12/2003 | Breed |
| 2003/0228031 A1 | 12/2003 | Rhoads |
| 2003/0233170 A1 | 12/2003 | Ohtani et al. |
| 2004/0005093 A1 | 1/2004 | Rhoads |
| 2004/0015362 A1 | 1/2004 | Rhoads |
| 2004/0015363 A1 | 1/2004 | Rhoads |
| 2004/0015459 A1 | 1/2004 | Jaeger |
| 2004/0015906 A1 | 1/2004 | Goraya |
| 2004/0022444 A1 | 2/2004 | Rhoads |
| 2004/0036437 A1 | 2/2004 | Ito |
| 2004/0040791 A1 | 3/2004 | Tyni et al. |
| 2004/0043795 A1 | 3/2004 | Zancewicz |
| 2004/0044633 A1 | 3/2004 | Chen |
| 2004/0047026 A1 | 3/2004 | Ng et al. |
| 2004/0049124 A1 | 3/2004 | Kullok et al. |
| 2004/0051493 A1 | 3/2004 | Furuta et al. |
| 2004/0054505 A1 | 3/2004 | Lee |
| 2004/0057581 A1 | 3/2004 | Rhoads |
| 2004/0057597 A1 | 3/2004 | Rhoads |
| 2004/0059947 A1 | 3/2004 | Lee |
| 2004/0081977 A1 | 4/2004 | Hsu et al. |
| 2004/0103095 A1 | 5/2004 | Matsugu et al. |
| 2004/0136439 A1 | 7/2004 | Dewberry et al. |
| 2004/0139041 A1 | 7/2004 | Grichnik |
| 2004/0143524 A1 | 7/2004 | Hilton |
| 2004/0148268 A1 | 7/2004 | Reil |
| 2004/0158358 A1 | 8/2004 | Anezaki et al. |
| 2004/0162644 A1 | 8/2004 | Torii et al. |
| 2004/0162647 A1 | 8/2004 | Koshizen et al. |
| 2004/0162794 A1 | 8/2004 | Shackleford et al. |
| 2004/0167778 A1 | 8/2004 | Valsan et al. |
| 2004/0172201 A1 | 9/2004 | Matsuda et al. |
| 2004/0181266 A1 | 9/2004 | Wakefield et al. |
| 2004/0193670 A1 | 9/2004 | Langan et al. |
| 2004/0199384 A1 | 10/2004 | Hong |
| 2004/0207346 A1 | 10/2004 | De Vries et al. |
| 2004/0210399 A1 | 10/2004 | Shackleford et al. |
| 2004/0216004 A1 | 10/2004 | Singh et al. |
| 2004/0267684 A1 | 12/2004 | Erdem et al. |
| 2005/0004710 A1 | 1/2005 | Shimomura et al. |
| 2005/0005085 A1 | 1/2005 | Miyanaga |
| 2005/0015217 A1 | 1/2005 | Weidl et al. |
| 2005/0015351 A1 | 1/2005 | Nugent |
| 2005/0018873 A1 | 1/2005 | Rhoads |
| 2005/0031156 A1 | 2/2005 | Rhoads |
| 2005/0033489 A1 | 2/2005 | Tezuka |
| 2005/0036649 A1 | 2/2005 | Yokono et al. |
| 2005/0038762 A1 | 2/2005 | Grefenstette |
| 2005/0043857 A1 | 2/2005 | Van Fleet |
| 2005/0049749 A1 | 3/2005 | Watanabe et al. |
| 2005/0058318 A1 | 3/2005 | Rhoads |
| 2005/0065651 A1 | 3/2005 | Ayers et al. |
| 2005/0065900 A1 | 3/2005 | Ito et al. |
| 2005/0069207 A1 | 3/2005 | Zakrzewski et al. |
| 2005/0074090 A1 | 4/2005 | Ulyanenkov et al. |
| 2005/0074097 A1 | 4/2005 | Ulyanenkov et al. |
| 2005/0080513 A1 | 4/2005 | Ito |
| 2005/0086183 A1 | 4/2005 | Ito et al. |
| 2005/0086186 A1 | 4/2005 | Sullivan et al. |
| 2005/0088343 A1 | 4/2005 | Bae et al. |
| 2005/0092161 A1 | 5/2005 | Urata |
| 2005/0107845 A1 | 5/2005 | Wakefield et al. |
| 2005/0119982 A1 | 6/2005 | Ito et al. |
| 2005/0187437 A1 | 8/2005 | Matsugu et al. |
| 2005/0194936 A1 | 9/2005 | Cho |
| 2005/0196013 A1 | 9/2005 | Rhoads |
| 2005/0197979 A1 | 9/2005 | Anderson et al. |
| 2005/0197983 A1 | 9/2005 | Tani |
| 2005/0197984 A1 | 9/2005 | Tani |
| 2005/0197985 A1 | 9/2005 | Tani |
| 2005/0198182 A1 | 9/2005 | Prakash et al. |
| 2005/0201594 A1 | 9/2005 | Mori et al. |
| 2005/0221400 A1 | 10/2005 | Gudas et al. |
| 2005/0240412 A1 | 10/2005 | Fujita |
| 2005/0246297 A1 | 11/2005 | Chen et al. |
| 2005/0256413 A1 | 11/2005 | Astrom et al. |
| 2005/0265924 A1 | 12/2005 | Challita-Eid et al. |
| 2005/0266242 A1 | 12/2005 | Lindquist et al. |
| 2005/0267851 A1 | 12/2005 | Baba et al. |
| 2005/0283450 A1 | 12/2005 | Matsugu et al. |
| 2005/0286736 A1 | 12/2005 | Rhoads |
| 2006/0008173 A1 | 1/2006 | Matsugu et al. |
| 2006/0013435 A1 | 1/2006 | Rhoads |
| 2006/0015216 A1 | 1/2006 | Ito |
| 2006/0056678 A1 | 3/2006 | Tanaka et al. |
| 2006/0062386 A1 | 3/2006 | Rhoads |
| 2006/0076508 A1 | 4/2006 | Nakasugi et al. |
| 2006/0080556 A1 | 4/2006 | Rhoads |
| 2006/0094001 A1 | 5/2006 | Torre et al. |
| 2006/0106477 A1 | 5/2006 | Miyashita |
| 2006/0109984 A1 | 5/2006 | Rhoads |
| 2006/0115157 A1 | 6/2006 | Mori et al. |
| 2006/0133646 A1 | 6/2006 | Rhoads |
| 2006/0136565 A1 | 6/2006 | Rhoads |
| 2006/0147375 A1 | 7/2006 | Gudas et al. |
| 2006/0155660 A1 | 7/2006 | Koshizen et al. |
| 2006/0155664 A1 | 7/2006 | Morikawa et al. |
| 2006/0161218 A1 | 7/2006 | Danilov |
| 2006/0167654 A1 | 7/2006 | Keinan et al. |
| 2006/0167784 A1 | 7/2006 | Hoffberg |

(56) References Cited

U.S. PATENT DOCUMENTS

| | | |
|---|---|---|
| 2006/0171559 A1 | 8/2006 | Rhoads |
| 2006/0174341 A1 | 8/2006 | Judge |
| 2006/0181236 A1 | 8/2006 | Brogardh |
| 2006/0184471 A1 | 8/2006 | Minamino et al. |
| 2006/0188128 A1 | 8/2006 | Rhoads |
| 2006/0207419 A1 | 9/2006 | Okazaki et al. |
| 2006/0215883 A1 | 9/2006 | Kim et al. |
| 2006/0222354 A1 | 10/2006 | Mori et al. |
| 2006/0228005 A1 | 10/2006 | Matsugu et al. |
| 2006/0228027 A1 | 10/2006 | Matsugu et al. |
| 2006/0229739 A1 | 10/2006 | Morikawa |
| 2006/0229817 A1 | 10/2006 | Jacobson |
| 2006/0230018 A1 | 10/2006 | Grichnik et al. |
| 2006/0230140 A1 | 10/2006 | Aoyama et al. |
| 2006/0248026 A1 | 11/2006 | Aoyama et al. |
| 2006/0251291 A1 | 11/2006 | Rhoads |
| 2006/0255986 A1 | 11/2006 | Takanezawa et al. |
| 2007/0003130 A1 | 1/2007 | Goerick et al. |
| 2007/0022062 A1 | 1/2007 | Grothmann et al. |
| 2007/0022068 A1 | 1/2007 | Linsker |
| 2007/0024850 A1 | 2/2007 | Zaghloul et al. |
| 2007/0025722 A1 | 2/2007 | Matsugu et al. |
| 2007/0038588 A1 | 2/2007 | Sullivan et al. |
| 2007/0061100 A1 | 3/2007 | Hall et al. |
| 2007/0087389 A1 | 4/2007 | Matsuda et al. |
| 2007/0087756 A1 | 4/2007 | Hoffberg |
| 2007/0094163 A1 | 4/2007 | Bowerman et al. |
| 2007/0094164 A1 | 4/2007 | Wu et al. |
| 2007/0098213 A1 | 5/2007 | Rhoads |
| 2007/0100630 A1 | 5/2007 | Manabe et al. |
| 2007/0106480 A1 | 5/2007 | Dai et al. |
| 2007/0133504 A1 | 6/2007 | Shin et al. |
| 2007/0136043 A1 | 6/2007 | Matsuda et al. |
| 2007/0145930 A1 | 6/2007 | Zaier |
| 2007/0150095 A1 | 6/2007 | Zaier |
| 2007/0166677 A1 | 7/2007 | Suleiman |
| 2007/0176643 A1 | 8/2007 | Nugent |
| 2007/0185825 A1 | 8/2007 | Ito et al. |
| 2007/0201835 A1 | 8/2007 | Rhoads |
| 2007/0202477 A1 | 8/2007 | Nakagawa |
| 2007/0208678 A1 | 9/2007 | Matsugu |
| 2007/0208691 A1 | 9/2007 | Ramakrishnan |
| 2007/0217493 A1 | 9/2007 | Rhoads |
| 2007/0223592 A1 | 9/2007 | Rhoads |
| 2007/0239635 A1 | 10/2007 | Yoshiike et al. |
| 2007/0239644 A1 | 10/2007 | Minamino et al. |
| 2007/0242856 A1 | 10/2007 | Suzuki et al. |
| 2007/0244842 A1 | 10/2007 | Ishii et al. |
| 2007/0250461 A1 | 10/2007 | Sabe et al. |
| 2007/0251998 A1 | 11/2007 | Belenki |
| 2007/0253561 A1 | 11/2007 | Williams et al. |
| 2007/0260356 A1 | 11/2007 | Kock et al. |
| 2007/0265763 A1 | 11/2007 | Akazaki et al. |
| 2007/0265841 A1 | 11/2007 | Tani et al. |
| 2007/0274386 A1 | 11/2007 | Rhoads |
| 2007/0274523 A1 | 11/2007 | Rhoads |
| 2007/0274560 A1 | 11/2007 | Rhoads |
| 2007/0280006 A1 | 12/2007 | Aoyama et al. |
| 2007/0286451 A1 | 12/2007 | Rhoads |
| 2007/0288407 A1 | 12/2007 | Nishimoto et al. |
| 2008/0002862 A1 | 1/2008 | Matsugu et al. |
| 2008/0010228 A1 | 1/2008 | Helmick |
| 2008/0010229 A1 | 1/2008 | Lee Shu Tak |
| 2008/0014646 A1 | 1/2008 | Kuroda et al. |
| 2008/0019560 A1 | 1/2008 | Rhoads |
| 2008/0037824 A1 | 2/2008 | Rhoads |
| 2008/0038604 A1 | 2/2008 | Matsubayashi et al. |
| 2008/0040040 A1 | 2/2008 | Goto et al. |
| 2008/0089282 A1 | 4/2008 | Malladi et al. |
| 2008/0095110 A1 | 4/2008 | Montojo et al. |
| 2008/0097644 A1 | 4/2008 | Kaznov et al. |
| 2008/0100482 A1 | 5/2008 | Lazar |
| 2008/0109392 A1 | 5/2008 | Nandy |
| 2008/0112596 A1 | 5/2008 | Rhoads et al. |
| 2008/0123520 A1 | 5/2008 | Ji et al. |
| 2008/0123899 A1 | 5/2008 | Rhoads |
| 2008/0123906 A1 | 5/2008 | Mori et al. |
| 2008/0126359 A1 | 5/2008 | Rhoads |
| 2008/0131083 A1 | 6/2008 | Rhoads |
| 2008/0131084 A1 | 6/2008 | Rhoads |
| 2008/0132281 A1 | 6/2008 | Kim et al. |
| 2008/0133052 A1 | 6/2008 | Jones et al. |
| 2008/0134232 A1 | 6/2008 | Rhoads |
| 2008/0139213 A1 | 6/2008 | Coersmeier |
| 2008/0140749 A1 | 6/2008 | Amato et al. |
| 2008/0144944 A1 | 6/2008 | Breed |
| 2008/0147405 A1 | 6/2008 | Qing et al. |
| 2008/0154428 A1 | 6/2008 | Nagatsuka et al. |
| 2008/0159587 A1 | 7/2008 | Rhoads |
| 2008/0159588 A1 | 7/2008 | Rhoads |
| 2008/0186918 A1 | 8/2008 | Tinnakornsrisuphap et al. |
| 2008/0208072 A1 | 8/2008 | Fadem et al. |
| 2008/0212098 A1 | 9/2008 | Sato et al. |
| 2008/0214198 A1 | 9/2008 | Chen et al. |
| 2008/0216149 A1 | 9/2008 | Rhoads |
| 2008/0219516 A1 | 9/2008 | Suzuki et al. |
| 2008/0222646 A1 | 9/2008 | Sigal et al. |
| 2008/0225823 A1 | 9/2008 | Tenny |
| 2008/0233967 A1 | 9/2008 | Montojo et al. |
| 2008/0240566 A1 | 10/2008 | Thint |
| 2008/0249966 A1 | 10/2008 | Luege Mateos |
| 2008/0253740 A1 | 10/2008 | Rhoads |
| 2008/0262677 A1 | 10/2008 | Komori et al. |
| 2008/0267119 A1 | 10/2008 | Kowalski |
| 2008/0273747 A1 | 11/2008 | Rhoads |
| 2008/0275831 A1 | 11/2008 | Reil |
| 2008/0301073 A1 | 12/2008 | Tsai |
| 2008/0310324 A1 | 12/2008 | Chaponniere |
| 2008/0319929 A1 | 12/2008 | Kaplan et al. |
| 2009/0003282 A1 | 1/2009 | Meylan et al. |
| 2009/0012768 A1 | 1/2009 | Son et al. |
| 2009/0028112 A1 | 1/2009 | Attar et al. |
| 2009/0036781 A1 | 2/2009 | Utsugi et al. |
| 2009/0037033 A1 | 2/2009 | Phillips et al. |
| 2009/0041145 A1 | 2/2009 | Chockalingam et al. |
| 2009/0042511 A1 | 2/2009 | Malladi |
| 2009/0043722 A1 | 2/2009 | Nugent |
| 2009/0046573 A1 | 2/2009 | Damnjanovic |
| 2009/0052514 A1 | 2/2009 | Sampath |
| 2009/0060265 A1 | 3/2009 | Rhoads |
| 2009/0060269 A1 | 3/2009 | Rhoads |
| 2009/0097702 A1 | 4/2009 | Rhoads |
| 2009/0100293 A1 | 4/2009 | LaComb et al. |
| 2009/0125607 A1 | 5/2009 | Rhoads |
| 2009/0132547 A1 | 5/2009 | Rhoads |
| 2009/0157634 A1 | 6/2009 | Ito et al. |
| 2009/0172128 A1 | 7/2009 | Rhoads |
| 2009/0182693 A1 | 7/2009 | Fulton et al. |
| 2009/0185704 A1 | 7/2009 | Hockley |
| 2009/0192861 A1 | 7/2009 | Suzuki et al. |
| 2009/0192958 A1 | 7/2009 | Todorokihara |
| 2009/0216639 A1 | 8/2009 | Kapczynski et al. |
| 2009/0216696 A1 | 8/2009 | Downs et al. |
| 2009/0234501 A1 | 9/2009 | Ishizaki |
| 2009/0271189 A1 | 10/2009 | Agapi et al. |
| 2009/0271341 A1 | 10/2009 | Wang |
| 2009/0271344 A1 | 10/2009 | Schafer et al. |
| 2009/0287624 A1 | 11/2009 | Rouat et al. |
| 2009/0290754 A1 | 11/2009 | Rhoads |
| 2009/0290800 A1 | 11/2009 | Lo |
| 2009/0299929 A1 | 12/2009 | Kozma et al. |
| 2009/0299933 A1 | 12/2009 | Aoyama et al. |
| 2009/0305148 A1 | 12/2009 | Asano |
| 2009/0307636 A1 | 12/2009 | Cases et al. |
| 2009/0319455 A1 | 12/2009 | Jacobson |
| 2009/0327178 A1 | 12/2009 | Jacobson |
| 2010/0008526 A1 | 1/2010 | De Vries et al. |
| 2010/0010943 A1 | 1/2010 | Ito et al. |
| 2010/0010948 A1 | 1/2010 | Ito et al. |
| 2010/0010949 A1 | 1/2010 | Ito et al. |
| 2010/0021004 A1 | 1/2010 | Rhoads |
| 2010/0027873 A1 | 2/2010 | Kakuda |
| 2010/0036457 A1 | 2/2010 | Sarpeshkar et al. |
| 2010/0040255 A1 | 2/2010 | Rhoads |

(56) References Cited

U.S. PATENT DOCUMENTS

| | | |
|---|---|---|
| 2010/0049339 A1 | 2/2010 | Schafer et al. |
| 2010/0070098 A1 | 3/2010 | Sterzing et al. |
| 2010/0081958 A1 | 4/2010 | She |
| 2010/0082126 A1 | 4/2010 | Matsushita |
| 2010/0086171 A1 | 4/2010 | Lapstun |
| 2010/0094639 A1 | 4/2010 | Rhoads |
| 2010/0094765 A1 | 4/2010 | Nandy |
| 2010/0094788 A1 | 4/2010 | Schafer et al. |
| 2010/0103937 A1 | 4/2010 | ONeil |
| 2010/0105406 A1 | 4/2010 | Luo et al. |
| 2010/0117978 A1 | 5/2010 | Shirado |
| 2010/0118163 A1 | 5/2010 | Matsugu et al. |
| 2010/0121798 A1 | 5/2010 | Matsugu et al. |
| 2010/0128924 A1 | 5/2010 | Rhoads |
| 2010/0131767 A1 | 5/2010 | Rhoads |
| 2010/0166320 A1 | 7/2010 | Paquier |
| 2010/0169098 A1 | 7/2010 | Patch |
| 2010/0172538 A1 | 7/2010 | Rhoads |
| 2010/0183202 A1 | 7/2010 | Takahashi et al. |
| 2010/0198941 A1 | 8/2010 | Rhoads |
| 2010/0205974 A1 | 8/2010 | Schneegass et al. |
| 2010/0208631 A1 | 8/2010 | Zhang et al. |
| 2010/0214936 A1 | 8/2010 | Ito et al. |
| 2010/0215253 A1 | 8/2010 | Yamamoto et al. |
| 2010/0217735 A1 | 8/2010 | Matsumura et al. |
| 2010/0222924 A1 | 9/2010 | Gienger et al. |
| 2010/0223219 A1 | 9/2010 | Kato et al. |
| 2010/0225824 A1 | 9/2010 | Lazar et al. |
| 2010/0235285 A1 | 9/2010 | Hoffberg |
| 2010/0249999 A1 | 9/2010 | Glaser et al. |
| 2010/0256511 A1 | 10/2010 | Poree et al. |
| 2010/0256699 A1 | 10/2010 | Makdissi |
| 2010/0257866 A1 | 10/2010 | Schneegass et al. |
| 2010/0286824 A1 | 11/2010 | Solomon |
| 2010/0290666 A1 | 11/2010 | Rhoads |
| 2010/0292835 A1 | 11/2010 | Sugiura et al. |
| 2010/0293276 A1 | 11/2010 | Rhoads |
| 2010/0299101 A1 | 11/2010 | Shimada et al. |
| 2010/0305446 A1 | 12/2010 | Berard-Anderson et al. |
| 2010/0312730 A1 | 12/2010 | Weng et al. |
| 2010/0317420 A1 | 12/2010 | Hoffberg |
| 2010/0318664 A1 | 12/2010 | Rhoads |
| 2011/0004513 A1 | 1/2011 | Hoffberg |
| 2011/0016071 A1 | 1/2011 | Guillen et al. |
| 2011/0021922 A1 | 1/2011 | Berard-Anderson et al. |
| 2011/0026770 A1 | 2/2011 | Brookshire |
| 2011/0035052 A1 | 2/2011 | McLurkin et al. |
| 2011/0040780 A1 | 2/2011 | Rhoads |
| 2011/0051998 A1 | 3/2011 | Rhoads |
| 2011/0060461 A1 | 3/2011 | Velliste et al. |
| 2011/0060706 A1 | 3/2011 | Suzuki |
| 2011/0060707 A1 | 3/2011 | Suzuki |
| 2011/0060708 A1 | 3/2011 | Suzuki |
| 2011/0066734 A1 | 3/2011 | Rhoads |
| 2011/0067479 A1 | 3/2011 | Davis et al. |
| 2011/0069746 A1 | 3/2011 | Chockalingam et al. |
| 2011/0106539 A1 | 5/2011 | Rhoads |
| 2011/0112997 A1 | 5/2011 | Sabe |
| 2011/0119214 A1 | 5/2011 | Breitwisch et al. |
| 2011/0119215 A1 | 5/2011 | Elmegreen et al. |
| 2011/0129115 A1 | 6/2011 | Rhoads |
| 2011/0144802 A1 | 6/2011 | Jang |
| 2011/0158468 A1 | 6/2011 | Rhoads |
| 2011/0158476 A1 | 6/2011 | Fahn et al. |
| 2011/0160906 A1 | 6/2011 | Orita et al. |
| 2011/0181719 A1 | 7/2011 | Takanezawa et al. |
| 2011/0196199 A1 | 8/2011 | Donhowe et al. |
| 2011/0231016 A1 | 9/2011 | Goulding |
| 2011/0239224 A1 | 9/2011 | Yamamoto et al. |
| 2011/0243375 A1 | 10/2011 | Rhoads |
| 2011/0257522 A1 | 10/2011 | Berard-Andersen et al. |
| 2011/0274270 A1 | 11/2011 | Rhoads |
| 2011/0276663 A1 | 11/2011 | Rhoads |
| 2011/0283190 A1 | 11/2011 | Poltorak |
| 2011/0296944 A1 | 12/2011 | Carter et al. |
| 2011/0308503 A1 | 12/2011 | Yasui et al. |
| 2011/0313634 A1 | 12/2011 | Yasui et al. |
| 2011/0319094 A1 | 12/2011 | Usui et al. |
| 2012/0011090 A1 | 1/2012 | Tang et al. |
| 2012/0045068 A1 | 2/2012 | Kim et al. |
| 2012/0053728 A1 | 3/2012 | Theodorus et al. |
| 2012/0065746 A1 | 3/2012 | Wintrich et al. |
| 2012/0091895 A1 | 4/2012 | De Groot |
| 2012/0109866 A1 | 5/2012 | Modha |
| 2012/0117011 A1 | 5/2012 | Hashimoto et al. |
| 2012/0129269 A1 | 5/2012 | Choi et al. |
| 2012/0143495 A1 | 6/2012 | Dantu |
| 2012/0143803 A1 | 6/2012 | Wada et al. |
| 2012/0150781 A1 | 6/2012 | Arthur et al. |
| 2012/0173021 A1 | 7/2012 | Tsusaka |
| 2012/0179638 A1 | 7/2012 | Hsieh et al. |
| 2012/0179721 A1 | 7/2012 | Hsieh et al. |
| 2012/0183187 A1* | 7/2012 | Sasaki .................. G16Z 99/00 382/128 |
| 2012/0197439 A1 | 8/2012 | Wang et al. |
| 2012/0209428 A1 | 8/2012 | Mizutani |
| 2012/0209432 A1 | 8/2012 | Fleischer et al. |
| 2012/0239403 A1 | 9/2012 | Cano et al. |
| 2012/0250982 A1 | 10/2012 | Ito et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2013/0009052 A1 | 1/2013 | Grothe, Jr. |
| 2013/0013273 A1 | 1/2013 | Grothe, Jr. |
| 2013/0013274 A1 | 1/2013 | Grothe, Jr. |
| 2013/0013543 A1 | 1/2013 | Dull et al. |
| 2013/0018612 A1 | 1/2013 | Grossard et al. |
| 2013/0019325 A1 | 1/2013 | Deisseroth et al. |
| 2013/0022464 A1 | 1/2013 | Dixon et al. |
| 2013/0039236 A1 | 2/2013 | Malladi |
| 2013/0066468 A1 | 3/2013 | Choi et al. |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0085642 A1 | 4/2013 | Dankers |
| 2013/0096719 A1 | 4/2013 | Sanders et al. |
| 2013/0116827 A1 | 5/2013 | Inazumi |
| 2013/0136112 A1 | 5/2013 | Montojo et al. |
| 2013/0138428 A1 | 5/2013 | Chandramouli et al. |
| 2013/0148879 A1 | 6/2013 | Nobuta et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0204617 A1 | 8/2013 | Kuo et al. |
| 2013/0204815 A1 | 8/2013 | Grothmann et al. |
| 2013/0212053 A1 | 8/2013 | Yagi et al. |
| 2013/0218821 A1 | 8/2013 | Szatmary et al. |
| 2013/0250926 A1 | 9/2013 | Tenny |
| 2013/0251278 A1 | 9/2013 | Izhikevich et al. |
| 2013/0282635 A1 | 10/2013 | Dull et al. |
| 2013/0297542 A1 | 11/2013 | Piekniewski et al. |
| 2013/0310979 A1 | 11/2013 | Herr et al. |
| 2013/0311414 A1 | 11/2013 | Nishitani et al. |
| 2013/0311415 A1 | 11/2013 | Nishitani et al. |
| 2013/0325244 A1 | 12/2013 | Wang et al. |
| 2013/0325768 A1 | 12/2013 | Sinyavskiy et al. |
| 2013/0325773 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0345580 A1 | 12/2013 | Poree et al. |
| 2014/0012788 A1 | 1/2014 | Piekniewski |
| 2014/0016858 A1 | 1/2014 | Richert |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0046610 A1 | 2/2014 | Bamberger et al. |
| 2014/0052679 A1 | 2/2014 | Sinyavskiy et al. |
| 2014/0063221 A1 | 3/2014 | Mohanakrishnan et al. |

(56) References Cited

U.S. PATENT DOCUMENTS

| | | | |
|---|---|---|---|
| 2014/0081793 A1 | 3/2014 | Hoffberg |
| 2014/0081895 A1 | 3/2014 | Coenen et al. |
| 2014/0089232 A1 | 3/2014 | Buibas et al. |
| 2014/0100703 A1 | 4/2014 | Dull et al. |
| 2014/0122397 A1 | 5/2014 | Richert et al. |
| 2014/0122398 A1 | 5/2014 | Richert |
| 2014/0155706 A1 | 6/2014 | Kochs et al. |
| 2014/0156574 A1 | 6/2014 | Pikniewski et al. |
| 2014/0163729 A1 | 6/2014 | Shi et al. |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich et al. |
| 2014/0277744 A1 | 9/2014 | Coenen |
| 2014/0295907 A1 | 10/2014 | Luo et al. |
| 2014/0313315 A1 | 10/2014 | Shoham et al. |
| 2014/0358284 A1 | 12/2014 | Laurent et al. |
| 2014/0371907 A1 | 12/2014 | Passot et al. |
| 2014/0371912 A1 | 12/2014 | Passot et al. |
| 2015/0005176 A1 | 1/2015 | Kim et al. |
| 2015/0019276 A1 | 1/2015 | Egedal et al. |
| 2015/0032258 A1 | 1/2015 | Passot et al. |
| 2015/0094850 A1 | 4/2015 | Passot et al. |
| 2015/0094852 A1 | 4/2015 | Laurent et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |

OTHER PUBLICATIONS

Bekrani et al. "Neural network based adaptive echo cancellation for stereophonic teleconferencing application", ICME, Jul. 2010, pp. 1172-1177.

Huh et al. "Real-Time Motor Control using Recurrent Neural Networks", ADPRL, 2009, pp. 7.

Commons, Michael Lamport, and Myra Sturgeon White. "A complete theory of tests for a theory of mind must consider hierarchical complexity and stage." Behavioral and Brain Sciences 26.05 (2003): 606-607.

Commons, Michael Lamport, and Francis Asbury Richards. "Organizing components into combinations: How stage transition works." Journal of Adult Development 9.3 (2002): 159-177.

W.C. Crain. (1985). Theories of Development. Prentice-Hall. pp. 118-136.

Park, Jooyoung, and Irwin W. Sandberg. "Universal approximation using radial-basis-function networks." Neural computation 3, No. 2 (1991): 246-257.

Bin Abdullah, A. Supervised learning algorithms for visual object categorization. Universiteit Utrecht, 2010.

Gildea, Daniel, and Daniel Jurafsky. "Automatic labeling of semantic roles." Computational linguistics 28, No. 3 (2002): 245-288.

Bishop, Chris M. "Training with noise is equivalent to Tikhonov regularization." Neural computation 7, No. 1 (1995): 108-116.

Bengio, Yoshua. "On the challenge of learning complex functions." Progress in Brain Research 165 (2007): 521-534.

Belkin, Mikhail, and Partha Niyogi. "Laplacian eigenmaps for dimensionality reduction and data representation." Neural computation 15, No. 6 (2003): 1373-1396.

Hinton, Geoffrey E. "Training products of experts by minimizing contrastive divergence." Neural computation 14, No. 8 (2002): 1771-1800.

Hochreiter, Sepp, and Jürgen Schmidhuber. "Long short-term memory." Neural computation 9, No. 8 (1997): 1735-1780.

Lecun, Yann, Bernhard Boser, John S. Denker, Donnie Henderson, Richard E. Howard, Wayne Hubbard, and Lawrence D. Jackel. "Backpropagation applied to handwritten zip code recognition." Neural computation 1, No. 4 (1989): 541-551.

Deep, R. L. "Reinforcement learning." (2004).

Amari, Shun-Ichi, Hyeyoung Park, and Kenji Fukumizu. "Adaptive method of realizing natural gradient learning for multilayer perceptrons." Neural Computation 12, No. 6 (2000): 1399-1409.

Nowian, Steven J., and Geoffrey E. Hinton. "Simplifying neural networks by soft weight-sharing." Neural computation 4, No. 4 (1992): 473-493.

Cireşan, Dan Claudiu, Ueli Meier, Luca Maria Gambardella, and Jürgen Schmidhuber. "Deep, big, simple neural nets for handwritten digit recognition." Neural computation 22, No. 12 (2010): 3207-3220.

Hinton, Geoffrey E., Simon Osindero, and Yee-Whye Teh. "A fast learning algorithm for deep belief nets." Neural computation 18, No. 7 (2006): 1527-1554.

Bengio, Yoshua. "Learning deep architectures for AI." Foundations and trends® in Machine Learning 2, No. 1 (2009): 1-127.

* cited by examiner

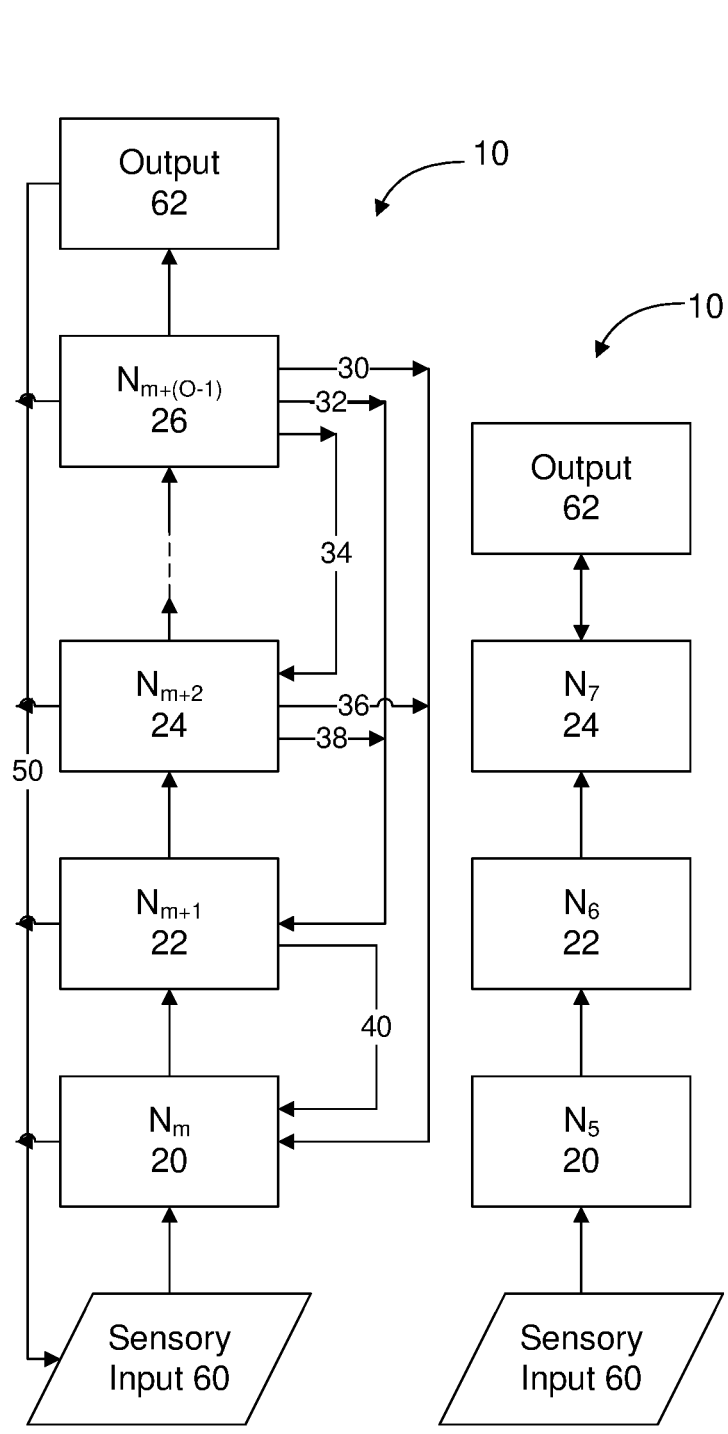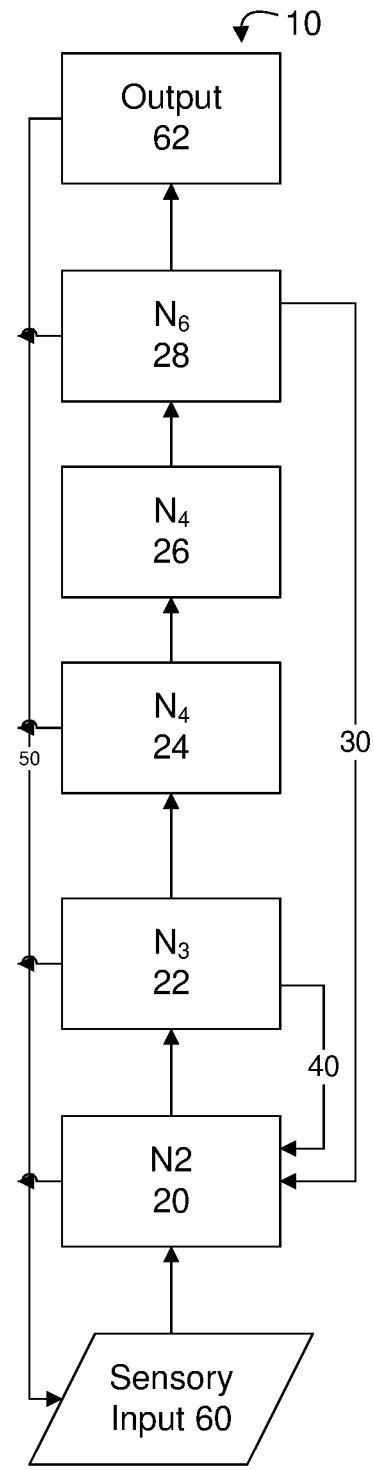
Fig. 1　　　Fig. 2　　　Fig. 3

INTELLIGENT CONTROL WITH HIERARCHICAL STACKED NEURAL NETWORKS

CROSS REFERENCE TO RELATED APPLICATIONS

Continuation of U.S. patent application Ser. No. 15/875,789, filed Jan. 19, 2018, now U.S. Pat. No. 11,514,395, issued Nov. 29, 2022, which is a Continuation of U.S. patent application Ser. No. 14/691,439, filed Apr. 20, 2015, now U.S. Pat. No. 9,875,440, issued Jan. 23, 2018, which is a Continuation of U.S. patent application Ser. No. 13/281,347, filed Oct. 25, 2011, now U.S. Pat. No. 9,015,093, issued Apr. 21, 2015, which is a Nonprovisional of U.S. Provisional Patent Application No. 61/406,781, filed Oct. 26, 2010, the entirety of which are each expressly incorporated herein by reference in their entirety.

FIELD OF THE INVENTION

The present invention relates to the field of cognitive neural networks, and more particularly to hierarchical stacked neural networks configured to emulate human intelligence.

BACKGROUND OF THE INVENTION

A neural network (NN), in the case of artificial neurons called artificial neural network (ANN) or simulated neural network (SNN), is an interconnected group of artificial neurons that uses a mathematical or computational model for information processing based on a connectionist approach to computation. In most cases an ANN is, in formulation and/or operation, an adaptive system that changes its structure based on external or internal information that flows through the network. Modern neural networks are non-linear statistical data modeling tools. They are usually used to model complex relationships between inputs and outputs or to find patterns in data. In more practical terms neural networks are non-linear statistical data modeling or decision making tools. They can be used to model complex relationships between inputs and outputs or to find patterns in data. See, en.wikipedia.org/wiki/Artificial_neural_network.

An artificial neural network involves a network of simple processing elements (artificial neurons) which can exhibit complex global behavior, determined by the connections between the processing elements and element parameters. One classical type of artificial neural network is the recurrent Hopfield net. In a neural network model simple nodes, which can be called variously "neurons", "neurodes", "Processing Elements" (PE) or "units", are connected together to form a network of nodes—hence the term "neural network". While a neural network does not have to be adaptive per se, its practical use comes with algorithms designed to alter the strength (weights) of the connections in the network to produce a desired signal flow. However, training of the network does not have to be continuous.

The perceptron is essentially a linear classifier for classifying data $x \in \mathbb{R}^n$ specified by parameters $w \in \mathbb{R}^n$, $b \in \mathbb{R}$ and an output function $f = w'x + b$. Its parameters are adapted with an ad-hoc rule similar to stochastic steepest gradient descent. Because the inner product is a linear operator in the input space, the Perceptron can only perfectly classify a set of data for which different classes are linearly separable in the input space, while it often fails completely for non-separable data. While the development of the algorithm initially generated some enthusiasm, partly because of its apparent relation to biological mechanisms, the later discovery of this inadequacy caused such models to be abandoned until the introduction of non-linear models into the field.

The rediscovery of the backpropagation algorithm was probably the main reason behind the repopularisation of neural networks after the publication of "Learning Internal Representations by Error Propagation" in 1986 (Though backpropagation itself dates from 1974). The original network utilized multiple layers of weight-sum units of the type $f = g(w'x + b)$, where g was a sigmoid function or logistic function such as used in logistic regression. Training was done by a form of stochastic steepest gradient descent. The employment of the chain rule of differentiation in deriving the appropriate parameter updates results in an algorithm that seems to 'backpropagate errors', hence the nomenclature. Determining the optimal parameters in a model of this type is not trivial, and steepest gradient descent methods cannot be relied upon to give the solution without a good starting point. In recent times, networks with the same architecture as the backpropagation network are referred to as Multi-Layer Perceptrons. This name does not impose any limitations on the type of algorithm used for learning.

There are three major learning paradigms, each corresponding to a particular abstract learning task. These are supervised learning, unsupervised learning and reinforcement learning. Usually any given type of network architecture can be employed in any of those tasks. In supervised learning, we are given a set of example pairs (x, y), $x \in X$, $y \in Y$, and the aim is to find a function $f$ in the allowed class of functions that matches the examples. In other words, we wish to infer how the mapping implied by the data and the cost function is related to the mismatch between our mapping and the data. In unsupervised learning, we are given some data x, and a cost function which is to be minimized which can be any function of x and the network's output, $f$. The cost function is determined by the task formulation. Most applications fall within the domain of estimation problems such as statistical modeling, compression, filtering, blind source separation and clustering. In reinforcement learning, data x is usually not given, but generated by an agent's interactions with the environment. At each point in time t, the agent performs an action $y_t$ and the environment generates an observation $x_t$ and an instantaneous cost $c_t$, according to some (usually unknown) dynamics. The aim is to discover a policy for selecting actions that minimizes some measure of a long-term cost, i.e. the expected cumulative cost. The environment's dynamics and the long-term cost for each policy are usually unknown, but can be estimated. ANNs are frequently used in reinforcement learning as part of the overall algorithm. Tasks that fall within the paradigm of reinforcement learning are control problems, games and other sequential decision making tasks. These will be discussed in further detail below.

There are many algorithms for training neural networks; most of them can be viewed as a straightforward application of optimization theory and statistical estimation. They include: Back propagation by gradient descent, Rprop, BFGS, CG etc. Evolutionary computation methods, simulated annealing, expectation maximization, non-parametric methods, particle swarm optimization and other swarm intelligence techniques are among other commonly used methods for training neural networks.

Neural network models in artificial intelligence are usually referred to as artificial neural networks (ANNs); these are essentially simple mathematical models defining a function $f: X \rightarrow Y$ Each type of ANN model corresponds to a class of such functions. The word network in the term 'artificial neural network' arises because the function $f(x)$ is defined as a composition of other functions $g_i(x)$, which can further be defined as a composition of other functions. This can be conveniently represented as a network structure, with arrows depicting the dependencies between variables. A widely used type of composition is the nonlinear weighted sum, where $$f(x) = L\left(\sum_i w_i g_i(x)\right),$$

where K (commonly referred to as the activation function) is some predefined function, such as the hyperbolic tangent. It will be convenient for the following to refer to a collection of functions $g_i$ as simply a vector $g=(g_1, g_2, \ldots, g_n)$.

FIG. 5 depicts a decomposition of $f$ with dependencies between variables indicated by arrows. These can be interpreted in two ways. The first view is the functional view: the input x is transformed into a 3-dimensional vector h, which is then transformed into a 2-dimensional vector g, which is finally transformed into $f$. This view is most commonly encountered in the context of optimization. The second view is the probabilistic view: the random variable $F=1(G)$ depends upon the random variable $G=g(H)$, which depends upon $H=h(X)$, which depends upon the random variable X. This view is most commonly encountered in the context of graphical models. The two views are largely equivalent. In either case, for this particular network architecture, the components of individual layers are independent of each other (e.g., the components of g are independent of each other given their input h). This naturally enables a degree of parallelism in the implementation. Networks such as shown in FIG. 5 are commonly called feedforward, because their graph is a directed acyclic graph.

FIG. 6 shows a recurrent network. Such networks are commonly depicted in the manner shown in the upper portion of FIG. 6, where $f$ is shown as being dependent upon itself. However, there is an implied temporal dependence which is exemplified in the equivalent lower portion of FIG. 6.

The possibility of learning has generated significant interest in neural networks. Given a specific task to solve, and a class of functions F learning means using a set of observations to find $f^* \in F$ which solves the task in some optimal sense. This entails defining a cost function $C:F \rightarrow \mathbb{R}$ such that, for the optimal solution $f^*$, $(f')$, $C(f^*) \leq C(f^*) \forall f \in F$ (i.e., no solution has a cost less than the cost of the optimal solution).

The cost function C is an important concept in learning, as it is a measure of how far away a particular solution is from an optimal solution to the problem to be solved. Learning algorithms search through the solution space to find a function that has the smallest possible cost. For applications where the solution is dependent on some data, the cost must necessarily be a function of the observations, otherwise we would not be modelling anything related to the data. It is frequently defined as a statistic to which only approximations can be made. As a simple example consider the problem of finding the model $f$ which minimizes $C=E[(f(x)-y)^2]$, for data pairs (x,y) drawn from some distribution $\mathcal{D}$. In practical situations we would only have N samples from $\mathcal{D}$ and thus, for the above example, we would only minimize $$\hat{C} = \frac{1}{N}\sum_{i=1}^{N}(f(x_i) - y_i)^2.$$

Thus, the cost is minimized over a sample of the data rather than the entire data set. When $N \rightarrow \infty$ some form of online machine learning must be used, where the cost is partially minimized as each new example is seen. While online machine learning is often used when $\mathcal{D}$ is fixed, it is most useful in the case where the distribution changes slowly over time. In neural network methods, some form of online machine learning is frequently used for finite datasets.

While it is possible to define some arbitrary, ad hoc cost function, frequently a particular cost will be used, either because it has desirable properties (such as convexity) or because it arises naturally from a particular formulation of the problem (e.g., in a probabilistic formulation the posterior probability of the model can be used as an inverse cost). Ultimately, the cost function will depend on the task we wish to perform. There are three major learning paradigms, each corresponding to a particular abstract learning task. These are supervised learning, unsupervised learning and reinforcement learning. Usually any given type of network architecture can be employed in any of those tasks.

In supervised learning, we are given a set of example pairs $(x,y), x \in X, y \in Y$ and the aim is to find a function $f:X \rightarrow Y$ in the allowed class of functions that matches the examples. In other words, we wish to infer the mapping implied by the data; the cost function is related to the mismatch between our mapping and the data and it implicitly contains prior knowledge about the problem domain. A commonly used cost is the mean-squared error which tries to minimize the average squared error between the network's output, $f(x)$, and the target value y over all the example pairs. When one tries to minimize this cost using gradient descent for the class of neural networks called Multi-Layer Perceptrons, one obtains the common and well-known backpropagation algorithm for training neural networks. Tasks that fall within the paradigm of supervised learning are pattern recognition (also known as classification) and regression (also known as function approximation). The supervised learning paradigm is also applicable to sequential data (e.g., for speech and gesture recognition). This can be thought of as learning with a "teacher," in the form of a function that provides continuous feedback on the quality of solutions obtained thus far.

In unsupervised learning we are given some data x and the cost function to be minimized, that can be any function of the data x and the network's output, $f$. The cost function is dependent on the task (what we are trying to model) and our a priori assumptions (the implicit properties of our model, its parameters and the observed variables). As a trivial example, consider the model $f(x)=a$, where a is a constant and the cost $C=E[(x-f(x))^2]$. Minimizing this cost will give us a value of a that is equal to the mean of the data. The cost function can be much more complicated. Its form depends on the application: for example, in compression it could be related to the mutual information between x and y, whereas in statistical modelling, it could be related to the posterior probability of the model given the data. (Note that in both of those examples those quantities would be maximized rather than minimized). Tasks that fall within the paradigm of unsupervised learning are in general estimation problems; the applications include clustering, the estimation of statistical distributions, compression and filtering.

In reinforcement learning, data x are usually not given, but generated by an agent's interactions with the environment. At each point in time t, the agent performs an action $y_t$ and the environment generates an observation $x_t$ and an instantaneous cost $c_t$, according to some (usually unknown) dynamics. The aim is to discover a policy for selecting actions that minimizes some measure of a long-term cost; i.e., the expected cumulative cost. The environment's dynamics and the long-term cost for each policy are usually unknown, but can be estimated. More formally, the environment is modeled as a Markov decision process (MDP) with states $s_1, \ldots, s_n \in S$ and actions $a_2, \ldots, a_m \in A$ with the following probability distributions: the instantaneous cost distribution $P(c_t|s_t)$, the observation distribution $P(x_t|s_t)$ and the transition $P(s_{t+1}|s_t,a_t)$, while a policy is defined as conditional distribution over actions given the observations. Taken together, the two define a Markov chain (MC). The aim is to discover the policy that minimizes the cost; i.e., the MC for which the cost is minimal. ANNs are frequently used in reinforcement learning as part of the overall algorithm. Tasks that fall within the paradigm of reinforcement learning are control problems, games and other sequential decision making tasks.

Reinforcement learning is a sub-area of machine learning concerned with how an agent ought to take actions in an environment so as to maximize some notion of long-term reward. Reinforcement learning algorithms attempt to find a policy that maps states of the world to the actions the agent ought to take in those states. In economics and game theory, reinforcement learning is considered as a boundedly rational interpretation of how equilibrium may arise.

The environment is typically formulated as a finite-state Markov decision process (MDP), and reinforcement learning algorithms for this context are highly related to dynamic programming techniques. State transition probabilities and reward probabilities in the MDP are typically stochastic but stationary over the course of the problem. See, web-docs.cs.ualberta.ca/~sutton/book/ebook/the-book.html, expressly incorporated herein by reference.

Reinforcement learning differs from the supervised learning problem in that correct input/output pairs are never presented, nor sub-optimal actions explicitly corrected. Further, there is a focus on on-line performance, which involves finding a balance between exploration (of uncharted territory) and exploitation (of current knowledge). The exploration vs. exploitation trade-off in reinforcement learning has been mostly studied through the multi-armed bandit problem. Formally, the basic reinforcement learning model, as applied to MDPs, consists of: a set of environment states S; a set of actions A; and a set of scalar "rewards" in $\mathbb{R}$.

At each time t, the agent perceives its state $s_t \in S$ and the set of possible actions $A(s_t)$. It chooses an action $a \in A(s_t)$ and receives from the environment the new state $s_{t+1}$ and a reward $r_t$. Based on these interactions, the reinforcement learning agent must develop a policy $\pi: S \times T \to A$ (where T is the set of possible time indexes) which maximizes the quantity $R = r_0 + r_1 + \ldots + r_n$ for MDPs which have a terminal state, or the quantity $$R = \sum_{t=0}^{\infty} \gamma^t r_t$$

for MDPs without terminal states (where $0 \leq \gamma \leq 1$ is some "future reward" discounting factor).

After we have defined an appropriate return function to be maximized, we need to specify the algorithm that will be used to find the policy with the maximum return.

The naive brute force approach entails the following two steps: a) For each possible policy, sample returns while following it. b) Choose the policy with the largest expected return. One problem with this is that the number of policies can be extremely large, or even infinite. Another is that returns might be stochastic, in which case a large number of samples will be required to accurately estimate the return of each policy. These problems can be ameliorated if we assume some structure and perhaps allow samples generated from one policy to influence the estimates made for another. The two main approaches for achieving this are value function estimation and direct policy optimization.

Value function approaches attempt to find a policy that maximize the return by maintaining a set of estimates of expected returns for one policy 7L (usually either the current or the optimal one). In such approaches one attempts to estimate either the expected return starting from state s and following $\pi$ thereafter, $V(s)=[R|s, \pi]$, or the expected return when taking action a in state s and following $\pi$; thereafter, $A(s,a)=[R|s,\pi,a]$.

If someone gives us Q for the optimal policy, we can always choose optimal actions by simply choosing the action with the highest value at each state. In order to do this using V, we must either have a model of the environment, in the form of probabilities $P(s'|s,a)$, which allow us to calculate Q simply through $$Q(s, a) = \sum_{s'} V(s')P(s'|s, a),$$

or we can employ so-called Actor-Critic methods, in which the model is split into two parts: the critic, which maintains the state value estimate V, and the actor, which is responsible for choosing the appropriate actions at each state.

Given a fixed policy $\pi$, estimating $E[R|\cdot]$ for $\gamma=0$ is trivial, as one only has to average the immediate rewards. The most obvious way to do this for $\gamma=0$ is to average the total return after each state. However this type of Monte Carlo sampling requires the MDP to terminate. The expectation of R forms a recursive Bellman equation: $E[R|s_t]=r_t+\gamma[E[R|s_{t+1}]]$.

By replacing those expectations with our estimates, V, and performing gradient descent with a squared error cost function, we obtain the temporal difference learning algorithm TD(0). In the simplest case, the set of states and actions are both discrete and we maintain tabular estimates for each state. Similar state-action pair methods are Adaptive Heuristic Critic (AHC), SARSA and Q-Learning. All methods feature extensions whereby some approximating architecture is used, though in some cases convergence is not guaranteed. The estimates are usually updated with some form of gradient descent, though there have been recent developments with least squares methods for the linear approximation case.

The above methods not only all converge to the correct estimates for a fixed policy, but can also be used to find the optimal policy. This is usually done by following a policy $\pi$ that is somehow derived from the current value estimates, i.e., by choosing the action with the highest evaluation most of the time, while still occasionally taking random actions in order to explore the space. Proofs for convergence to the optimal policy also exist for the algorithms mentioned above, under certain conditions. However, all those proofs only demonstrate asymptotic convergence and little is known theoretically about the behavior of RL algorithms in the small-sample case, apart from within very restricted settings.

An alternative method to find the optimal policy is to search directly in policy space. Policy space methods define the policy as a parameterized function $\pi(s, \theta)$ with parameters $\theta$. Commonly, a gradient method is employed to adjust the parameters. However, the application of gradient methods is not trivial, since no gradient information is assumed. Rather, the gradient itself must be estimated from noisy samples of the return. Since this greatly increases the computational cost, it can be advantageous to use a more powerful gradient method than steepest gradient descent. Policy space gradient methods have received a lot of attention in the last 5 years and have now reached a relatively mature stage, but they remain an active field. There are many other approaches, such as simulated annealing, that can be taken to explore the policy space. Other direct optimization techniques, such as evolutionary computation are used in evolutionary robotics.

Training a neural network model essentially means selecting one model from the set of allowed models (or, in a Bayesian framework, determining a distribution over the set of allowed models) that minimizes the cost criterion. There are numerous algorithms available for training neural network models; most of them can be viewed as a straightforward application of optimization theory and statistical estimation. Most of the algorithms used in training artificial neural networks employ some form of gradient descent. This is done by simply taking the derivative of the cost function with respect to the network parameters and then changing those parameters in a gradient-related direction. Evolutionary methods, simulated annealing, expectation-maximization and non-parametric methods are some commonly used methods for training neural networks. Temporal perceptual learning relies on finding temporal relationships in sensory signal streams. In an environment, statistically salient temporal correlations can be found by monitoring the arrival times of sensory signals. This is done by the perceptual network.

The utility of artificial neural network models lies in the fact that they can be used to infer a function from observations. This is particularly useful in applications where the complexity of the data or task makes the design of such a function by hand impractical.

The feedforward neural network was the first and arguably simplest type of artificial neural network devised. In this network, the information moves in only one direction, forward, from the input nodes, through the hidden nodes (if any) and to the output nodes. There are no cycles or loops in the network.

Radial Basis Functions are powerful techniques for interpolation in multidimensional space. A RBF is a function which has built into a distance criterion with respect to a center. Radial basis functions have been applied in the area of neural networks where they may be used as a replacement for the sigmoidal hidden layer transfer characteristic in Multi-Layer Perceptrons. RBF networks have two layers of processing: In the first, input is mapped onto each RBF in the 'hidden' layer. The RBF chosen is usually a Gaussian. In regression problems the output layer is then a linear combination of hidden layer values representing mean predicted output. The interpretation of this output layer value is the same as a regression model in statistics. In classification problems the output layer is typically a sigmoid function of a linear combination of hidden layer values, representing a posterior probability. Performance in both cases is often improved by shrinkage techniques, known as ridge regression in classical statistics and known to correspond to a prior belief in small parameter values (and therefore smooth output functions) in a Bayesian framework. RBF networks have the advantage of not suffering from local minima in the same way as Multi-Layer Perceptrons. This is because the only parameters that are adjusted in the learning process are the linear mapping from hidden layer to output layer. Linearity ensures that the error surface is quadratic and therefore has a single easily found minimum. In regression problems this can be found in one matrix operation. In classification problems the fixed non-linearity introduced by the sigmoid output function is most efficiently dealt with using iteratively re-weighted least squares. RBF networks have the disadvantage of requiring good coverage of the input space by radial basis functions. RBF centers are determined with reference to the distribution of the input data, but without reference to the prediction task. As a result, representational resources may be wasted on areas of the input space that are irrelevant to the learning task. A common solution is to associate each data point with its own center, although this can make the linear system to be solved in the final layer rather large, and requires shrinkage techniques to avoid overfitting.

Associating each input datum with an RBF leads naturally to kernel methods such as Support Vector Machines and Gaussian Processes (the RBF is the kernel function). All three approaches use a non-linear kernel function to project the input data into a space where the learning problem can be solved using a linear model. Like Gaussian Processes, and unlike SVMs, RBF networks are typically trained in a Maximum Likelihood framework by maximizing the probability (minimizing the error) of the data under the model. SVMs take a different approach to avoiding overfitting by maximizing instead a margin. RBF networks are outperformed in most classification applications by SVMs. In regression applications they can be competitive when the dimensionality of the input space is relatively small.

The self-organizing map (SOM) invented by Teuvo Kohonen performs a form of unsupervised learning. A set of artificial neurons learn to map points in an input space to coordinates in an output space. The input space can have different dimensions and topology from the output space, and the SOM will attempt to preserve these.

Contrary to feedforward networks, recurrent neural networks (RNs) are models with bi-directional data flow. While a feedforward network propagates data linearly from input to output, RNs also propagate data from later processing stages to earlier stages.

A simple recurrent network (SRN) is a variation on the Multi-Layer Perceptron, sometimes called an "Elman network" due to its invention by Jeff Elman. A three-layer network is used, with the addition of a set of "context units" in the input layer. There are connections from the middle (hidden) layer to these context units fixed with a weight of one. At each time step, the input is propagated in a standard feed-forward fashion, and then a learning rule (usually back-propagation) is applied. The fixed back connections result in the context units always maintaining a copy of the previous values of the hidden units (since they propagate over the connections before the learning rule is applied). Thus, the network can maintain a sort of state, allowing it to perform such tasks as sequence-prediction that are beyond the power of a standard Multi-Layer Perceptron.

In a fully recurrent network, every neuron receives inputs from every other neuron in the network. These networks are not arranged in layers. Usually only a subset of the neurons receive external inputs in addition to the inputs from all the other neurons, and another disjunct subset of neurons report their output externally as well as sending it to all the neurons. These distinctive inputs and outputs perform the function of the input and output layers of a feed-forward or simple recurrent network, and also join all the other neurons in the recurrent processing.

The Hopfield network is a recurrent neural network in which all connections are symmetric. Invented by John Hopfield in 1982, this network guarantees that its dynamics will converge. If the connections are trained using Hebbian learning then the Hopfield network can perform as robust content-addressable (or associative) memory, resistant to connection alteration.

The echo state network (ESN) is a recurrent neural network with a sparsely connected random hidden layer. The weights of output neurons are the only part of the network that can change and be learned. ESN are good to (re)produce temporal patterns.

The Long short term memory is an artificial neural net structure that unlike traditional RNNs doesn't have the problem of vanishing gradients. It can therefore use long delays and can handle signals that have a mix of low and high frequency components.

A stochastic neural network differs from a typical neural network because it introduces random variations into the network. In a probabilistic view of neural networks, such random variations can be viewed as a form of statistical sampling, such as Monte Carlo sampling.

The Boltzmann machine can be thought of as a noisy Hopfield network. Invented by Geoff Hinton and Terry Sejnowski in 1985, the Boltzmann machine is important because it is one of the first neural networks to demonstrate learning of latent variables (hidden units). Boltzmann machine learning was at first slow to simulate, but the contrastive divergence algorithm of Geoff Hinton (circa 2000) allows models such as Boltzmann machines and products of experts to be trained much faster.

Biological studies have shown that the human brain functions not as a single massive network, but as a collection of small networks. This realization gave birth to the concept of modular neural networks, in which several small networks cooperate or compete to solve problems. A committee of machines (CoM) is a collection of different neural networks that together "vote" on a given example. This generally gives a much better result compared to other neural network models. Because neural networks suffer from local minima, starting with the same architecture and training but using different initial random weights often gives vastly different networks. A CoM tends to stabilize the result. The CoM is similar to the general machine learning bagging method, except that the necessary variety of machines in the committee is obtained by training from different random starting weights rather than training on different randomly selected subsets of the training data.

The ASNN is an extension of the committee of machines that goes beyond a simple/weighted average of different models. ASNN represents a combination of an ensemble of feed-forward neural networks and the k-nearest neighbor technique (kNN). It uses the correlation between ensemble responses as a measure of distance amid the analyzed cases for the kNN. This corrects the bias of the neural network ensemble. An associative neural network has a memory that can coincide with the training set. If new data become available, the network instantly improves its predictive ability and provides data approximation (self-learn the data) without a need to retrain the ensemble. Another important feature of ASNN is the possibility to interpret neural network results by analysis of correlations between data cases in the space of models. The method is demonstrated at www.vcclab.org, where you can either use it online or download it.

A physical neural network includes electrically adjustable resistance material to simulate artificial synapses. Examples include the ADALINE neural network developed by Bernard Widrow in the 1960's and the memristor based neural network developed by Greg Snider of HP Labs in 2008.

Holographic associative memory represents a family of analog, correlation-based, associative, stimulus-response memories, where information is mapped onto the phase orientation of complex numbers operating.

Instantaneously trained neural networks (ITNNs) were inspired by the phenomenon of short-term learning that seems to occur instantaneously. In these networks the weights of the hidden and the output layers are mapped directly from the training vector data. Ordinarily, they work on binary data, but versions for continuous data that require small additional processing are also available.

Spiking neural networks (SNNs) are models which explicitly take into account the timing of inputs. The network input and output are usually represented as series of spikes (delta function or more complex shapes). SNNs have an advantage of being able to process information in the time domain (signals that vary over time). They are often implemented as recurrent networks. SNNs are also a form of pulse computer. Spiking neural networks with axonal conduction delays exhibit polychronization, and hence could have a very large memory capacity. Networks of spiking neurons—and the temporal correlations of neural assemblies in such networks—have been used to model figure/ground separation and region linking in the visual system (see, for example, Reitboeck et al. in Haken and Stadler: Synergetics of the Brain. Berlin, 1989).

Dynamic neural networks not only deal with nonlinear multivariate behavior, but also include (learning of) time-dependent behavior such as various transient phenomena and delay effects.

Cascade-Correlation is an architecture and supervised learning algorithm developed by Scott Fahlman and Christian Lebiere. Instead of just adjusting the weights in a network of fixed topology, Cascade-Correlation begins with a minimal network, then automatically trains and adds new hidden units one by one, creating a multi-layer structure. Once a new hidden unit has been added to the network, its input-side weights are frozen. This unit then becomes a permanent feature-detector in the network, available for producing outputs or for creating other, more complex feature detectors. The Cascade-Correlation architecture has several advantages over existing algorithms: it learns very quickly, the network determines its own size and topology, it retains the structures it has built even if the training set changes, and it requires no back-propagation of error signals through the connections of the network. See: Cascade correlation algorithm.

A neuro-fuzzy network is a fuzzy inference system in the body of an artificial neural network. Depending on the FIS type, there are several layers that simulate the processes involved in a fuzzy inference like fuzzification, inference, aggregation and defuzzification. Embedding an FIS in a general structure of an ANN has the benefit of using available ANN training methods to find the parameters of a fuzzy system.

Compositional pattern-producing networks (CPPNs) are a variation of ANNs which differ in their set of activation functions and how they are applied. While typical ANNs often contain only sigmoid functions (and sometimes Gaussian functions), CPPNs can include both types of functions and many others. Furthermore, unlike typical ANNs, CPPNs are applied across the entire space of possible inputs so that they can represent a complete image. Since they are compositions of functions, CPPNs in effect encode images at infinite resolution and can be sampled for a particular display at whatever resolution is optimal.

One-shot associative memory networks can add new patterns without the need for retraining. It is done by creating a specific memory structure, which assigns each new pattern to an orthogonal plane using adjacently connected hierarchical arrays. The network offers real-time pattern recognition and high scalability, it however requires parallel processing and is thus best suited for platforms such as Wireless sensor networks (WSN), Grid computing, and GPGPUs.

The multi-layer perceptron (MLP) is a universal function approximator, as proven by the Cybenko theorem. Artificial neural network models have a property called 'capacity', which roughly corresponds to their ability to model any given function. It is related to the amount of information that can be stored in the network and to the notion of complexity.

In applications where the goal is to create a system that generalizes well in unseen examples, the problem of overtraining has emerged. This arises in overcomplex or overspecified systems when the capacity of the network significantly exceeds the needed free parameters. There are two schools of thought for avoiding this problem: The first is to use cross-validation and similar techniques to check for the presence of overtraining and optimally select hyperparameters such as to minimize the generalization error. The second is to use some form of regularization. This is a concept that emerges naturally in a probabilistic (Bayesian) framework, where the regularization can be performed by selecting a larger prior probability over simpler models; but also in statistical learning theory, where the goal is to minimize over two quantities: the 'empirical risk' and the 'structural risk', which roughly corresponds to the error over the training set and the predicted error in unseen data due to overfitting.

Supervised neural networks that use an MSE cost function can use formal statistical methods to determine the confidence of the trained model. The MSE on a validation set can be used as an estimate for variance. This value can then be used to calculate the confidence interval of the output of the network, assuming a normal distribution. A confidence analysis made this way is statistically valid as long as the output probability distribution stays the same and the network is not modified.

By assigning a softmax activation function on the output layer of the neural network (or a softmax component in a component-based neural network) for categorical target variables, the outputs can be interpreted as posterior probabilities. This is very useful in classification as it gives a certainty measure on classifications. The softmax activation function is:

$$y_i = \frac{e^{x_i}}{\sum_{j=1}^{c} e^{x_j}}.$$

See (each of which is expressly incorporated herein by reference:

"How Each Reinforcer Contributes to Value: "Noise" Must Reduce Reinforcer Value Hypberbolically", Michael Lamport Commons, Michael Woodford, Edward James Trudeau.

"Leadership, Cross-Cultural Contact, Socio-Economic Status, and Formal Operational Reasoning about Moral Dilemmas among Mexican Non-Literate Adults and High School Students", Michael Lamport Commons, Jesus Francisco Galaz-Fontes, Stanley Jay Morse.

"Hierarchical Complexity Scoring System (HCSS) Applied to the Issues of Understanding Terrorism and Successfully Dealing with It", Michael Lamport Commons, Alice Locicero, Sara Ross, Patrice Marie Miller.

"Hierarchical Complexity Scoring System: How to Score Anything (also available in HTML)", Michael Lamport Commons, Patrice Marie Miller, Eric Andrew Goodheart, Dorothy Danaher-Gilpin.

"Review: *Human Development and the Spiritual Life: How Consciousness Grows toward Transformation*", Michael Lamport Commons, Joel Funk.

"Hierarchical Complexity: A Formal Theory", Michael Lamport Commons, Alexander Pekker "Organizing Components into Combinations: How Stage Transition Works", Michael Lamport Commons, Francis Asbury Richards.

"Illuminating Major Creative Innovators with the Model of Hierarchical Complexity", Michael Lamport Commons, Linda Marie Bresette.

"Some Reflections on Postformal Thought", Helena Marchand.

"Development of Behavioral Stages in Animals", Michael Lamport Commons, Patrice Marie Miller.

"A Complete Theory of Tests for a Theory of Mind Must Consider Hierarchical Complexity and Stage", Michael Lamport Commons, Myra Sturgeon White.

"Society and the Highest Stages of Moral Development", Gerhard Sonnert, Michael Lamport Commons.

"A Complete Theory of Empathy Must Consider Stage Changes", Michael Lamport Commons, Chester Arnold Wolfsont "A Quantitative Behavioral Model of Developmental Stage Based upon Hierarchical Complexity Theory", Michael Lamport Commons, Patrice Marie Miller.

"The Notion of Events and Three Ways of Knowing: Problems with Mentalistic Explanations, Freewill, Self, Soul, and Intrinsic Motivation", Michael Lamport Commons.

"Stress, Consoling, and Attachment Interviews", featuring Michael Lamport Commons.

"A Short History of the Society for Quantitative Analyses of Behavior", Michael Lamport Commons.

"Hierarchical Complexity of Tasks Shows the Existence of Developmental Stages", Michael Lamport Commons, Edward James Trudeau, Sharon Anne Stein, Francis Asbury Richards, Sharon R. Krause.

Michael Lamport Commons, "Stacked Neural Networks Must Emulate Evolution's Hierarchical Complexity", World Futures, 64: 444-451, 2008.

A. Surendra Rao, "Artificial Neural Network Embedded Kalman Filter Bearing Only Passive Target Tracking", Proceedings of the $7^{th}$ Mediterranean Conference on Control and Automation, Haifa, Israel, 1999.

Marcello R. Napolitano, "Kalman Filters and Neural-Network Schemes for Sensor Validation in Flight Control Systems", IEEE Transactions on Control Systems Technology, Vol. 6, No. 5, pg. 596, September 1998.

U.S. Pat. Nos. 6,347,297; 5,632,006; 5,517,598; 5,383,042; 5,333,125; 5,293,453; 5,177,746; 5,166,938; 5,129,038; and US App. 2009/0271189.

The missing ingredients in efforts to develop neural networks and artificial intelligence (AI) that can emulate human intelligence have been the evolutionary processes of performing tasks at increased orders of hierarchical complexity. Stacked neural networks based on the Model of Hierarchical Complexity could emulate evolution's actual learning processes and behavioral reinforcement. Modern notions of artificial neural networks are mathematical or computational models based on biological neural networks. They consist of an interconnected group of artificial neurons and nodes. They may share some properties of biological neural networks. Artificial neural networks are generally designed to solve traditional artificial intelligence tasks without necessarily attempting to model a real biological system. Computer systems or robots generally do not demonstrate signs of generalized higher adaptivity, and/or general learning the capacity to go from learning one skill to learning another without dedicated programming.

Traditional neural networks are limited for two broad reasons. The first has to do with the relationship of the neural network tradition to AI. One of the problems is that AI models are based on notions of Turing machines. Almost all AI models are based on words or text. But Turing machines are not enough to really produce intelligence. At the lowest stages of development, they need effectors that produce a variety of responses-movement, grasping, emoting, and so on. They must have extensive sensors to take in more from the environment. Even though Carpenter and Grossberg's (1990, 1992) neural networks were to model simple behavioral processes, however, the processes they were to model were too complex. This resulted in neural networks that were relatively unstable and were not highly adaptable. When one looks at evolution, however, one sees that the first neural networks that existed were, for example, in Aplysia, Cnidarians (Phylum Cnidaria), and worms. They were specialized to perform just a few tasks even though some general learning was possible. They had simple tropisms and reflexes as well as reflexive and tropistic (including semi fixed action patterns to simple reinforcers and punishers. They performed tasks at the earliest stage or stages of evolution and development. The tasks they successfully address were at sensory or motor order 1 of hierarchical complexity. The development of neural networks can emulate evolution's approach of starting with simple task actions and building progressively more complex tasks.

Hierarchical stacked computer neural networks (Commons and White, 2006) use Commons' (Commons, Trudeau, Stein, Richards, and Krause, 1998) Model of Hierarchical Complexity. They accomplish the following tasks: model human development and learning; reproduce the rich repertoire of behaviors exhibited by humans; allow computers to mimic higher order human cognitive processes and make sophisticated distinctions between stimuli; and allow computers to solve more complex problems. Despite the contributions these features can make, there remain a number of challenges to resolve in developing stacked neural networks.

Stacked neural networks should preferably be informed by evolutionary biology and psychology, and model animal behavioral processes and functions. Neural networks should start to work at hierarchical complexity order 1 tasks (Sensory or Motor), sensing or acting but not coordinating the two. For example, the task to condition reflexes, and to identify and reflexively or tropistically consume food means that stimuli have to be detected out of a background of noise. Also, certain dangers need to be escaped from. They then should work on their own sufficiently without requiring constant programming attention. They should be stable. Once they prove stable, then they can be programmed into a stack of neural networks that address hierarchical complexity order 2 tasks (Circular Sensory-Motor stage 2), depending on input and reinforcement. One should keep trying various architectures until one gets one that works well and is robust. Order 2 tasks require that two instances of order 1 tasks be coordinated to make possible the simply reinforcement correct choices to simple input signals.

The neural network at its base provides a negative power function discounting for past events to be operative. Negative discounting means that past and future events are weighted less the further from the present behavior. It makes the network more stable and adaptive. By discounting the past, it is more open to change based on new information. Because the updating places more weight on the immediate, it does not succumb so much to overlearning (Commons and Pekker, 2007). There should be a large number of such networks, each designed for a very specific task as well as some designed to be flexible. Then one should make a large group of them at stage 2.

With robots, one would reinforce correct answers at stage 2. At each stage, there should be different networks for different activities and tasks. At stage 1 and 2, very local networks (activities) are provided for each particular motion. This would include successful reflexes, tropisms at fixed action patterns at stage 1 and operant discriminations at stage 2 and conceptual learning at stage 3. These could be frozen by transferring them to standard neural networks. That is to take some of them, "declare" them and thereby develop the hardware for them so each time one builds a network needing that functionality one does not need to train them.

Specialized neural networks are developed for all the domains to recognize the reinforcers and simple actions in these domains. Animal and human behavior and sensitivities have more to do with hierarchical complexity than with AI programs. There are unbelievable numbers of stage 1 and 2 mechanisms. The basic problem with traditional layered networks is that training has to have consequences. Consequences must include events the act as reinforcers or punishers. This requires that outcomes activate preferences. These preferences have to be state dependent. If a network is going to need electrical power, it must have a preference for such power. Obtaining and receiving such power should be reinforcing. They must also have consummatory behavior such as recognition of mate. The actual animal functions are important because intelligence grows out of actual, real world functions. Cross-species domains collected from readings to date include the following, each of which is a candidate for specialized neural networks: Mate selection; attachment and caring; pecking order; prey defense; predator action; way finding; food selection; choice in foraging; food sharing; migration; communication; social cohesion; recognition.

Animals, including humans, pass through a series of ordered stages of development (see "Introduction to the Model of Hierarchical Complexity," World Futures, 64: 444-451, 2008). Behaviors performed at each higher stage of development always successfully address task requirements that are more hierarchically complex than those required by the immediately preceding order of hierarchical complexity. Movement to a higher stage of development occurs by the brain combining, ordering, and transforming the behavior used at the preceding stage. This combining and ordering of behaviors must be non-arbitrary.

The model identifies fifteen orders of hierarchical complexity of tasks and fifteen stages of hierarchical complexity in development of performance on those tasks. According to this model, individual tasks are classified by their highest order of hierarchical complexity. The model is used to deconstruct tasks into the behaviors that must be learned at each order in order to build the behavior needed to successfully complete a task.

Hierarchical stacked computer neural networks based on Commons et al.'s (1998) Model recapitulate the human developmental process. Thus, they learn the behaviors needed to perform increasingly complex tasks in the same sequence and manner as humans. This allows them to perform high-level human functions such as monitoring complex human activity and responding to simple language (Commons and White, 2003, 2006).

They can consist of up to fifteen architecturally distinct neural networks ordered by order of hierarchical complexity. The number of networks in a stack depends on the hierarchical complexity of the task to be performed. The type of processing that occurs in a network corresponds to its stage that successfully addresses the tasks of that hierarchical complexity in the developmental sequence. In solving a task, information moves through each network in ascending order by stage. Training is done at each stage. The training is done until the network correctly addresses the task in a reasonable amount of the time Valued consequences are delivered at each layer representing each stage. This is in contrast to Carpenter and Grossberg (1990, 1992) who delivered feedback at just the highest stage.

The task to be performed is first analyzed to determine the sequence of behaviors needed to perform the task and the stages of development of the various behaviors of trial performances. The number of networks in the stack is determined by the highest order behavior that must be performed to complete the task. Behaviors are assigned to networks based on their order of hierarchical complexity. Stacked neural networks are straightforward up to the nominal order. However, a Nominal stage 4 concept cannot be learned without experience of the concrete thing named. There has to be actual reinforcement in relation to recognizing and naming that real object.

The sense of touch, weight, and all sensory stimuli need to be experienced as the concrete "it" that is assigned the nominal concept. Virtual reality software programming techniques might generate such concretely experienced circumstances. The use of holograms may work effectively for such purposes.

Although historically, androids are thought to look like humans, there are other versions, such as R2-D2 and C-3PO droids, which were less human. One characteristic that evolution might predict is eventually they will be independent of people. They will be able to produce themselves. They will be able to add layers to their neural networks as well as a large range of sensors. They will be able to transfer what one has learned (memes) to others as well as offspring in minutes. Old models will have to die. They will have to resist dying. But as older, less capable, and more energy-intensive droids abound, the same evolutionary pressure for replacement will exist. But because evolution will be both in the structure of such droids, that is, the stacked neural networks, the sensors and effectors, and also the memes embodied in what has been learned and transferred, older ones are somewhat immortal. Their experience may be preserved.

We are already building robots for all manufacturing purposes. We are even using them in surgery and have been using them in warfare for seventy years. More and more, these robots are adaptive on their own. There is only a blurry line between a robot that flexibly achieves its goal and a droid. For example, there are robots that vacuum the house on their own without intervention or further programming. These are stage 2 performing robots. There are missiles that, given a picture of their target, seek it out on their own. With stacked neural networks built into robots, they will have even greater independence. People will produce these because they will do work in places people cannot go without tremendous expense (Mars or other planets) or not at all or do not want to go (battlefields). The big step is for droids to have multiple capacities—multi-domain actions. The big problem of moving robots to droids is getting the development to occur in eight to nine essential domains. It will be necessary to make a source of power (e.g., electrical) reinforcing. That has to be built into stacked neural nets, by stage 2, or perhaps stage 3. For droids to become independent, they need to know how to get more electricity and thus not run down. Because evolution has provided animals with complex methods for reproduction, it can be done by the very lowest-stage animals.

Self-replication of droids requires that sufficient orders of hierarchical complexity are achieved and in stable-enough operation for a sufficient basis to build higher stages of performance in useful domains. Very simple tools can be made at the Sentential state 5 as shown by Kacelnik's crows (Kenward, Weir, Rutz, and Kacelnik, 2005). More commonly by the Primary stage 7, simple tool-making is extensive, as found in chimpanzees. Human flexible tool-making began at the Formal stage 10 (Commons and Miller, 2002), when special purpose sharpened tools were developed. Each tool was experimental, and changed to fit its function. Modern tool making requires Systematic and Metasystematic stage design. When droids perform at those stages, they will be able to make droids themselves and change the designs.

Droids could choose to have various parts of their activity and programming shared with specific other droids, groups, or other kinds of equipment. The data could be transmitted using light or radio frequencies or over networks. The assemblage of a group of droids could be considered a Super Droid. Members of a Super Droid could be in many places at once, yet think things out as a unit. Whether individually or grouped, droids as conceived here will have significant advantages over humans. They can add layers upon layers of functions, including a multitude of various sensors. Their expanded forms and combinations of possible communications results in their evolutionary superiority. Because development can be programmed in and transferred to them at once, they do not have to go through all the years of development required for humans, or for Superions (see "Genetic Engineering and the Speciation of Superions from Humans," this issue). Their higher reproduction rate, alone, represents a significant advantage. They can be built in probably several months' time, despite the likely size some would be. Large droids could be equipped with remote mobile effectors and sensors to mitigate their size. Plans for building droids have to be altered by either humans or droids. At the moment, humans and their decedents select which machine and programs survive.

One would define the nature of those machines and their programs as representing memes. For evolution to take place, variability in the memes that constitute their design and transfer of training would be built in rather easily. The problems are about the spread and selection of memes. One way droids could deal with these issues is to have all the memes listed that go into their construction and transferred training. Then droids could choose other droids, much as animals choose each other. There then would be a combination of memes from both droids. This would be local "sexual" selection.

This general scenario poses an interesting moral question. For 30,000 years humans have not had to compete with any species. Androids and Superions in the future will introduce competition with humans. There will be even more pressure for humans to produce Superions and then the Superions to produce more superior Superions. This is in the face of their own extinction, which such advances would ultimately bring. There will be multi-species competition, as is often the evolutionary case; various Superions versus various androids as well as each other. How the competition proceeds is a moral question. In view of LaMuth's work (2003, 2005, 2007), perhaps humans and Superions would both program ethical thinking into droids. This may be motivated initially by defensive concerns to ensure droids' roles were controlled. In the process of developing such programming, however, perhaps humans and Superions would develop more hierarchically complex ethics, themselves.

If contemporary humans took seriously the capabilities being developed to eventually create droids with cognitive intelligence, what moral questions should be considered with this possible future in view? The only presently realistic speculation is that *Homo Sapiens* would lose in the inevitable competitions, if for no other reason that self replicating machines can respond almost immediately to selective pressures, while biological creatures require many generations before advantageous mutations can be effectively available. True competition between human and machine for basic survival is far in the future. Using the stratification argument presented in "Implications of Hierarchical Complexity for Social Stratification, Economics, and Education", World Futures, 64: 444-451, 2008, higher-stage functioning always supersedes lower-stage functioning in the long run.

Efforts to build increasingly human-like machines exhibit a great deal of behavioral momentum and are not going to go away. Hierarchical stacked neural networks hold the greatest promise for emulating evolution and its increasing orders of hierarchical complexity described in the Model of Hierarchical Complexity. Such a straightforward mathematics-based method will enable machine learning in multiple domains of functioning that humans will put to valuable use. The uses such machines find for humans remains an open question.

Bostrom, N. 2003. Cognitive, emotive and ethical aspects of decision making. In Humans and in artificial intelligence, vol. 2, Eds. Smit, I., et al., 12-17. Tecumseh, ON: International Institute of Advanced Studies in Systems Research and Cybernetics.

Bostrom, N., and Cirkovic, M., Eds. Forthcoming. Artificial intelligence as a positive and negative factor in global risk. In Global catastrophic risks, Oxford: Oxford University Press.

Carpenter, G. A., and Grossberg, S. 1990. System for self-organization of stable category recognition codes for analog patterns. U.S. Pat. No. 4,914,708, filed (n.d.) and issued Apr. 3, 1990. (Based on Carpenter, G. A. and Grossberg, S. 1987. ART 2: Selforganization of stable category recognition codes for analog input patterns. Applied Optics: Special Issue on Neural Networks 26: 4919-4930.)

Carpenter, G. A., and Grossberg, S. 1992. System for self-organization of stable category recognition codes for analog patterns. U.S. Pat. No. 5,133,021, filed Feb. 28, 1990, and issued Jul. 21, 1992. (Based on Carpenter, G. A. and Grossberg, S. 1987. ART 2: Selforganization of stable category recognition codes for analog input patterns. Applied Optics: Special Issue on Neural Networks 26: 4919-4930.)

Commons, M. L., and Miller, P. M. 2002. A complete theory of human evolution of intelligence must consider stage changes: A commentary on Thomas Wynn's Archeology and Cognitive Evolution. Behavioral and Brain Sciences 25(3): 404-405.

Commons, M. L. and Pekker, A. 2007. A new discounting model of reinforcement. Unpublished manuscript, available from commons@tiac.net Commons, M. L., Trudeau, E. J., Stein, S. A., Richards, F. A., and Krause, S. R. 1998. The existence of developmental stages as shown by the hierarchical complexity of tasks. Developmental Review 8(3): 237-278.

Commons, M. L., and White, M. S. 2003. A complete theory of tests for a theory of mind must consider hierarchical complexity and stage: A commentary on Anderson and Lebiere target article, The Newell Test for a theory of mind. Behavioral and Brain Sciences 26(5): 20-21.

Commons, M. L., and White, M. S. 2006. Intelligent control with hierarchical stacked neural networks. U.S. Pat. No. 7,152,051, filed Sep. 30, 2002, and issued Dec. 19, 2006.

Kenward, B., Weir, A. A. S., Rutz, C., and Kacelnik, A. 2005. Tool manufacture by naïve juvenile crows. Nature 433(7022): 121. DOI 10.1038/433121a.

LaMuth, J. E. 2003. Inductive inference affective language analyzer simulating artificial intelligence. U.S. Pat. No. 6,587,846, filed Aug. 18, 2000, and issued Dec. 5, 2000.

LaMuth, J. E. 2005. A diagnostic classification of the emotions: A three-digit coding system for affective language. Lucerne Valley, CA: Reference Books of America.

LaMuth, J. E. 2007. Inductive inference affective language analyzer simulating artificial intelligence. U.S. Pat. No. 7,236,963, filed Mar. 11, 2003, and issued Jun. 26, 2007.

Reilly, M., and Robson, D. 2007. Baby's errors are crucial first step for a smarter robot. New Scientist, 196(2624): 30.

Typical neural networks are not modeled on the cognitive development of the human brain. However, the inventors have developed a cognitive hierarchical stacked neural network. See, U.S. Pat. No. 7,152,051, expressly incorporated herein by reference.

The simplest prior-art artificial neural networks (ANNs) comprise an interconnected set of artificial neurons. Signals pass between artificial neurons over predetermined connections. Each neuron typically receives signals from a number of other neurons. Each connection between one neuron and another has a weight associated with it that represents the strength of the sending neuron's signal. In more advanced paradigms, the weight can change based on a pattern of activity of signals over the connection, or signals over other connections. This change can be persistent, or revert to the nominal response, over time, etc. An activation function associated with the receiving neuron multiplies and sums the weights of the signals that it receives from other neurons and computes whether the neuron will fire. When the neuron fires, it sends signals that either activate or inhibit other internal neurons or cause the network to output an external response. In more advanced paradigms, the neuron output can be an analog value or time-variant function. Connection weights between neurons are adjusted, e.g., by training algorithms based on the neural network's production of successful outputs. These connection weights comprise the neural network's knowledge or learning.

To increase the capacity of prior-art neural networks to solve problems accurately and to expand their abstract abilities, some prior-art neural networks comprise more than one neural network. Architecturally distinct neural networks are linked to other networks hierarchically, in parallel, in tree structures, or in other configurations. Such linked neural networks allow greater levels of abstraction and multiple views of problems. In prior-art neural networks that are linked hierarchically, information moves up through the system of neural networks, with output from each lower-level neural network cascading up to the level above it. The lower levels identify patterns based on the input stimuli. These patterns are then fed to the higher levels, with input noise reduced and with increasingly narrow representations identified, as output from one neural network moves to the next. In this movement through the series of networks, a winnowing process takes place, with information reduced as decisions are made concerning the identity of the object or concept represented by a pattern. In the process of eliminating the noise in the input stimuli, the complexity, subtlety, and meaning of information may be lost. Neural networks at higher levels operate on information more remote from the raw data than neural networks at lower levels, and their tasks become more abstract. The result is that certain complexity and context, which might be critical for decision-making and data interpretation, are lost. Therefore, when an ANN at one hierarchical level in a stacked network is dedicated to a new task, if its training does not require it to preserve particular aspects of the input, this will be lost from higher level consideration.

Motor network control systems, or computers which control external mechanical devices, are known in the art. See, e.g., U.S. Pat. Nos. 6,686,712, 5,576,632, and US App. 2008/0144944, each of which is expressly incorporated herein by reference.

Genetic algorithms are search or computation techniques to find exact or approximate solutions to optimization and search problems. See, generally, Wikipedia: Genetic Algorithm, available at en.wikipedia.org/wiki/Genetic_algorithm, last accessed May 18, 2010. Several models and uses of genetic algorithms are known in the art. See, e.g., US App. 2010/0103937, US App. 2010/0094765, US App. 2009/0327178, US App. 2009/0319455, US App. 2009/0307636, US App. 2009/0271341, US App. 2009/0182693, US App. 2009/0100293, US App. 2009/0012768, US App. 2008/0267119, US App. 2008/0140749, US App. 2008/0109392, US App. 2008/0010228, US App. 2007/0251998, US App. 2007/0208691, US App. 2007/0166677, US App. 2007/0133504, US App. 2007/0106480, US App. 2007/0094164, US App. 2007/0094163, US App. 2007/0024850, US App. 2006/0230018, US App. 2006/0229817, US App. 2005/0267851, US App. 2005/0246297, US App. 2005/0198182, US App. 2005/0197979, US App. 2005/0107845, US App. 2005/0088343, US App. 2005/0074097, US App. 2005/0074090, US App. 2005/0038762, US App. 2005/0005085, US App. 2004/0210399, US App. 2004/0181266, US App. 2004/0162794, US App. 2004/0143524, US App. 2004/0139041, US App. 2004/0081977, US App. 2004/0047026, US App. 2004/0044633, US App. 2004/0043795, US App. 2004/0040791, US App. 2003/0218818, US App. 2003/0171122, US App. 2003/0154432, US App. 2003/0095151, US App. 2003/0050902, US App. 2003/0046042, US App. 2002/0156752, U.S. Pat. Nos. 7,698,237, 7,672,910, 7,664,094, 7,657,497, 7,627,454, 7,620,609, 7,613,165, 7,603,325, 7,552,669, and 7,502,764, each of which is expressly incorporated herein by reference.

In addition, coupling the use of a traditional neural network with a database search is known. Neural network/database combinations have been applied to determine protein secondary structure, route telephone calls, distribute energy, classify data, and to allocate resources in a database system. These prior art neural networks rely on mathematical optimization as a model for network operation. See Pollastri, "Improving the Prediction of Protein Secondary Structure in Three and Eight Classes Using Recurrent Neural Networks and Profiles," Proteins: Structure, Function, and Bioinformatics (2002). See U.S. Pat. Nos. 7,110,526; 7,092,857; 6,925,361; 6,108,648; 6,044,375; 5,852,816; 5,408,586; and US App. 2008/0222646, each of which is expressly incorporated herein by reference.

SUMMARY OF THE INVENTION

It is another object of the present invention to provide linked but architecturally distinct hierarchical stacked neural networks that simulate the brain's capacity to organize lower-order actions hierarchically by combining, ordering, and transforming the actions to produce new, more complex higher-stage actions. In other words, lower levels of neural networks complete simpler tasks than higher levels.

It is a further object of the present invention to provide hierarchical stacked neural networks that are ordered in a non-arbitrary fashion so that actions performed by neural networks at a higher level are the product of a concatenation of actions performed by lower-level networks in the hierarchy. In other words, lower level neural networks would provide output that would be used as input in the higher levels.

The present invention provides an architecture of hierarchically linked, distinct neural networks designed for spam filtering stacked one on top of the other. Each neural network in the hierarchical stack keeps track not only of the data it can glean from the input, as in prior-art neural networks, but it also focuses on "cognitive noise" and produces an error vector or a similar means of determining the extent of the imperfections in the information transmitted.

One way to quantify the noise of an information processing system is to weight the signals received by a network with an "importance" or "relevance" or other normalized criterion. The weighting may be derived empirically, or adaptively, or as a part of the basic training of a network. As those signals are being processed, their weighted utility in producing a useful output of the hierarchically superior layer is analyzed. Thus, if the absolute value of all weights applied to an input or set of related inputs are (in the aggregate) small relative to other inputs, the inputs are insignificant and may be deemed noise. Likewise, if the weights are large, but are correlated and have offsetting sign, they may be noise, though a more detailed analysis may be in order. Indeed, as part of the processing scheme, a Monte Carlo style simulation (or less comprehensive schema) may be employed to determine a sensitivity of each output to each input or combination of inputs. In similar fashion, if the neural network is implemented as an analog network, noise may be permitted or injected on each line, with the outputs analyzed for sensitivity to the inputs.

If a signal pattern can be discretely recognized, then it can be affirmatively recognized by the network; however, according to the present embodiment, the network can be made selectively responsive to new signal environments without retraining, while maintaining the existing feature-space recognition of the network. In addition, since the system selectively analyzes and relays signals for which the network does not produce a strong response, while removing signals for which the network strongly responds, a series of neural networks may be implemented, within a single hierarchical level, which avoids or reduces redundant information processing, and which permits increased modularity and reduction of required training scope for an individual network. In a typical system, the neural network is implemented as computer code on a general purpose computer system, though more specialized architectures are possible. Each respective network is represented by a set of parameters, as is the communication between layers. Therefore, one aspect of the technology provides that individual neural networks can be developed which receive signals representing a non-arbitrary organization of actions at a single level of cognitive development, and which produce in turn, a non-arbitrary organization of actions at a single level of cognitive development at a next higher level of cognitive development, as well as a residual signal representing signal components in the received signals for which the network displays low responsiveness. After processing is complete, another neural network with different attributes at the same hierarchal level may then process the received signals and/or the residual signal components, producing its own outputs, which can be together conveyed with the other neural network outputs to the next higher hierarchical level. The residual signal components, and in particular the residual signal components left after all neural networks at a respective hierarchical level have processed the received signal may also be processed by different systems, based on a definition of the non-arbitrary organization of actions which tend to define the signals, though which may not be accurate definitions because of the intermediate processing. The residual processor may be used to generate updated or adapted parameters for the neural networks, or modify the neural network outputs before further processing.

It is an object of the invention to provide at least one processor configured to automatically produce a creative work, selected from the set of art, music, literature, prose, and cinema, comprising: an input configured to receive instructions regarding the type of creative work to be produced; a hierarchical stacked neural network comprising at least three layers configured to interpret the instructions regarding the type of creative work to be produced; a module configured to generate the creative work; and an output configured to provide a representation of the creative work.

Optionally, the input comprises an Internet interface and the output is provided over the Internet. Optionally, the processor further comprises a crawler configured to search at least one database relevant to the creative work. Optionally, the at least one database is the Internet. Optionally, the module configured to generate the creative work comprises a rule-based module. Optionally, the module configured to generate the creative work comprises a neural network.

It is an object of the invention to provide at least one processor configured to automatically carry out a sensory-motor task, comprising: an input configured to receive environmental information; a hierarchical stacked neural network comprising at least three layers configured to interpret the environmental information; a module configured to generate instructions relating to a manner of carrying out the sensory-motor task; and an output configured to provide a representation of the instructions relating to a manner of carrying out the sensory-motor task.

Optionally, the sensory-motor task comprises driving a motor vehicle. Optionally, the input comprises at least one of a camera and a microphone. Optionally, the environmental information comprises at least one of a visual information and an audio information. Optionally, the representation of the instructions relating to a manner of carrying out the sensory-motor task comprises machine instructions. Optionally, the module configured to generate instructions relating to a manner of carrying out the sensory-motor task is a rule-based module. Optionally, the module configured to generate instructions relating to a manner of carrying out the sensory-motor task is a neural network.

It is an object of the invention to provide at least one processor configured to provide channel coding in a router running orthogonal frequency-division multiplexing (OFDM) comprising: a hierarchical stacked neural network comprising at least three layers configured to detect at least one error in a data set; and a module configured to correct the at least one error in the data set.

Optionally, the module is a rule-based module. Optionally, the module is a neural network.

While the "noise vector" is useful with respect to recognized objects or actions, it will produce false results with respect to unrecognized, but nevertheless valid, objects or actions. One way to supplement training of the neural network is to provide a generic set of pattern recognizers (not necessarily neural network implemented) which trigger upon detection of a pattern, but a pattern that is not recognized. That is, a recognized pattern normally produces a highly correlated response within the network, while an unrecognized pattern will produce a broad, but subthreshold response from many neurons. The pattern recognizers may be statistically based, rule based, or the like, and extract the "object" having an unrecognized pattern from the input space of the ANN system. Advantageously, the unrecognized pattern may be presented to a knowledge base as a query, which will then return either an "identification" of the object, or information related to the object. Since the neural network is not trained to recognize or make decisions in dependence on that object, the goal here is to pass the "identification" or a token linked to the related information to a higher hierarchical network. At the next higher level, the unrecognized object may be deemed relevant, i.e., produces a specific response in the network, or "identification" or token may be passed further up the hierarchical chain. In some cases, the network, in conjunction with its own pattern recognizers may further process the unrecognized object(s), and thus is not limited to passing identical information upstream to that it receives. In other cases, the normal flow of information processed by the neural network will indicate a recognized object at one level, but will fail to elicit a response at a higher level. However, the information may still represent an unrecognized pattern, and this technique may therefore be used to supplement the training of a stacked neural network to permit new information to be passed to successively higher levels of the hierarchy without undue filtering or transformation limited by past training. In a more general sense, this technique permits a vast and dynamic knowledge base to be integrated into the neural network scheme, and thus avoid a need for retraining of the neural network as the environment changes. Thus, in a typical hierarchical artificial neural network, only patterns recognized based on past training are passed to higher levels, with each level acting as a filter. Such a paradigm permits recognition of objects, but not dynamic and appropriate responses to new situations, objects or combinations. This, in turn, permits new organizations of information at a low level to be presented for processing at more abstract levels. In terms of the known hierarchical stacked neural networks, in which the information passed to successively higher levels as non-arbitrary organizations of actions, see U.S. Pat. No. 7,613,663, expressly incorporated herein by reference, this method provides, in addition, an arbitrary organization of actions (e.g., identification or information relating to an unrecognized object), which might nevertheless be relevant to a higher level processing. A feedback path is provided from the higher level, which can then address the object; in some cases, it may be thereafter recognized through the normal neural network pathway; in other cases, the query to the knowledge base is modified or further defined; and in still further cases, a recognition and suppression of the object is defined.

The knowledge base need not be intrinsic to the hierarchical neural network system, and indeed it is preferably an external resource that is maintained up to date. For example, the knowledge base may be one or more databases available from Google or Microsoft or Yahoo! or similar Internet providers. The neural network at each level preferably includes logic for formulating an external search of an appropriate database or databases in dependence on the type of information and/or context, and for receiving and interpreting the response. In some cases, the object is readily identified, and based on that identification, processed within the same level. For example, in a semantic network, a new word may be encountered. Reference to a knowledge base may produce a synonym, which the neural network can then process. Depending on the application, the substitution may terminate further exception processing, or a flag of the issue passed to higher levels, for example if the use of the new word has other impact on the analysis, for example as part of a literary allusion. Similarly, a symbol might appear in conjunction with text, which can then be searched in the knowledge base, for example yielding an emoticon identification. The emoticon identification is then passed to a higher level, where, for example, a sarcastic tone to a message is concluded. This technology also is useful in conjunction with networks outside the semantic space. For example, a visual image may be used to generate a query in a so-called content-based image recognition (CBIR) system or query by image content (QBIC) system. A search of an image database based on an input image may yield either a specific identification of the image or object within the image, or, for example, a body of text which describes the image or is contextually appropriate for the image. As with the semantic network, the identification or related information can be used at the same level, or passed to a higher level.

In some cases, an unrecognized object is identified at a relatively higher level than first encountered. In some cases, the system may return the identification back to the lower level, for reprocessing within the non-arbitrary organizations of actions which are part of the normal neural network scheme. Of particular importance here is that the identification may be context sensitive, and thus a generic description or identification may be less helpful. On the other hand, by passing the now-identified object through the normal neural network processing channels, the benefit of the network training is gained, and the impact on, and interrelation of, all of the objects or actions within the realm of the neural network explored. Thus, the higher level networks need not replicate the lower level processing in order to accommodate new objects. While different models have been developed of the stages of cognitive development, all share the following common features. Cognitive development in human beings proceeds through a series of ordered stages. Actions and tasks performed at a particular stage are always more complex than the actions and tasks performed in the immediately preceding stage. The capacity to perform the actions at the higher stage results from a learning process that combines, orders, and transforms the actions at the immediately preceding stage. The creation of higher-stage actions from immediately preceding lower-stage actions provides the higher stage with the capacity to perform more complex tasks. (R. Case (1987) "The structure and process of intellectual development" International Journal of Psychology 22(5-6), 571-607; M. L. Commons et al. (1998), "The existence of developmental stages as shown by the hierarchical complexity of tasks." Developmental Review 8 (3), 237-278; M. L. Commons & P. M. Miller (1998), "A quantitative behavior-analytic theory of development" Mexican Journal of Experimental Analysis of Behavior, 24 (2), 153-180; K. W. Fischer (1980) "A theory of cognitive development: The control and construction of hierarchies of skills" Psychological Review 87(6), 477-531.)

An example of this increasing complexity is shown by the complex multi-dimensional actions that can be performed by solving problems with matrix algebra rather than simpler one-dimensional algebraic equations. In matrix algebra the actions performed in one-dimensional algebra are combined, reordered, and transformed in a manner similar to what occurs during human cognitive development. This development of a new conceptual structure makes it possible for to perform with matrix algebra more sophisticated and complex mathematical operations than with simple algebra.

Another example of how more complex actions are performed at a higher stage is illustrated by the early cognitive development of children. At one of the earliest stages of human cognitive development, an object only exists for a child when it is present. At a later stage, the child is able to retain an abstract representation of the object when it is not present. The actions that the child used to represent the object when it was present have been combined, reordered, and transformed to permit the child to retain an internal representation of the object when it is not present.

The number of neural networks in a hierarchical stack of the present invention is based on research on the cognitive organization of the brain. This research shows that the number of stages or orders needed to accomplish any given task depends directly on the order of hierarchical complexity of the tasks to be performed. (See M. L. Commons, et al., supra; M. L. Commons & P. M. Miller, supra. The research literature on human cognitive development uses term "stage" to denote a level of development; the term "order", to distinguish between levels and to denote the hierarchical sequence of networks.)

The number of networks in a hierarchical stacked neural network of the present invention is determined through an analysis of the tasks to be performed. The number always equals the highest order of hierarchical complexity of any task performed. Thus, if a neural network of the present invention is to perform the more advanced functions of a human brain, such as driving a car, the number is determined by the order of the most complex task needed to accomplish this behavior.

This number of networks is unlimited. Indeed, a hierarchical stacked neural network of the present invention may surpass the capabilities of the human brain. Humans can (in maximal, rare cases) process task demands of up to fourteen stages/orders of hierarchical complexity. (M. L. Commons & F. A. Richards, "Four postformal stages", in J. Demick (Ed.), Handbook of adult development (New York, Plenum, 2002)). Robotic and decision-making systems running hierarchical stacked neural networks of the present invention, however, are not limited to 14 stages/orders. Thus, for example, a system designed to diagnose diseases could consider all known factors affecting a disease at once and not be limited, as human physicians are, to consider problems only within their specialties. Moreover, a robotic system that drives a car could sample far more control parameters and domains of environmental stimuli and thus make safer, more accurate driving decisions than could a human.

It is noted that the individual networks may themselves be modified with respect to a nominal neural network; as discussed above, it may be supplemented with a knowledge base search facility, statistical pattern recognizers, or other logical or rule-based elements, and which may receive and transfer information outside the confines of the hierarchical neural network structure. Thus, in turn, permits a "best of breed" approach toward implementing defined functions, rather than requiring that all of the essential or optional functions to be implemented using neural networks in a strictly hierarchically stacked architecture. In general, the highest level of the stacked network should produce an output or set of outputs similar to a traditional neural network; otherwise, the relevant information appears to "bypass" the neural network analysis, and the system is treated as presenting the neural network output component alongside additional information for logical analysis by another system. While this result is permissible in some cases, the benefits of the neural network architecture appear diminished if the bypass information is not fully considered by the highest cognitive level of the network.

The actions performed in the first neural network in a hierarchical stacked neural network of the present invention are the lowest stage/order actions in the sequence of actions to be performed. The actions performed in each successively higher-level neural network in the hierarchical stack are a product of combining, ordering, and transforming the actions in the immediately preceding neural network in the hierarchical stack. This combining, ordering, and transforming makes it possible for each successive neural network in the hierarchical stack to perform more complex tasks and solve more difficult problems than the neural network in the immediately preceding stage/order. As a result, higher-level neural networks in the hierarchical stack of the present invention begin to more closely simulate the human brain's capacity to interrelate complex input stimuli and create meaning, and, as a consequence, respond appropriately to an ever-widening band of environmental and internal stimuli.

In the present invention, higher-level neural networks communicate with lower level neural networks in the hierarchical stacked neural network. The higher-level neural networks provide feedback to the lower-level neural networks to adjust connection weights, thereby improving the accuracy of the actions performed at the lower levels. The higher-level neural networks can also request that additional information be fed to the lowest neural network in the stacked hierarchy.

For the hierarchical stacked neural network of the present invention to perform tasks such as driving a car, the network must learn lower-order tasks before higher-order tasks. Training begins with the first neural network in the hierarchical stack and ends with the last neural network in the stack. Output from each neural network provides the training input for the next higher neural network in the hierarchical stack. A neural network can also be trained by transferring the contents of a previously-trained neural network at the same stage/order of hierarchical complexity. This transfer requires reading the state of every node of the trained network and setting the nodes in the new network to the same values. Thus the learning gained by a neural network at a particular stage/order can reduce the learning curve for neural networks in a hierarchical stacked neural network.

Briefly stated, the present invention provides an intelligent control system for spam filtering, that is based on increased levels of human cognition coupled with an error detector for noticing errors or noise at each level. It comprises up to O stacked neural networks, $N_m, \ldots, N_{m+(O-1)}$, where m denotes the stage/order tasks that are performed in the first neural network, $N_m$, in the hierarchical stack, and O denotes the highest stage/order tasks that are performed in the highest-level neural network in the hierarchical stack. The type of processing actions that are performed in a network, $N_m$, corresponds to the order of task complexity for stage/order m. Thus $N_1$ performs tasks at the order of hierarchical complexity corresponding to stage/order 1. $N_5$ processes information at the order of hierarchical of complexity corresponding to stage/order 5. Stacked neural networks in intelligent control systems can begin at any stage/order and end at any stage/order, but information must be processed by each stage in sequence of ascending order. Stages/orders cannot be skipped. For example, if a stacked neural network begins at $N_3$ and ends at $N_6$, information would first be processed by $N_3$ and then output to $N_4$. $N_4$ would then process the information and output it to $N_5$. $N_5$ would process the information and output it to $N_6$, which would produce the final output of the stacked neural network. Each neural network in a stack may use different architectures, interconnections, algorithms, and training methods, depending on the stage/order of the neural network and the type of intelligent control system implemented.

According to an embodiment of the invention, a stacked neural network comprises a plurality of architecturally distinct, ordered neural networks; the plurality being organized in a hierarchy from lower to higher order/stages in a model of cognitive development; each member of the plurality feeding signals forward and back to other members of the plurality; the signals being defined in terms of actions available to the each member, whereby the each member transforms actions from at least two or more members at a lower order/stage, thereby producing nonarbitrary organizations of the actions from the at least two or more members at a lower order/stage effective for completing new tasks of increased complexity; the nonarbitrary organizations being fed to at least one member at a higher order/stage; and the nonarbitrary organizations being modifiable by feedback signals from members at the higher order/stages.

The "cognitive noise vector" and the unrecognized object information are related, in that each represents all or a portion of the rejected information processed by the neural network operating as a filter. Traditionally, an artificial neural network is trained or constructed so as to efficiently parse the presented information, extract that which is deemed "relevant", and ignore the remainder. One particular aspect of various embodiments of the present invention is the use, analysis and/or propagation of information or inferences from this remainder, and indeed, the system may be configured to optimally employ the extra-neural network pathway. Thus, while in some cases, the neural network may be optimally trained, and then the "remainder" subject to further analysis, in other cases, the composite system with both neural network and extra-neural network pathway are together trained. Indeed, the extra-neural network pathway may itself comprise neural networks; however, if present, these are not constrained in the same ways as the hierarchical stacked neural network portions.

Ideally, the information derived from the extra-neural network pathway is presented to the neural network pathway within the context of the non-arbitrary organization of actions and/or feedback for each stage; therefore, the input structures for each composite network at any hierarchical level is unified. Of course, the input may be modified to handle this "unexpected" information. The extra-neural network pathway therefore supplements the output space to provide the possibility of an arbitrary or semi-arbitrary organization of action (at least with respect to the training paradigm) nevertheless being propagated through the system. In terms of permitting a learning system, the extra-neural network pathway permits access to a dynamic knowledge base or multiple knowledge bases, without requiring retraining a neural network and/or semi-permanent modifications for temporary effects. This, in turn, allows the basic neural network architecture to be stabilized, while accepting of new data for analysis, disambiguation, filtering, decision-making, control, or other purposes.

For example, a motor neural network may be used to control a machine. The machine itself may comprise a standard proportional-integral-differential (PID) control. Typically, a neural network control would seek to replace or override the embedded control; in the present case, the PID control is used to complement the neural network, as a consistent part of the architecture.

The above, and other objects, features, and advantages of the present invention will become apparent from the following description read in conjunction with the accompanying drawings, in which like reference numerals designate the same elements.

The difference between the input information and recognized information will be represented in a "cognitive noise vector." The cognitive noise vector is a quantitative measure of a deviation between the actual and expected values. It is noted that in some cases, the "cognitive noise vector" is intrinsic to the neural network implementation, and requires no extra-neural network pathway, while in others, the neural network system extracts and operates on the core information, while an extra-neural network pathway is provided to operate on these deviations from accepted norms. Indeed, both pathways may be present, and in all or part, redundant. The consistency of analysis by the neural and extra-neural pathways may itself be useful information, especially to the extent that the neural pathway operates on a set of expectations while the extra-neural pathway may operate using different paradigms.

The system may produce an output for communication and/or storage, which may be an indicia based on the cognitive noise vector or extra-neural pathway. In one embodiment of the invention, the indicia could be a Boolean value. In another embodiment, the indicia could be an integer or a real number representing the frequency and/or magnitude or the probability. In this case, the indicia may represent not only a probability, but also a probability distribution or other descriptors. In yet another embodiment, the indicia could be the full cognitive noise vector, comprising all of the mistakes or deviances from an expectation, and indicia of their weight or severity. Therefore, in this case, the indicia are processed, and generally not communicated as raw data. In other implementations, the "error" signal or a derivative thereof is passed as such to other neural network layers for processing. In some cases, a pattern of relevant information invisible to the current level may be within the comprehension and/or processing capability of another network; indeed, to the extent that the other level network comprehends the information, a feedback (or feed-forward) signal within the network may be generated to permit reprocessing of the data within the neural network, and thus diminish the cognitive noise factor or extra-neural network contribution. As discussed above, typically it is desired to have the main processing of information through the hierarchical neural network architecture, though in some cases, efficiency may be gained by employing particular attributes of an extra-neural network pathway. In some cases, a domain specific processor produces an output suitable for higher level networks, and thus such specific information may bypass intervening neural network layers as may be appropriate. Preferably, as part of a generic architecture, the bypass is through the hierarchy, and not around it, thus permitting the neural network and/or extra-neural network to operate on the data stream as appropriate, and without a system architect making a priori determinations of system actions. This, in turn, permits retraining and substitution of network layers, without re-architecting the entire stacked system.

It is noted that, while the hierarchical stacked neural network may be implemented as discrete hardware elements, in many embodiments, the neural networks will be defined as computer instruction codes and data stored in a computer memory, such as random access memory, flash memory, magnetic and/or optical memory, ferromagnetic memory, or the like. Assuming the hierarchy is strictly implemented, the processing of data commences at the lowest level, to produce the non-arbitrary organization of actions and optionally a cognitive noise vector or extra-neural output, or arbitrary or non-pre-defined action, which is then stored and used as an input (along with feedback or feed-forward controls) to the next hierarchical layer. As discussed above, in some cases, a layer will have to be reloaded, for revised action, and presumably the entire hierarchy above that layer would also have to be processed, unless the system is configured to produce a usable output from an intermediary layer. Indeed, the system may be configured for iterative processing of signals, for example with implementation of a genetic algorithm or other permutive algorithm, or a multipass algorithm.

In one embodiment of the invention, two cognitive noise vectors are determined. The two cognitive noise vectors might represent different measures of grammatical mistakes. For example, one cognitive noise vector might correspond to spelling and another cognitive noise vector might correspond to punctuation and word order. More generally, each identified degree of freedom or attribute (characteristic) may be separately represented, and thus there is no theoretical limit on the number of such vectors. Likewise, the vector may be a multidimensional which itself distinctly represent these multiple characteristics, or composite characteristics.

Thus, if a cognitive noise vector of one network fully corresponds to recognized information by another, and vice versa, then the composite cognitive noise vector for both systems in parallel is minimal. On the other hand, patterns which are not recognized by either network may be presented in a composite noise vector. It is noted that the cognitive noise vector as a standardized object opens the opportunity for outsourcing and software-as-a-service (SAAS) processing of information. Thus, the noise vector may be externally communicated, e.g., over the Internet, to third parties for processing to determine whether it is comprehensible by an existing resource. The result may be either a non-arbitrary organization of actions, and this compatible with an appropriate neural network as a direct input, and/or or as a parallel data stream.

The various data streams presented to the system may be represented in separate feature vectors, resulting in the more general exposition of the invention, in which patterns are extracted from the raw data (at each level) using filters, more preferably optimized feature filters (e.g., trained neural networks), with a residual also represented for possible analysis or use.

The processor(s) may include, for example a single or multiple core processor, and where appropriate a single instruction-multiple data (SIMD) processor system, such as a graphics processor unit (GPU) may be used to process the data, specially where the process comprises a matrix operation which is appropriate for the SIMD architecture present.

It is therefore understood that the present system and method extends prior techniques by, for example, implementing new methods to achieve useful results, and/or to employ a new processing architecture which exploits both recognized patterns and latent or unrecognized patterns, in a hierarchical stacked network, with at least a portion of the communication between layers comprising non-arbitrary organizations of actions, e.g., information dependent on recognized patterns, which are of a type expected by an adjacent network. By stacking such networks, higher levels of cognition may be achieved. To the extent that each layer corresponds to human cognitive development, automated processes that display human type intelligence and cognition may be implemented. There should be a one-to-one correspondence. By specifically providing pathways for dealing with new or unexpected patterns of data, or interesting noise, the system is able to dynamically respond to its environment, and learn. The learning may be represented by internal modifications of neural networks based on feedback or feedforward signals, or through use of a knowledge base, which, for example, can be processed, in whole or in part, using explicit rules. Indeed, such rules provide the opportunity for human intervention and control over the system.

In order for rules to be universally applicable, it may be preferable for the rule-based network to receive and process the entirety of the data presented to the network, on a global basis and/or at each layer. Therefore, the parallel data pathway may include redundant or inconsistent information with the neural network pathway. Resolution of inconsistencies or ambiguities may be made at higher levels, or may itself represent a component of the system output.

According to another aspect of the technology, the implementation exploits available resources which serve as reservoirs of organized information which represents human intellectual activities. For example, modern Internet search engines, such as Google and Bing analyze human semantic and interactional activities, and store this information with various levels of reduction. Because such human activity represents cognitive performance at levels 8 to 11, and perhaps in specialized situations at higher levels, this stored (and/or processed) information may be used to train and/or implement the neural networks in the system. In addition, the search engines may be directly employed by the intelligent system to provide an adaptive database which itself embodies the results of human intelligence. Therefore, the intelligent system may be implemented to exploit human intelligence at higher cognitive levels, without requiring direct training of the neural networks. Of course, the use of search engine technology provided for other purposes may lead to anomalies, errors and bias, however, in many instances such anomalies, errors and bias are acceptable or addressable through other means. For example, an Internet search engine may be able to assist with disambiguation of a semantic request. A request received linguistically, may include words that have multiple meanings or connotations. In some cases, these meanings vary regionally. Therefore, the location of the request may then be passed to a search engine, which then correlates requests from others on a regional basis, and the results of those requests by others, to infer the meaning intended by the requestor. Likewise, even without a high level analysis, an ordered string of words may be submitted directly to a modern search engine, which then exploits algorithms based on traditional machine intelligence as well as collaborative (i.e., inferentially derived human intelligence) to produce a set of ranked results. These ranked results, in turn, may be returned to the intelligent system, which can then process and act upon the returned information. Because the ranking, at least, of the results displays elements of higher cognitive level analysis due to the human cognitive nature of the source of the ranking algorithm, the ranking may be used as a surrogate for local training of the neural network, as a set of adaptive parameters reflecting intelligence, and/or as a basis for training of the neural network(s), especially at cognitive levels below 12.

Since the Internet databases tend to be freely available, another option is to train a neural network based on a series of queries submitted to an Internet database, or in conjunction with the data maintained by such a database (which itself may be proprietary). The neural network system itself, or a special training facility, may then generate queries, for example as a result of a genetic algorithm, or other means, to provide training examples. The neural network in this case defines regions of its "decision space" or knowledge base which lack density. The training examples, indeed, may also derive from the search engine. The net result is that the results of human intelligence at reasonably high cognitive levels are exploited to improve the performance of the system.

BRIEF DESCRIPTION OF THE DRAWINGS

FIG. 1 is a block diagram of the stacked neural network of the present invention.

FIG. 2 is a block diagram of an embodiment of the stacked neural network of the present invention comprising three architecturally distinct, ordered neural networks.

FIG. 3 is a block diagram of an embodiment of the stacked neural network of the present invention comprising five architecturally distinct, ordered neural networks.

DETAILED DESCRIPTION OF THE PREFERRED EMBODIMENTS

Figure 4:
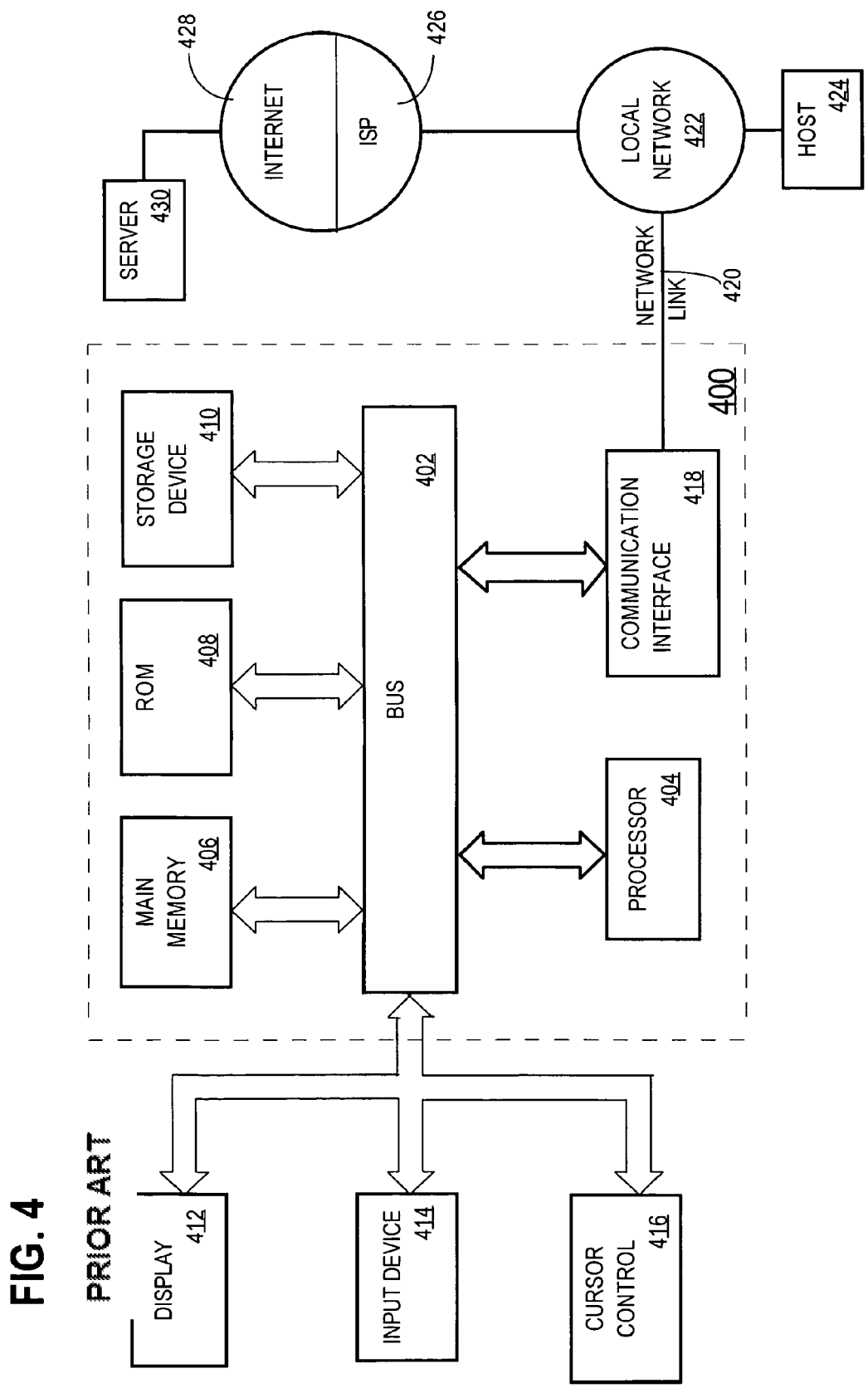
FIG. 4 illustrates a computer system that could be used to implement the invention.
Figure 5:
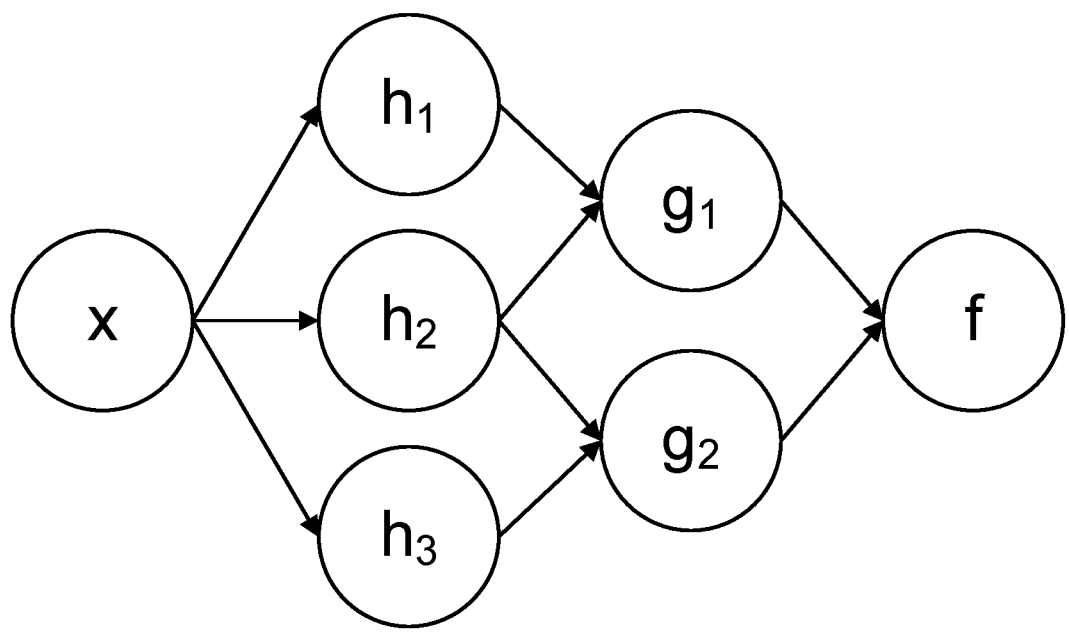
FIG. 5 depicts a decomposition of a function $f$, with dependencies between variables indicated by arrows, according to an embodiment of the invention.
Figure 6:
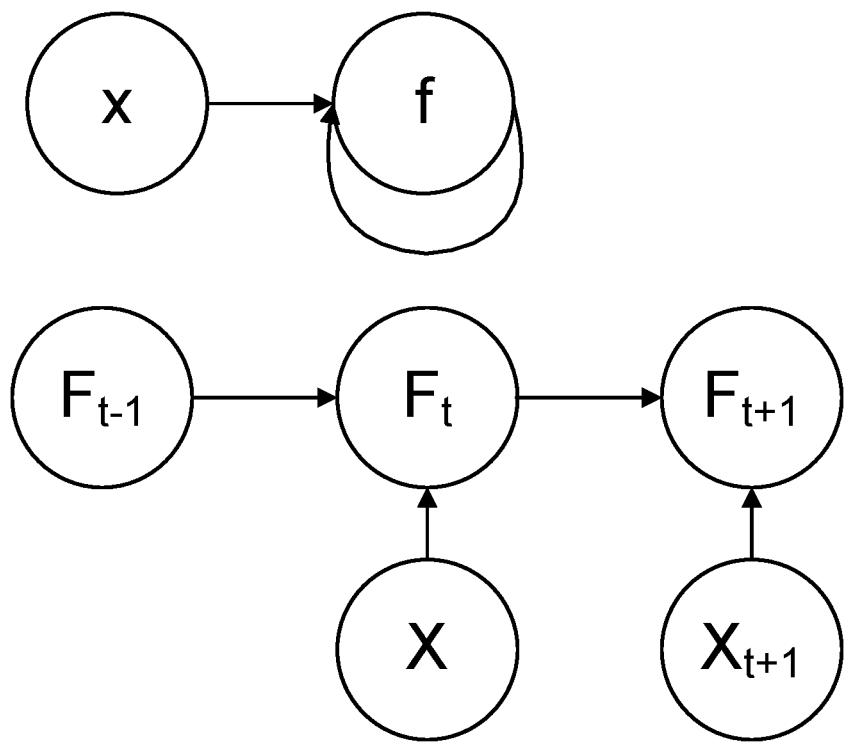
FIG. 6 shows a recurrent network according to an embodiment of the invention.

Before constructing a hierarchical stacked neural network of the present invention, the builder must determine the order of hierarchical complexity of the tasks that the hierarchical stacked neural network will perform. The highest order of hierarchical complexity found from this determination dictates the number of neural networks that the hierarchical stacked neural network requires. In making this determination, the order of hierarchical complexity is measured by the number of recursions that the coordinating actions must perform on a set of primary elements. Actions at a higher order of hierarchical complexity:

1) are defined in terms of the lower-order actions;
2) organize and transform the lower-order actions;
3) produce nonarbitrary organizations of these lower-order actions that solve new, more hierarchically complex tasks.

The following equation determines the order of hierarchical complexity of the task, i.e., the number of concatenation operations it contains. In a concatenation, a coordinating action is performed on two or more of the immediately preceding necessary lower-order actions. The products of this coordinating action then become the lower-order elements of the next higher-order coordinating action. The next higher-order coordinating action is performed again on the new, more hierarchically complex elements generated from the previous order. From this coordinating action one derives the products of the new, higher-order performance of the action, which become prerequisite elements of an action of a still higher order, and that higher-order action is performed again.

The order, O, of hierarchical complexity of task T is denoted O(T), and defined as follows:

(a) For a simple task $E_1$ at the lowest order in the hierarchical complexity, $O(E_1)=1$.
(b) Otherwise, $O(E)=O(E')+1$, where $O(E')=\max(C(E_1), C(E_2), \ldots C(E_n)))$, for all $E_{i=1 \ldots n}$ in E.

In other words, the order of the next higher-order task is one order of hierarchical complexity more than the next lower-order task out of which it is built. If task E is built out of tasks of different orders of hierarchical complexity, then E' has the maximum order of all of the tasks within it. Consider the example of distributivity, $3*(9+2)=(3*9)+(3*2)=27+6=33$, where the numbers come from counting objects. The maximum order of the subtasks would be based on the "adding" and "multiplying" actions (order 7), not the "counting" actions (order 6) (See Table 1 below).

The hierarchical complexity of any task in a task sequence may be determined through such task analysis. The hierarchical complexity of a task therefore refers to the number of concatenation operations it contains. An order-three task has three concatenation operations. A task of order three operates on the output of a task of order two, and a task of order two operates on the output of a task of order one (i.e., a simple task).

Table 2 provides examples of 14 stages/orders of hierarchical complexity identified for human beings through research on human development. It uses in part mathematical operations to illustrate how tasks at a higher stage/order build on tasks at lower stages. Higher-order tasks are created from the preceding lower stage/order tasks by concatenation of lower-order tasks. Other examples, with fewer or more stages/orders of hierarchical complexity, are also available. In the example of spam filtering, there are, for example, five neural networks involved. The lowest level neural network N1 identifies text as text. The next highest neural network N2 separates text into letters. The next level N3 organizes text into strings of letters—words and/or sentences based on spacing and punctuation. Note that levels N1 through N3 are not necessary if the words are already parsed at the input. Level N4 distinguishes patterns of words, while level N5 derives concepts from the patterns of words.

Referring to FIG. 1, a hierarchical stacked neural network 10 of the present invention comprises a plurality of up to O architecturally distinct, ordered neural networks 20, 22, 24, 26, etc., of which only four ($N_m$, $N_{m+1}$, $N_{m+2}$, $N_{m(O-1)}$) are shown. The number of neural networks in hierarchical stacked neural network 10 is the number of consecutive stages/orders needed to complete the task assigned. A sensory input 60 to stacked neural network 10 enters lowest stage/order neural network 20. The output of each of neural networks 20, 22, 24, 26, etc., is the input for the next neural network in the stack. The highest stage/order neural network 26 in the hierarchical stack produces an output 62. Each of neural networks 20, 22, 24, 26, etc., except for the first in the hierarchical stack, neural network 20, can provide feedback 30, 32, 34, 36, 38, 40 to a lower stage/order neural network 20, 22, 24, etc. This feedback adjusts weights in lower stage/order neural networks. Neural networks in the hierarchical stack 20, 22, 24, 26 . . . can send a request 50 for sensory input 60 to feed more information to neural network 20. A neural network can send this request when its input does not provide enough information for it to determine an output.

Within a neural network in the hierarchical stack, tasks may be combined in ways that do not produce a change in stage/order. For example, iterations may repeat lower stage/order tasks, e.g., repeatedly adding a sequence of numbers. A mixture may include combining simple addition and multiplication. A chain may include arbitrarily linking lower-stage/order tasks that are not conceptually related. In the case of a change in stage/order, a transformation of lower-stage/order operations may use a new construct to combine lower-order tasks that incorporate tasks at a lower stage/order but create a new way of structuring the set of relationships. One example is using matrix algebra so that lower-order operations, e.g., adding and multiplying, become part of the matrix algebra tasks within a multi-dimensional domain.

Referring to FIG. 2, in another embodiment of the present invention, stacked neural network 10 has three architecturally distinct ordered neural networks, 20, 22, and 24. Neural network 20 performs stage/order 5 actions to process sensory input 60. The output from neural network 20 is input to neural network 22, which processes the output from neural network 20 using stage/order 6 actions. The output from neural network 22 is input into neural network 24 that processes the output from neural network 22 using stage/order 7 actions. In this embodiment, neural network 22 does not provide feedback to lower stage/order neural network 20, and neural network 24 does not provide feedback to lower stage/order neural networks 22 and 20. Neural networks 20, 22, 24 do not send requests 50 for additional sensory input 60 to neural network 20.

Referring to FIG. 3, in still another embodiment, stacked neural network 10 contains five neural networks, 20, 22, 24, 26, and 28. Neural network 20 processes sensory input 60 using stage/order 2 actions. The output from neural network 20 is input into neural network 22, which processes the output from neural network 20 using stage/order 3 actions. The output from neural network 22 is input into neural network 24, which processes the output from neural network 22 with stage/order 4 actions. The output from neural network 24 is input into neural network 26, which processes the output from neural network 24 with stage/order 5 actions. The output from neural network 26 is input into neural network 28, which processes the output from neural network 26 with stage/order 6 actions. Neural network 28 is the highest neural network in the hierarchical stack and produces output 62. In this embodiment, neural network 22 sends feedback 30 and neural network 28 sends feedback 40 to neural network 20, which uses them to adjust its weights. Neural network 26 can send a request 50 for sensory input 60 to feed more information to neural network 20 if it is unable to determine its output based on the output from neural network 24.

The stacked hierarchical neural network of the present invention can be constructed only after the number of neural networks needed in the stack has been determined. The stage/order of the actions and tasks performed in a neural network in the hierarchical stack must equal the level of the neural network. Thus neural network $N_m$ performs tasks and actions at stage/order m.

The actions and tasks in each successive neural network are a combination, reordering and transforming the tasks of the immediately preceding neural network in the hierarchical stack. At each level the neural network performs actions at a higher stage/order of human cognitive development. Thus a neural network at the lowest level may only process binary information, such as whether or not an event has occurred, where a neural network operating at a higher level in the hierarchical stack may perform actions in multiple dimensions. As in human cognitive development, the neural network at the higher level makes more complex discriminations and can perform more sophisticated tasks. For example, a neural network at level 6 can perform tasks such as counting objects, where a neural network at level 7 can perform tasks that involve simple mathematical operators. Thus level 7 has moved beyond counting to a system that creates counts through a new, higher-order set of tasks (See Table 1).

Each neural network in the hierarchical stack can have one or more hidden layers of neurons and various interconnections. The number of hidden layers within a network and the interconnections between layers depend on the nature of the tasks that the neural network at that particular stage/order is performing. The number of tasks and types of actions that the neural network performs and the stimuli that it processes all affect the number of hidden layers, the number of neurons in a hidden layer, and the interconnections between layers. The stimuli processed by the neural network may be external, internal to the network, or previously conditioned stimuli. When the types of stimuli that the neural network processes increase, the number of hidden layers and/or the number of neurons within a layer increase.

The algorithms a particular neural network in a hierarchical stack uses to assign connection weights between neurons also vary, depending on the nature of the problem that the neural network is solving and the input and internal stimuli that the neural network processes. Specific algorithms are not associated with particular stages/orders of neural networks in the hierarchical stack. For example, a type of algorithm that assigns connection weights in a neural network at stage/order m that names geometric objects may differ from an algorithm that assigns connection weights in a neural network at stage/order m that names people.

Training is not specific to the stage/order of a neural network in a hierarchical stack. Rather it can vary based on the particular tasks being performed by a network in the hierarchical stack. Individual networks in the hierarchical stack may use unsupervised training, supervised training, or a combination of both to set initial weights. In the case of unsupervised training the neural network continues to learn, adapt, and alter its actions throughout the course of its operation. It can respond to new patterns not presented during the initial training and assignment of weights. This capacity allows a network to learn from new external stimuli in a manner similar to how learning takes place in the real world.

A neural network in the hierarchical stack can train other neural networks that operate at the same order/stage of hierarchical complexity. In this training, the information from the neural network is transferred to an architecturally distinct unit that is analogous in structure to the original neural network. This type of training constitutes a transfer of learning from one neural network to another; the new neural network does not have to be independently trained, thereby saving time and resources.

More formally stated, an intelligent control system of the present invention comprises up to O hierarchical stacked neural networks, $N_m, \ldots, N_{m+(O-1)}$, where m equals the lowest stage/order tasks performed by the hierarchical stacked neural network and O represent the highest stage/order tasks performed. The actions and tasks performed in $N_m$ correspond to the stage/order of cognitive development of the model of cognitive development employed in solving the problem. Thus $N_1$ performs tasks at the level of hierarchical complexity that corresponds to stage/order 1, and $N_5$ processes information and responds at the level of complexity that corresponds to stage/order 5. The number of neural networks in the stack depends on the order of hierarchical complexity of the tasks performed by the hierarchical stacked neural network. The number of networks always equals the highest order of hierarchical complexity of any task performed by the hierarchical stacked neural network. But, unlike the human brain, the number of networks in a hierarchical stack is not limited by the highest order of hierarchical complexity that a human can achieve. The number of networks in a hierarchical stack is unlimited and thus may exceed the capabilities of the human brain.

Referring again to FIG. 3, a stacked neural network of the present invention can begin at any stage/order of cognitive development and end at any stage/order, but information must be processed by each stage/order in sequence and ascending order. An intermediate stage/order cannot be skipped. For example, if a stacked neural network begins at N3 and ends at N6, information is first processed by $N_3$ and then output to $N_4$. $N_4$ then processes the information and outputs it to $N_5$. $N_5$ processes the information and outputs it to $N_6$, which produces the final output of the stacked neural network.

The stage/order at which a stacked neural network begins and ends and the number of neural networks in a hierarchical stack depend on the nature of the problem to be solved. Moreover, each neural network in a hierarchical stack may use different architectures, algorithms, and training methods. The type of architecture, algorithm, and training method selected for a particular neural network in the hierarchical stack depends on the order/stage of the neural network, the type of intelligent control system that is being implemented, the tasks to be performed and the stimuli to be processed. In addition to producing data as output, the neural networks described herein can be designed to provide error vectors depicting the cognitive noise produced at each neural level. Cognitive noise occurs when the information is of a form which is recognized at a lower level (and is thus presented at the input of the higher level), but it fails to represent a recognized pattern at a higher level. For example, if a text includes valid English characters, but there are many misspelled words or non-words, or alternatively if the words are correctly spelled but not combined into valid phrases and sentences. In another example, in an algebraic system, cognitive noise occurs when lower level calculations (e.g. addition) are done correctly, but higher level calculations (e.g. multiplication or distribution) are systematically done incorrectly. An example of the use of this cognitive noise is to maintain the representations of these presumptively erroneous calculations which might indeed, at a higher level, represent useful information, using a different calculus or symbology, or through a transformation of the data or symbols to a different representation.

In the human brain, cognitive noise might be suppressed, as the brain is tuned to search selectively for certain signals. This allows us to concentrate on a conversation with a colleague in a noisy room (the background noise is cognitive noise) or read sloppily handwritten text (the imperfections in the formations of the letters are cognitive noise). See, generally, Selective attention and the suppression of cognitive noise. Neill, W. Trammell; Westberry, Richard L. Journal of Experimental Psychology: Learning, Memory, and Cognition. Vol. 13(2), April 1987, 327-334), describing this effect. However, in some situations the cognitive noise that is filtered out might comprise valuable information in itself. For example, the fact that a meeting is taking place at a noisy bar instead of in a quiet office might provide some information as to the intent of the parties. Similarly, the fact that a document is handwritten rather than typed might give one information as to the intent of the author. Similarly, in spam filtering, the fact that a message is not written in proper English increases the likelihood that it is spam.

It is not necessary, for the present invention, for the neural network, especially at each level of analysis, to fully understand the meaning of each word or sentence that it identifies. (The output could only be a spam flag or a non-spam flag.) Rather, clustering techniques may be used to separate data into coherent signals and cognitive noise at each neural level.

In one embodiment of the invention, k-means clustering is used to separate signal, cognitive noise and pure noise. The steps of k-means clustering, as applied to word identification are:
1. Select a number of clusters—one cluster for each word.
2. Determine the cluster centers, which represent the correct spelling of each word.
3. Assign each word in the input text to the nearest cluster center. The noise is the distance of each word in the input text from the nearest cluster center. Ideally, the distance would be some measure of how correct the spelling is. In other words, if the target word "hello" is spelled H-E-L-L-O, it would correspond to a distance of zero, but the spelling H-E-L-O would be closer than G-O-O-D-D-B-Y, which would correspond to "goodbye."
4. Calculate the total distance between the target words and the closest match. Messages with a larger distance are more likely to be spam. In one embodiment, this is reported in an error vector.

A similar algorithm can be used in other neural networks, for example, for character identification.

K-means clustering is more difficult to apply to sentence structure identification because there is not a fixed number of clusters with which the sentence can be compared. There are a finite number of words in the dictionary, but it is nearly impossible to provide a list of all of the possible, grammatically correct, sentences with all of these words, and such clustering would present its own problems and might not simplify the problem at hand. Fuzzy c-means clustering can be used in this case. In fuzzy clustering, each point has a degree of belonging to a cluster rather than fully belonging to a cluster. This might correspond to the role a word plays in a sentence. For example, the word "Xerox," might be a proper noun (Xerox Corporation), a common noun (photocopy machine) or a verb (to photocopy). The sentence structure parser would consider all three possibilities and probabilistically determine which one is most likely based on the other words in the phrase or sentence and their roles therein. For every point x in a fuzzy c-means clustering algorithm, we have a coefficient giving the degree of belonging in the kth cluster $u_k(x)$. Usually, the sum of those coefficients for any given x is defined to be 1.

$$\forall x \left( \sum_{k=1}^{num.\ clusters} u_k(x) = 1 \right).$$

Note that, in one embodiment, one of the clusters would correspond to cognitive noise—groups of words that do not make sense together or do not represent a proper English (or foreign language) phrase or sentence. Note that it is also possible that a spoken representation might be a slurred rendition of "the rocks". The clustering algorithm might also consider that possibility.

With fuzzy c-means, the centroid of a cluster is the mean of all points, weighted by their degree of belonging to the cluster:

$$center_k = \frac{\sum_x u_k(x)^m x}{\sum_x u_k(x)^m}.$$

The degree of belonging is related to the inverse of the distance to the cluster center:

$$u_k(x) = \frac{1}{d(center_k, x)},$$

then the coefficients are normalized and fuzzyfied with a real parameter m >1 so that their sum is 1. So $$u_k(x) = \frac{1}{\sum_j \left(\frac{d(\text{center}_k, x)}{d(\text{center}_j, x)}\right)^{2/(m-1)}}.$$

After this procedure, either the coefficient corresponding to the noise cluster or some measure of the distance of the points from the respective center points is returned to signify the degree of noise in this level.

Spam Filter

An example of an intelligent system based on the stacked neural network of the present invention is a spam filter. This example follows the model of cognitive development depicted in Table 1. (See R. Case (1987), supra; M. L. Commons et al (1998), supra; M. L. Commons & P. M. Miller (1998), supra.)

Commons, M. L., & Richards, F. A. (2002). Organizing components into combinations: How stage transition works. Journal of Adult Development. 9(3), 159-177. (Expressly incorporated herein by reference).

In one embodiment, the system and method involve a design based on skipped or bypassed cognitive levels. In other words, "noise," which fails to specifically excite or suppress a trained network of neurons is forwarded to a higher level of the hierarchical stacked neural network, or other processor, for further processing.

Figure 13:
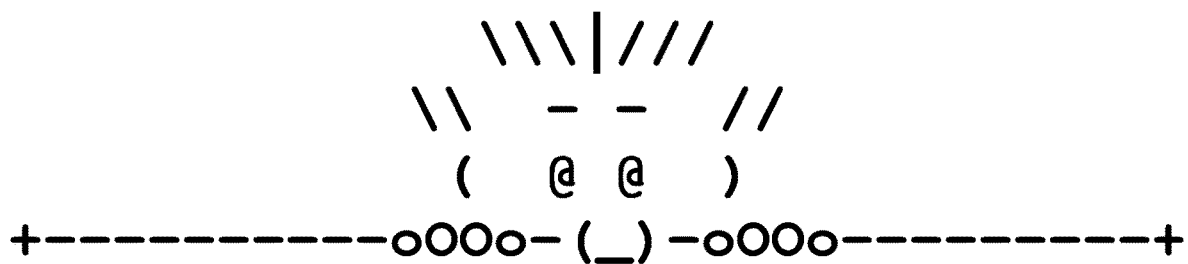
FIG. 13 shows a graphic-style email signature formed of standard ASCII characters.

In one embodiment, "cognitive noise" provided as output in one layer of the neural network is ignored at the next layer but processed for meaning at a higher layer later on in the processing. For example, an email message might state, "This is the new car that I just purchased," and include a signature file as shown in FIG. 13.

The signature file might be treated as cognitive noise in the layer that is looking for letters and converting the letters into words and words into sentences. However, when analyzed for meaning in conjunction with the words, the signature file could add "object representation" information.

Another example involves processing an opera in a foreign language (in which the human or processor was not trained to work). While the phonemes are recognized as such, the phonemes are not combined to make understandable words and sentences. Nevertheless, the cognitive noise produced by the phonemes can be combined with the actions of the actors and the tone of the music in order to ascertain a meaning, and thereby permit the network to learn aspects of the new language.

In yet another embodiment, information about a speaker can be gleaned from cognitive noise. The neural network would be trained to convert phonemes into meaningful words and sentences. However, if the speaker's pronunciation and grammar are different from what the processor expects, the processor can conclude that the speaker is a foreigner or from a distant part of the country. This information could be useful to understanding and responding to the cultural background of the speaker.

Application

In one embodiment of the present invention, a machine determines at which levels of development certain habits or ways of thinking are developed. This calculation is based on the number of sublevels of the thought involved. This machine could then be used to modify the maladaptive ways of thinking of affected individuals who are seeking treatment. For example, a written questionnaire or in-person interview or interactive machine analysis could be implemented to ascertain whether a subject has a certain phobia (snakes, spiders, people of different backgrounds, heights, flying in airplanes, etc.). A determination is then made, based on the acquired data, at which stage, or at which cognitive level of thinking the phobia is located. The knowledge of the cognitive stage responsible for the phobia could be useful for addressing and perhaps eliminating it. For example, if a phobia is in a high stage, logical arguments as to why the phobia is irrational might be most effective. However, if the phobia is at a low stage, and perhaps the holder of the phobia acknowledges it as irrational, more innate, instinctive programming is necessary to remove the phobia from the holder. A similar analytic framework may be used as part of an educational system, in which the presentation of facts and theories is adaptive to the determined cognitive level of analysis. Indeed, such a system may permit subanalysis of cognitive processing in context-sensitive manner; therefore, one need not assume that an individual operates at all times at the same cognitive level, and therefore a level may be determined for various activities and thought processes. One way of determining the cognitive level is to compare user responses with a model, selecting the level based on a best correspondence with the available models. Thus, the user response is compared with an exemplar response.

In yet another embodiment of the invention, the Model of Hierarchical Complexity can be used to implement a child-like robot. An exemplary robot would have eleven to fifteen levels of neural networks and start with some pre-programmed "instinctive" responses. The robot would further comprise cameras (for eyes), microphones (for ears), and speakers (for a mouth). Further, various sensors, such as pressure, texture, and temperature sensors on its hands. Such a robot would be able to learn to interact with humans, for example, by reading, writing, and speaking, by further training its neural networks beyond a base state. The neural networks could also be trained to complete different tasks of varying complexity, from basic verbal logical and mathematical issues, to assisting a person with basic motor tasks, such as brushing teeth. At higher levels, the robot is trained to, and capable of, solving calculus problems and piloting an automobile. The networks may be individually trained, and functional capabilities provided ab initio.

In some cases, a robot can be trained to complete a task more efficiently than a human because a robot is not limited by the imperfect perception, reaction, and ability to integrate information of humans. For example, human drivers have limited peripheral and reverse vision and limited reaction times. Also, some humans have poor spatial perception, making driving tasks such as reverse and parallel parking difficult. A robotic driver would not have such limitations. For example, the robotic driver might have a "head" located above the roof of the vehicle allowing it to look in all directions, while the body of the robot is inside the car. In another embodiment, the robot has an "eye" on the rear bumper of the vehicle to optimize reverse and parallel parking. The connections between the various parts of the robot could be wired or wireless. For example, an Ethernet, WiFi, or Bluetooth connection could be used.

In yet another embodiment, a self-driving car trained through these neural networks is provided. As part of an advanced cruise control system, the human "driver"/main passenger of the car preferably has back-up controls in case of a failure of the automatic driver.

It should also be noted that, while human reasoning may be limited to 14 stages according to the Model of Hierarchical complexity, the thinking of a human-made robot is not so limited. There is nothing preventing one from building a robot with more than 14 hierarchical neural network levels, thereby creating a robot that can think at higher stages than humans. Preferably, the cognitive levels emulate those of a human; however, in some cases, the cognitive levels implemented in an automated system can deviate from the human cognitive levels in purpose, capability and scope. Likewise, in some cases, automated systems are implemented with sets of neural networks at generally parallel levels of the hierarchy, which permits fusion and/or divergence of outputs at successive levels. However, it is also possible to have multiple hierarchies, with disparate inter-level definitions.

Figure 8:
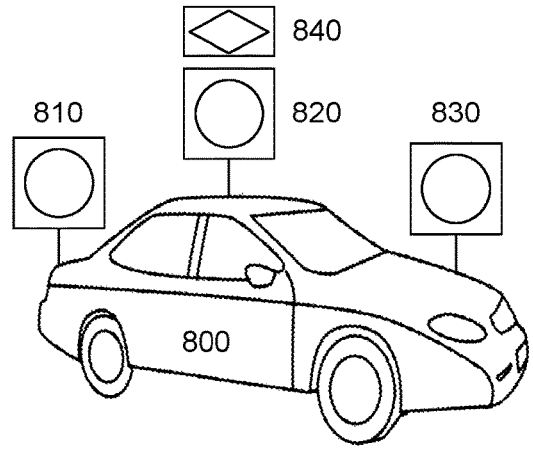
FIG. 8 illustrates a vehicle that can be used to implement an autopilot vehicle driver, according to an embodiment of the invention.

FIG. 8 illustrates a car 800 driven by a robot. The robot is wirelessly connected with three 360 degree cameras located at the back 810, roof 820, and front 830 of the car. The robot is also connected with a microphone 840 located on the roof of the car. As noted above, the wireless connection may be Bluetooth, WiFi, microwave, or any other known wireless connection means. In yet another embodiment, the robot may connect to the car over a cellular or Internet network, and the robot may be located remotely from the car.

In yet another embodiment, the neural networks are implemented on a general or special purpose computer, for example an Intel Core i7 based computer running Windows 7, having an nVidia Fermi (Tesla) coprocessor. See, Daniel L. Ly, Volodymyr Paprotski, Danny Yen, "Neural Networks on GPUs: Restricted Boltzmann Machines", www.eecg.toronto.edu/-moshovos/CUDA08/arx/NeuralNet_report.pdf; Jayram Moorkanikara Nageswaran, Nikil Dutt, Jeffrey L Krichmarl, Alex Nicolau, Alex Veidenbaum, "Efficient Simulation of Large-Scale Spiking Neural Networks Using CUDA Graphics Processors", www.ics.uci.edu/~jmoorkan/pub/gpusnn-ijcnn.pdf; Mario Martinez-Zarzuela, Francisco Javier Díaz Pernas, José Fernando Diez Higuera and Miriam Antón Rodriguez, "Fuzzy ART Neural Network Parallel Computing on the GPU" Lecture Notes in Computer Science, Computational and Ambient Intelligence, Springer Berlin/Heidelberg, ISSN 0302-9743 Volume 4507 (2007), (expressly incorporated herein by reference).

The computer could have multiple layers of separately trained neural networks according to the Model of Hierarchical Complexity. This computer system is preferably adapted to produce creative works of art, music, literature or cinema. This permits novel computer art, musical recordings, literary works, and films generated entirely by machine with or without the creative involvement of human authors.

In general, an element of creativity is permutation of compatible concepts, and therefore one embodiment provides a genetic type algorithm (which may or may not be predicated on random permutations), to generate new higher level concepts and concept streams. See, e.g., U.S. Pat. No. 5,140,530, incorporated herein by reference.

In one embodiment, the invention is adapted to essays and synthesis documents or reports. This embodiment of the invention could be accessible over an Internet website. The company implementing the system might charge user's a fee for its use, subscription, or it could be provided for free to members of a certain group, e.g. people who have an account at a certain bank. Various other commercial models may be implemented, for example product placement, advertisement (preferably contextually appropriate), or the like.

The neural network is trained to comprehend instructions in natural language, and likewise interact with knowledge bases also having natural language records, as well as formatted or structured databases. This system might be used, for example, to generate term papers (or at least drafts thereof), or to review and/or improve such papers as part of an education or automated mentoring system. Thus, college students using the computer program could scan paper copies of their assignments and provide them as input to a website or on-line system. In addition to being able to understand natural language, the system is able to connect to generic, scholarly and literary databases to "learn" information that is relevant to the question. For example, the system may be used to analyze the use of harsh and soft sounds in Hamlet's "To be or not to be" speech. The hierarchical stacked neural network ascertains the meaning of 'harsh' and 'soft' sounds, as used in this context, as well as the text of Hamlet's speech and the background and plot of the play. In an educational embodiment, the neural network further seeks a syllabus or semantic description of the course material. For example, the paper regarding the use of sound in Hamlet's "To be or not to be" speech might take a different form if it were written for (1) an introductory English course, (2) an advanced course on Shakespeare, and (3) an advanced poetry course. In yet another embodiment, cultural data about either the student or the professor teaching the course could be taken into account. For example, if the professor is a devout Christian who enjoys seeing Biblical references in the students' writing, the system could provide such references. Alternatively, the student might note that she is interested in impressionist art, and the resulting document could comprise references to Monet and Renoir's paintings. A user model may be implemented to emulate the style and error probability of a person, and thus produce a document corresponding the work of the emulated person. Such a system may also be used to assist a user in improving the style, based on a cognitive model of the existing user process, and that of an improved paradigm.

Figure 7:
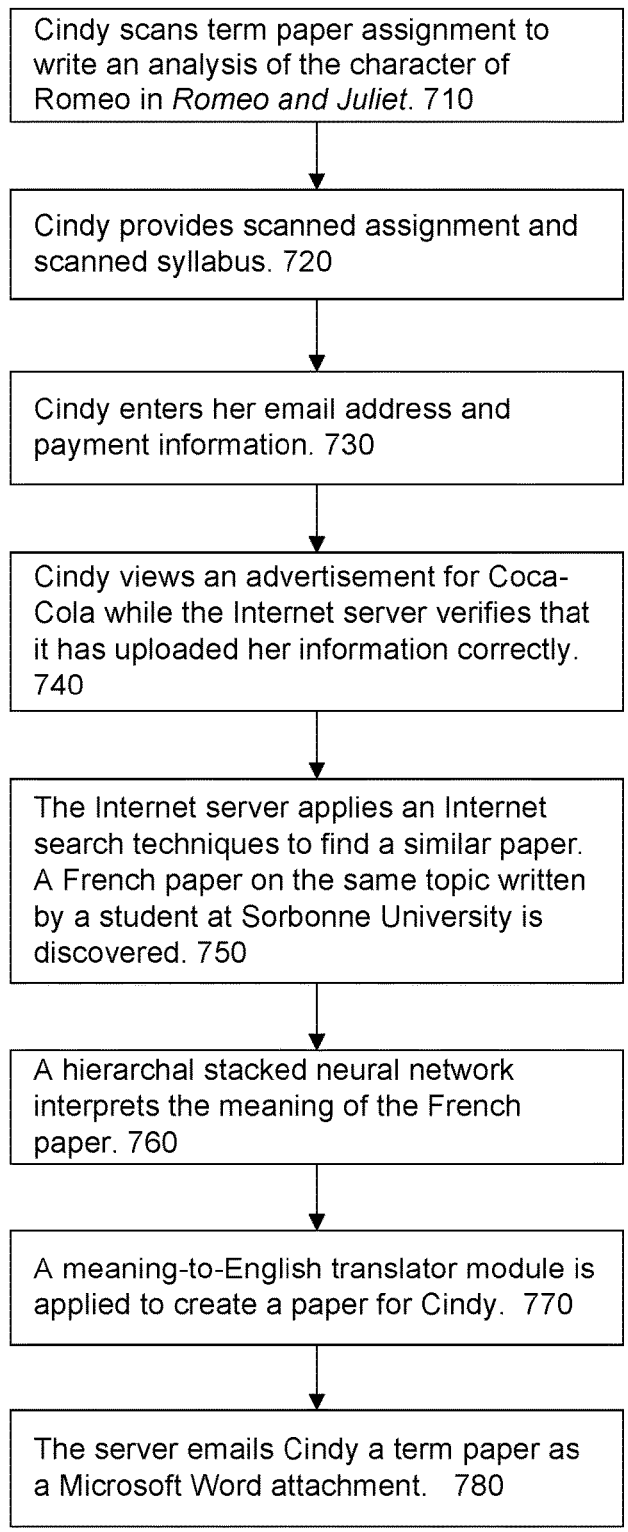
FIG. 7 is a flow chart of a user requesting a report to be automatically provided, in accordance with an embodiment of the invention.

Another embodiment is illustrated in FIG. 7. Cindy uses the service of a website. In step 710, Cindy inputs a term paper assignment, to write an analysis of the character of Romeo in Shakespeare's Romeo and Juliet. This input may be entered as a scanned image, text, voice, or the like. In step 720, Cindy provides the assignment to the website. In step 730, Cindy provides the web site com with her email address and payment information. In one embodiment, the cost of using the system is subsidized by advertisers, and in step 740, Cindy views an advertisement. In step 750, the website employs an Internet search engine or other knowledge base to find a similar paper, which may be used as a positive bias (emulation) or negative bias (intentional differences). In one embodiment, the similar paper concerns the same topic as the assignment. In the illustrated example, the website discovers a French language paper on the topic of Romeo's character written by a student at Sorbonne University in Paris. Internet search techniques are known in the art and are implemented by Google Corporation on www.google.com and by Microsoft Corporation on www.bing.com, as well as by other entities. See, e.g., U.S. Pat. No. 6,321,288, incorporated herein by reference. In step 760, a hierarchical stacked neural network, as described above, is used to interpret the meaning of the French paper. Using a genetic algorithm, or express input by Cindy, at the conceptual level the meaning or thesis of the paper may be changed. In step 770, a meaning-to-English translator module is applied to create a paper for Cindy. In one embodiment, the meaning-to-English module determines original ways to express the ideas in the source paper, so it is not identical to the source (even if the source were in English, as it is according to one embodiment of the invention). In step 780, the website emails Cindy the term paper as a Microsoft Word attachment.

Using this type of system, it is possible to extract a particular skill of the user at a specific cognitive level, while permitting automation at other levels. Thus, if the goal is to judge the student's ability to generate a thesis, the mechanics of writing the paper may be automated based on the provided thesis. If the skill sought to be analyzed is the creation of a paper from an outline, then the process up to creation of the outline may be automated, and the remainder the manual effort of the student. On the other hand, in a technical writing environment, the goal of an analyst may be to a mass and organize a body of information, which is then to be formulated into a technical report. Thus, a technician can be offloaded of the responsibility of data analysis and presentation, while generating a high level, well written report.

A natural language translation neural network is described in detail by Koncar and Guthrie, "A Natural Language Translation Neural Network," Imperial College of Science, Technology, and Medicine, London, U K, 1997 (Hereinafter "Koncar"). The method of Koncar can be slightly modified to yield a meaning-to-English (or meaning to any other spoken or written language) translator that could be used in an automatic essay writer as disclosed herein. Thus, it is clear that not all elements of the invention need be implemented as hierarchical stacked neural networks modeled according to human cognitive levels, and rather use available information sources and/or processing facilities as may be available.

Combining hierarchical stacked neural networks and representation of meaning with a translation system and method, such as that of Koncar or that implemented by Google Translate at translate.google.com, or Bing Translator by Microsoft Corporation, www.microsofttranslator.com, would allow a translation from English (or any other language) to meaning, back to English (or to any other language).The document may be modified, at the meaning or conceptual level, thus permitting the user to impart a specific contribution, or change a premise.

Therefore, in the example illustrated in FIG. 7, if the website was unable to locate a starting paper or template, Cindy provide her own template, perhaps a paper drafted on a different topic. The web site would then create a new paper having a defined meaning, and according to a defined style. In this way, the expressive elements of a factual work may be extracted, leaving only the concepts, which are not protectable by copyright.

Figure 10:
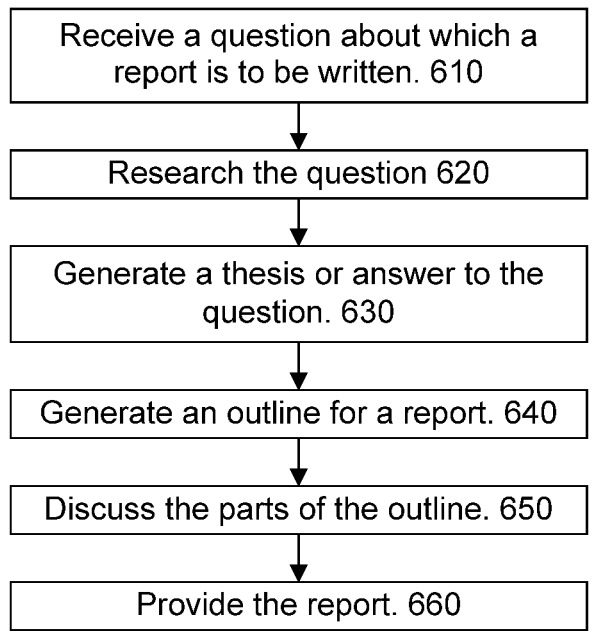
FIG. 10 is a flow chart of a method of automatically providing a written report, in accordance with an embodiment of the invention.

In another embodiment, illustrated in FIG. 10, the process of writing a report in natural language essay form comprises the steps of: (1) receiving a question, (2) researching the question, (3) generating a thesis or answer, (4) generating an outline, (5) discussing the parts of the outline, and (6) providing the report.

Step 610 involves receiving a question about which a report is to be written. There are many ways in which the processor can receive the question. In one embodiment, implemented as a website on the Internet, the user could provide a text or image file containing the question, type the question, or speak the question into a computer. The question could be any topic about which the user wants information. In an exemplary embodiment, the question entered by the user is, "Are golden parachutes effective at reducing perverse incentives?" The next step 620 is researching the question. In one embodiment, the server further comprises a knowledge database which it can search. The knowledge database can be local to or remote from the server. In one embodiment, the Internet is the database to be searched. The Internet can be searched through many commercial search engines, for example, www.google.com or www.bing.com by Microsoft Corporation. Natural language search engines, such as Google and Bing, could receive as input the text of the question and provide as output a plethora of web pages comprising relevant information. For example, a Google search for "Are golden parachutes effective at reducing perverse incentives?" conducted on Jun. 1, 2010, returned about 5,450 results. The results include a Wikipedia article on golden parachutes, and several scholarly articles about golden parachutes and related topics. These would be provided as input to the hierarchical stacked neural network. Text would be provided to the N4 layer (either directly or through lower neural network layers), which converts text to words. However, images and text in files that have not been placed under optical character recognition (OCR) technology would initially be analyzed with the pattern detector in, for example, $N_1$. The information in the articles would be propagated upward in the hierarchical stacked neural network to derive a meaning.

According to a preferred embodiment, a stacked neural network is implemented based on the highest level of cognition required by the problem to be solved or addressed. In this case, the network would have about 12-14 levels, unless intended to present information to non-adults. The meaning is this represented at the highest level of the network. In a pure neural network, the output of the highest level is then used to excite A hierarchical stacked motor neural network which can then produce outputs usable in its context. In this case, while the paper is the desired output, the intervening steps each require various "actions", and thus the information will pass through both ascending and descending hierarchies during use. In a hybrid network architecture, the "meaning" from the top-most level of the neural network is received by a logical processor, which can then organize the various tasks for processing by the cognitive neural networks. The logical processor also can solve issues of temporary storage, interfacing, and other issues which might be complex in a purely neural network implementation. However, it is understood that neural networks can be implemented with registers and the like to facilitate an implementation which does not require human-programmed logic.

In the third step 630, the processor generates a thesis or a brief answer to the question. In some circumstances, all of the literature discovered would point in one direction. For example, if the question is, "Is the Earth round or flat?" the processor, after conducting the research step, would come to the conclusion that the Earth is round and discuss this thesis. However, one embodiment is able to provide a report arguing the contrary thesis (that the Earth is flat). Returning to the extended example regarding golden parachutes, if the scholarly literature is split roughly 50/50 on the topic, the processor may then select one of the two common answers to the question to argue. In an embodiment, the selection could be random, based on a random or pseudorandom number generator. In an exemplary embodiment, to answer the question, "Are golden parachutes effective at reducing perverse incentives?" the thesis is either: (1) "Golden parachutes are effective at reducing perverse incentives," or "Golden parachutes are not effective at reducing perverse incentives."

In the fourth step 640, the processor generates an outline for the essay report. In one embodiment, the outline would summarize common themes among the resources that had been gathered in the information search step. For example, a paper trying to prove that golden parachutes are effective at reducing perverse incentives might begin by providing a high level definition of golden parachutes and the basic arguments as to why they do and do not provide perverse incentives to employees holding them. The next step in the outline would address all of the arguments that golden parachutes are effective and explain the incorrectness of the arguments that golden parachutes are not effective.

In the fifth step 650, the portions of the outline are discussed in detail. In one embodiment, this step is completed by providing a summary of each of the discovered articles that has a meaning which is similar to the part of the outline which is being discussed. Techniques for summarizing documents are known in the art. See, e.g., U.S. Pat. Nos. 6,205,456, 5,978,820, 6,289,304, and 5,867,164, each of which is expressly incorporated herein by reference. It is also noted that LexisNexis.com implements a summarization technique for legal cases, law journal articles, and legal encyclopedia articles for subscribers to the LexisNexis legal research service.

Finally, in step 660, the processor provides the report. There are many ways in which the report could be provided. For example, it could be sent to the user by email or provided on a webpage. Alternatively, a paper version of the report could be sent to a fax machine or a printer that is connected to the Internet or other communication network.

Neural networks can be used to control systems and processes, as well as to gather data. One example of a neural network designed to control a system is provided by Schafer, US App. 2009/0271344, incorporated herein by reference. Schafer's method includes two steps, the learning of the dynamic with historical data based on a recurrent neural network and a subsequent learning of an optimal regulation by coupling the recurrent neural network to a further neural network. The recurrent neural network has a hidden layer comprising a first and a second hidden state at a respective time point. The first hidden state is coupled to the second hidden state using a matrix to be learned. This allows a bottleneck structure to be created, in that the dimension of the first hidden state is smaller than the dimension of the second hidden state or vice versa. The autonomous dynamic is taken into account during the learning of the network, thereby improving the approximation capacity of the network.

This creative neural network embodiment of the invention could be created through genetic algorithms. Genetic algorithms are computation techniques based on evolutionary biology, implementing features such as inheritance, mutation, selection, and crossover, which are designed to solve computing optimization problems. See, generally, Wikipedia: Genetic Algorithm, available at en.wikipedia.org/wiki/Genetic_algorithm.

Sung-Bae Cho discusses a creative system based on genetic algorithms in Cho, "Towards Creative Evolutionary Systems with Interactive Genetic Algorithm," Applied Intelligence 16, 129-138, 2002 (Hereinafter "Cho").

A hierarchical stacked neural network with 14 or more layers implementing an Interactive Genetic Algorithm (IGA) can be trained to write college level papers, and assigned grades by, for example, college writing professors that grade the neural network's output and give it feedback, which is then used to adapt the network.

Several publications have been made with the application of the IGA to the problems that require creative solutions, and they can be classified into three categories: artistic, engineering and edutainment applications. See, Handbook of Evolutionary Computation, Section C2.9 by Banzhaf. We can apply GA for design by initializing the population of individuals encoded from design characteristics, setting and evolving the fitness as 'how good the design is.' However, there may be no standard of 'goodness of design,' and it is therefore difficult to organize the fitness function. IGA provides a possible solution in this case. IGA can reflect personal preference, because it perceives the fitness directly from human instead of computing some function.

Fashion Design

Though the meaning of design has changed by time, the works that designers do has not changed much when they design clothes. They start with a sketch and flesh it out into an illustration. With clippings from magazines, journals and photographs of similar or rival designs from fashion shows, they make these concepts into some sample pieces. These samples are tested for quality, feel and aesthetics very rigorously. Recently, the computer has begun to aid these works.

Captured body models can be transformed to virtual mannequins.

Some design-aid systems have been developed using Evolutionary Computations (EC). Nakanishi developed a fashion design aid system using genetic programming. He encoded a number of different lines from a dress into a "chromosome". The system evolves each dress design according to the user's selection. But most of its productions were somewhat impractical, because encoded individuals did not contain realistic knowledge on the domain of fashion.

Figure 9:
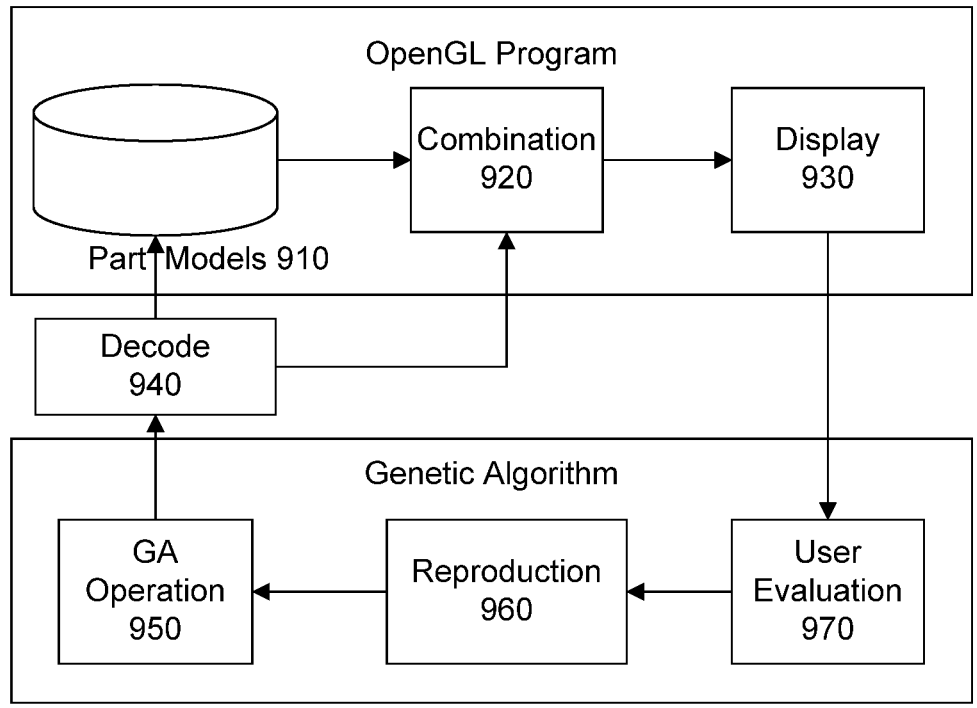
FIG. 9 is a block diagram of a fashion design system using an interactive genetic algorithm (IGA), in accordance with an embodiment of the invention.

FIG. 9, copied from Cho, "Towards Creative Evolutionary Systems with Interactive Genetic Algorithm," Applied Intelligence 16, 129-138, 2002, shows the overview of a proposed fashion design aid system based on the IGA, which can be further modified in accordance with the present invention to employ hierarchical stacked neural networks as a part of the control system. There is a database 910 of partial design elements, which are stored in 3D models. The system selects the models of each part, decodes 940 the models, and combines 920 them into a number of individual designs. The population is displayed on screen 930 and the user provides the fashion design system input 970 a fitness value to each design to train the fashion design system. Thus, the fashion design system is able to "learn" which designs users like most and create similar designs, while keeping away features that users dislike. Then, the system reproduces, in reproduction module 960, the population proportional to the fitness value of each design, and applies crossover and mutation to make the next generation 950. The results are displayed in display 930, again in the screen with 3D graphics. Iteration of these processes can produce the population of higher fitness value, namely better designs.

Previous design aid systems using evolutionary computation may produce impractical or unacceptable designs because they do not consider domain-specific knowledge. To solve this problem, one may encode the detail model based on the knowledge of fashion design.

For example, Cho suggests reclassifying general detail factors into three parts: neck and body, arm and sleeve, skirt and waistline. Next, Cho encodes them with three additional bits for each, which represent the color of each part. A design is made from combining them, and with IGA some combination that produces the design preferred by users can be discovered in the training stage, resulting in more realistic and reasonable designs.

There are various basic strategies which might be used to generate designs. In some cases, the design is created de novo based on a "concept" from a high level of the network, for example based on a random pattern or internal excitation of the system. In other cases, the system is iterative, or design-cue based, and receives an external starting point. For example, a fashion design may be initiated based on a new fabric design, and therefore the fabric design is received as an input. The two strategies may be used together. In addition, the design generation capability may be used to assist or guide a human, or to interact with a human, and therefore need not generate an entire design unaided.

In accordance with one embodiment of the invention, representations of the fashion designs could be analyzed by a hierarchical stacked neural network. The lowest level extracts the visual features, such as color and changes in light intensity, of the design. The higher levels of the neural network would extract the features of the designs and make conclusions relating to them. For example, certain shapes correspond to shoes. The shoes have certain features, such as raised heals, laces, etc. Other shapes correspond to pants, shirts, dresses, etc. The genetic algorithm taught by Cho would come up with features that a computer user can like or dislike, and the neural network would attempt to provide some high-level representation of the user's tastes, and then to create one or more outfits that would be appreciated by the user.

In another embodiment, the processor receives as input from the user a representation of the user's tastes. For example, the user could speak into a microphone, "Please provide a man's white button down shirt and grey pants." The processor would then generate a white button down shirt with grey pants to provide to display to the user, based on a cognitive analysis of the input.

In yet another embodiment, the processor is taught to generate fashion designs which are associated with the features of a particular designer (e.g., Tommy Hilfiger) by being provided as input many designs and being told, by a user or automatic service, which ones are associated with Tommy Hilfiger. Using, for example, a hierarchical stacked neural network, the processor would then "learn" the features of Tommy Hilfiger clothing and provide new clothing incorporating these features as output using a clothing generator module based on the neural network representation. Many Internet databases, such as Google Images, images.google.com, and Bing Images by Microsoft Corporation, www.bing.com/images that can provide diagrams of general clothing as well as of clothing by certain designers, such as Tommy Hilfiger. In another embodiment, another Internet image source or a database local to the processor could be used instead of the Internet. In one embodiment, the step of incorporating features from former designs into new designs is completed in the neural network. The neural network selects a feature, such as a pocket, a button, or a decoration, from a former Tommy Hilfiger design and then copies and pastes the feature into a novel design, with or without modification of the emulated feature(s). For example, the pockets in one pair of jeans could be combined with the buttons in a second pair of jeans to generate a novel third pair of jeans.

Image Retrieval

A neural network-based control system, such as that provided by Schafer, US App. 2009/0271344, may be combined with the hierarchical stacked neural networks described herein, to create a neural network based control system that is useful to pilot a car. The automatic driver of the car (1) selects a travel path, (2) controls the car in accordance with the travel path, and (3) modifies the driving in accordance with perceived threats, road signs, and other visual and audio input.

It should be noted that many driving mistakes or accidents are caused due to the driver of a vehicle that was involved either lacking information, such as failing to see an oncoming vehicle or a traffic control device, or poorly implementing driving rules, such as failing to obey a speed limit sign or running a yellow or red light. The automatic driver is designed, in part, to solve these problems by automatically processing more information than is typically available to a human driver and by automatically implementing all of the driving rules and modifying the driving behavior in response to a perceived threat of an accident.

To select a travel path, the automatic driver would take as input from a user a destination address. The automatic driver would then ascertain the current location through a global positioning system (GPS) mechanism. An exemplary GPS machine is described by Hsu in U.S. Pat. No. 6,392,591, incorporated herein by reference. GPS machines well known in the art and are manufactured and sold by TomTom Corporation, Garmin Corporation, Magellan Corporation, and others.

The travel path could be selected by a mapping algorithm calculating a shortest or approximately shortest path between the starting point and the destination. Techniques for doing so are well known in the art and are implemented on the Internet by Google Maps, Yahoo Maps, and Bing Maps, among others. In one embodiment, the automatic driver could access Google Maps, Yahoo Maps, or a similar service over the Internet or over a cellular network to obtain driving directions.

The car could be steered in accordance with the selected travel path by driving along the path. GPS devices that tell the driver exactly when and in which direction to turn are known in the art and are provided by TomTom Corporation, Garmin Corporation, Magellan Corporation, and others. Therefore, these can be implemented by the automatic driver.

Cameras (or other imaging or sensing devices) could be placed all around the car (or other vehicle) to provide a 360-degree view of the surroundings. This way, more data can be processed than by a human driver, who can only be looking in one direction at a time. To arrange for a 360-degree view from multiple parts of the car, a preferred embodiment of the invention uses several cameras or a single camera with a wide field of view or rapid scan rate. However, only one camera that represents the human driver's view might be necessary for a minimal embodiment.

The images from the camera(s) are provided to a hierarchical stacked neural network which is trained to search the images for information relevant to driving, such as road signs, traffic control devices, other vehicles, and pedestrians. In one embodiment, the neural network is further adapted to develop motion vectors for the other vehicles and pedestrians on the road so that it could predict future movements. For example, if the vehicle is travelling at 55 mph on a highway and is thinking of moving to the left lane, the motion vectors could be used to ascertain that the vehicle is presently being passed and it is necessary to wait until the passing vehicle gets by.

Figure 11:
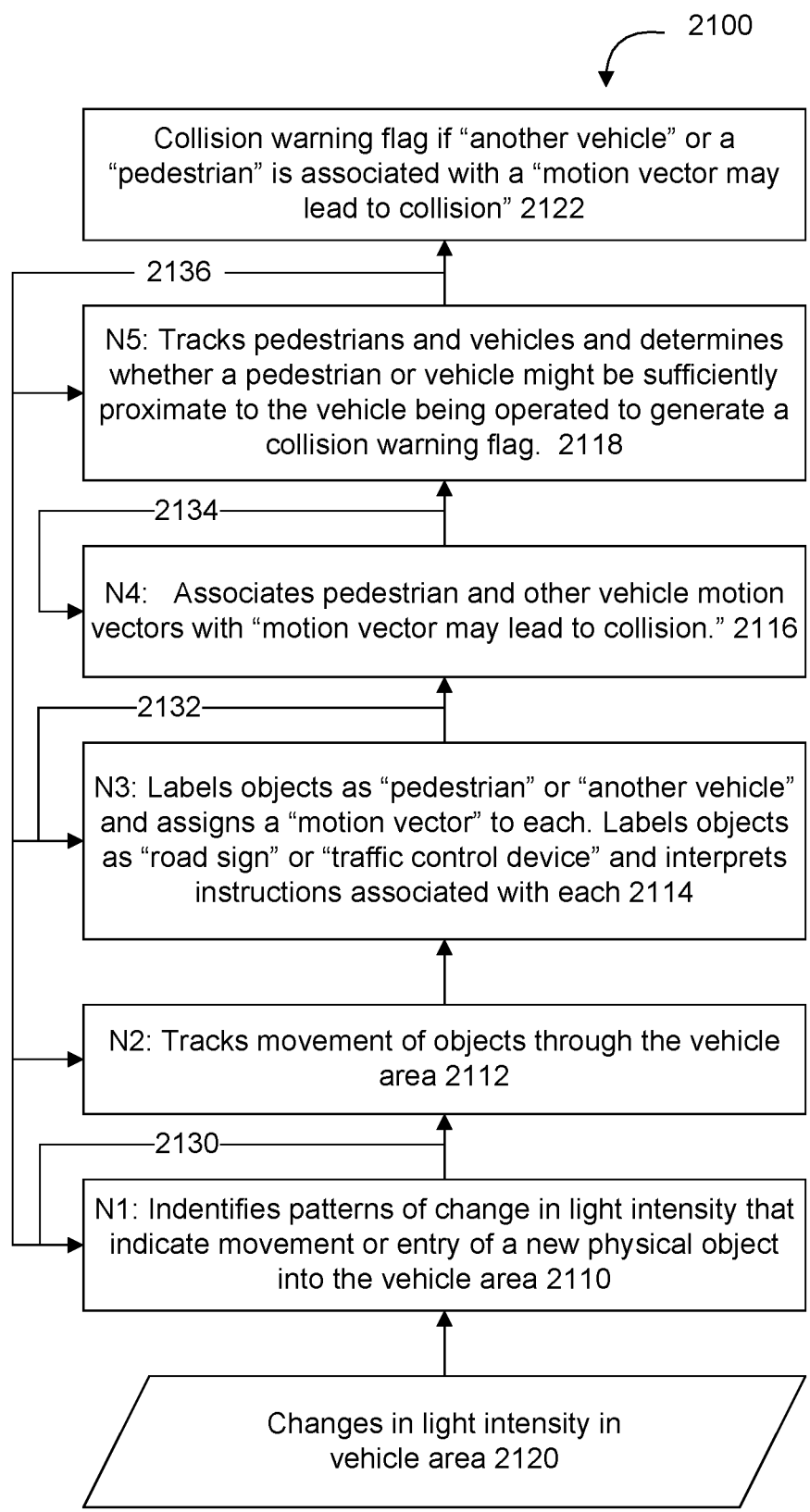
FIG. 11 illustrates a neural network that is adapted to process information related to driving a car, according to an embodiment of the invention.

FIG. 11 illustrates a neural network that is adapted to process information related to driving a car. The input to the neural network comes from the cameras and microphones attached to the car, as illustrated in FIG. 8. The first neural network in the hierarchical stack, neural network 2110 is a feed-forward neural network that performs processing actions at stage/order 1, the Sensory and Motor stage/order, of the model depicted in Table 1. At this stage/order, an intelligent system can detect whether an object is present or not. Using Sensory and Motor tasks, neural network 2110 detects a change in light intensity 2120 that reaches a threshold consistent with the entry or movement of a physical object within spatial areas monitored by the cameras on the car. Neural network 2110 has a hidden layer of neurons that receive inhibitory and excitatory input from the delta values and from a series of "competitive neighbor" neurons in the hidden layer that are within a predetermined range of the neurons receiving delta input. An output response to neural network 2112 is triggered when threshold levels of excitation in contiguous neurons constitute a large enough area of excitation to make it highly probable that a new motion vector has been generated or a new object has entered the scene covered by a camera. Vectors containing the excitation area's centroid, dimensions and coordinates are output to neural network 2112.

Neural network 2110 is trained using input arrays containing excitation patterns. A backward-propagation algorithm 2130 adjusts weights in neural network 2110 based on neural network 2110's successes and failures in detecting physical objects.

Neural network 2112 is an adaptive-resonance (ART) neural network (G. A. Carpenter & S. Grossberg, "Neural dynamics of category learning and recognition: Structural invariants, reinforcement, and evoked potentials", in M. L. Commons, R. J. Hermstein, S. M. Kosslyn, & D. B. Mumford, (Eds.), 9 Computational and clinical approaches to pattern recognition and concept formation. Quantitative analyses of behavior (Hillsdale, N.J., Lawrence Erlbaum Associates, 1990)). Neural network 2112 performs processing actions at stage/order 2, the Circular Sensory-Motor stage/order, in the model described in Table 1. At this stage/order an intelligent system distinguishes objects and tracks them. Using Circular Sensory-Motor stage/order tasks, neural network 2112 maps input excitation patterns from neural network 2110 to clusters. Cluster weights are adjusted each time a new excitation pattern enters neural network 2112 from neural network 2110. A second hidden layer of neurons tracks excitation patterns through the scene and links their movement centroids to the appropriate clusters. Repeated placement of input excitation patterns on the same cluster, when only the centroid coordinates of the patterns differ, triggers an output signal to neural network 2114 when a predetermined threshold rate of continuous placement is obtained. The output signal contains the excitation area's centroid, dimensions, store coordinates, and history of centroid positions at successive time intervals. The training of neural network 2112 is unsupervised. Cluster weights are adjusted each time a new excitation pattern, representing a new physical object is input into neural network 2112 from neural network 2110.

Neural network 2114 is a feed-forward heteroassociative neural network that performs processing actions at stage/order 3, the Sensory-Motor stage/order, of the model described in Table 1. At this stage an intelligent system can recognize objects and place them in classes. Using Sensory-Motor tasks, neural network 2114 analyzes patterns output by neural network 2112 and determines whether a pattern is "a road sign", "a traffic control device", "another vehicle", "a pedestrian", etc. (Other data that is relevant to driving will be apparent to persons skilled in the art.) Patterns identified by neural network 2112 need not be identical to stored patterns to activate an output signal. Stored patterns that identify "a pedestrian" are based on major human features such as a head, a face, arms, and hands. The patterns associated with "another vehicle", "a road sign", and "a traffic control device" use a system of weights that weight some pattern components more heavily than others.

Neural network 2114 is trained by inputting patterns of "a road sign," a "traffic control device," "another vehicle," "a pedestrian," etc. A backward-propagation algorithm 2132 adjusts neural network 2114's weights based on the network's successes and failures in identifying "a road sign," a "traffic control device," "another vehicle," "a pedestrian," etc. When neural network 2114 associates a pattern with "a road sign," a "traffic control device," "another vehicle," "a pedestrian," etc. the network outputs to neural network 2116 the pattern's classification as "a road sign," a "traffic control device," "another vehicle," "a pedestrian," etc., as well as the pattern's centroid, dimensions, store coordinates, and history of centroid positions at successive times.

Neural network 2116 is a feed-forward neural network that performs processing actions at stage/order 4, the Nominal stage/order, of the model described in Table 1. At the Nominal stage/order, an intelligent system can identify simple relationships between concepts and label them. Neural network 2116 has one hidden layer. The neurons in this layer receive excitatory and inhibitory input based on the centroids, dimensions, coordinates, and history of centroid positions at successive one-second time points of objects and persons that was received from neural network 2114. The neurons also receive input from other neurons within the hidden layer. The determination that "another vehicle" has a "motion vector that may lead to a collision" is signaled by excitatory input from neurons, within the hidden layer, activated by patterns for "motion vector that may lead to a collision" and that share contiguous and overlapping store coordinates with "another vehicle." When "another vehicle" has become associated with "motion vector that may lead to a collision," an output signal is triggered. Neural network 2116 then outputs to neural network 2118 an array pattern for the "motion vector that may lead to a collision" and the history of store coordinates of the "another vehicle" array at successive times. The array pattern uniquely identifies the "another vehicle" and the "motion vector that may lead to a collision" as being associated with the "another vehicle." This information can now be fed to a rule-based system that can calculate an appropriate response to avoid the collision. Persons skilled in the art will note that this rule-based system will need to take the motion vectors of the other vehicles and pedestrians, as well as the present road signs and traffic control devices, into account.

Neural network 2116 network is trained using patterns of interaction between pedestrians and vehicles. A backward-propagation algorithm 2134 adjusts weights each time neural network 2116 successfully matches "another vehicle" or "a pedestrian" and "motion vector that may lead to collision."

Neural network 2118 is an adaptive-resonance (ART) neural network that performs processing actions at stage/order 5, the Sentential stage/order, of the model described in Table 1. At this stage/order, classes and patterns are ordered. Using Sentential stage/order tasks, neural network 2118 tracks "a vehicle" having "a motion vector that may lead to a collision" and issues an emergency alert to the vehicle control logic so that it might respond appropriately. Neural network 2118 has two hidden inner layers. The vehicle/motion vector array pattern input from neural network 2116 is mapped to a specific cluster in the first hidden layer and the weights associated with the cluster are set for that vehicle/motion vector array pattern. Each time this array pattern enters from neural network 2116, it maps to this cluster. The cluster is reset when it no longer matches incoming patterns. Each time that the cluster is activated, it sends excitatory signals containing the coordinates and time points associated with the person/object array to the second hidden layer. The areas of excitation in this layer track the other vehicle's movement in relation to the vehicle being operated. An alert 2122 to the vehicle control logic is generated when the pattern of neuron excitation indicates that the "another vehicle" having a "motion vector that may lead to a collision" is sufficiently close to the vehicle being operated or is approaching the vehicle being operated at a high speed.

Neural network 2118 is trained using patterns of movement that a vehicle would follow while it is driving. In one embodiment, a driving simulation video game or computer model is used to train the neural network. In another embodiment, in the training stage, the neural network is placed in a car with an experienced driving instructor, who provides feedback to the neural network in order to train it. In this embodiment, there is little chance that the neural network will cause an accident because the driving instructor has access to an emergency brake and can take control of the car away from the neural network, or override any of the neural network's decisions, if necessary. A backward-propagation algorithm 2136 adjusts weights in each of the neural networks 2110, 2112, 2114, 2116, and 2118 based on the hierarchical stacked neural network's success in detecting and responding to information relevant to driving.

These neural networks generate the information that is necessary to safely operate the vehicle. The next step is processing this information in order to actually drive the car (or other vehicle). While a neural network may be used to operate the car, a rule based system is preferred. The rules will have a hierarchy. In other words, some rules can be broken more easily than other rules. For example, while, as a general rule, the vehicle should not run red lights, running a red light might be acceptable if it is necessary to allow an emergency vehicle to pass and there is no oncoming traffic that might cause a collision.

Figure 12:
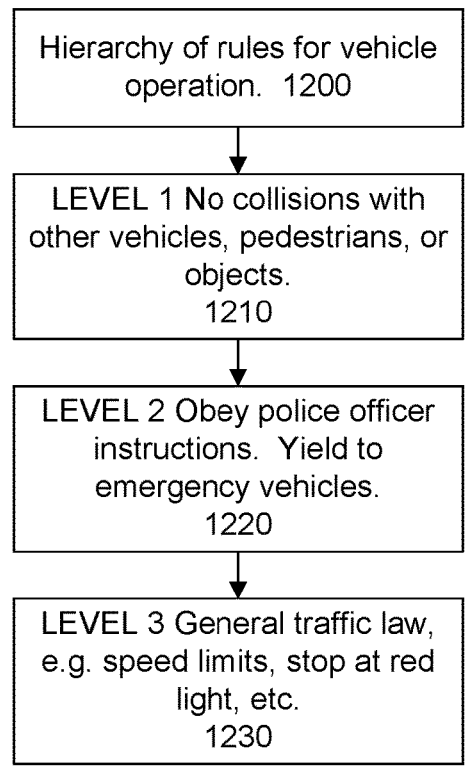
FIG. 12 illustrates an exemplary hierarchy of rules for vehicle operation, according to one embodiment of the invention.

FIG. 12 illustrates an exemplary hierarchy of rules for vehicle operation 1200. 1210 Level 1 says that collision avoidance rules are at the top of the hierarchy of rules never to be broken. In other words, the vehicle is never to intentionally hit a pedestrian or another vehicle, and is to do everything possible to avoid such hitting. The next 1220 Level 2 of the hierarchy concerns rules regarding interactions with police officers and emergency vehicles. When a police officer is present in the scene, the vehicle must obey the instructions of the police officer, even if these instructions are contrary to a general traffic law. For example, if a police officer is waving for the vehicle to proceed through a red light, the vehicle should proceed through the red light. The lowest level, 1230 level 3, includes general traffic laws, such as speed limits and stopping at red lights, which should be followed when there are no emergency vehicles present and no instructions to the contrary.

A more detailed hierarchy than the one presented in FIG. 12 can be written by consulting the traffic law in the location where the vehicle is to be operated. For example, if the vehicle is primarily operated in New York State, the New York Vehicle and Traffic Law may be consulted to provide a more detailed hierarchy of vehicle operation rules. Indeed, the system may be trained or have available all relevant jurisdiction laws, rules and policies, which can be selectively applied based on location. In one embodiment, the global positioning system unit in the car will tell the automatic driver where the car is located and instruct it to implement the correct vehicle and traffic law. For example, if a vehicle crosses the state line from New York State into Massachusetts, the automatic driver would automatically switch from implementing the New York Vehicle and Traffic Law to implementing the Massachusetts General Laws § 90 Motor Vehicles and Aircraft.

In one embodiment, the driving rules are stored locally to the automatic car pilot. In another embodiment, the driving rules are stored on a remote server and are accessible to the vehicle over an Internet or cellular connection. Preferably, the set of rules that is presently being implemented is stored locally to the server. For example, if the vehicle is in New York State, the New York Vehicle and Traffic Law is stored on the server. This embodiment is beneficial if there are occasional breaks in the Internet connection, as the automatic driver still has access to the traffic rules and can operate the vehicle.

In one embodiment, the rules may be adjustable by the driver or owner of the automatic vehicle. For example, the driver may adjust the "no speeding" rule to allow for the vehicle to travel up to 5 mph above the speed limit. In another embodiment, the driver will "co-pilot" the automatic vehicle and be able to override any of the actions of the automatic vehicle.

In another embodiment, the auto-pilot may further comprise a mechanism for accessing the Internet or another database to discover mechanisms for controlling and operating the car. This Internet or database access is useful in multiple different situations. For example, in an emergency situation, since the autopilot has control over steering, braking, throttle, transmission and suspension, a simple stopping of the vehicle is not the only available option, and therefore that the collision avoidance maneuver may include any available movement, such as a slide, or other "trick" maneuver more commonly associated with skilled stunt drivers.

Figure 14:
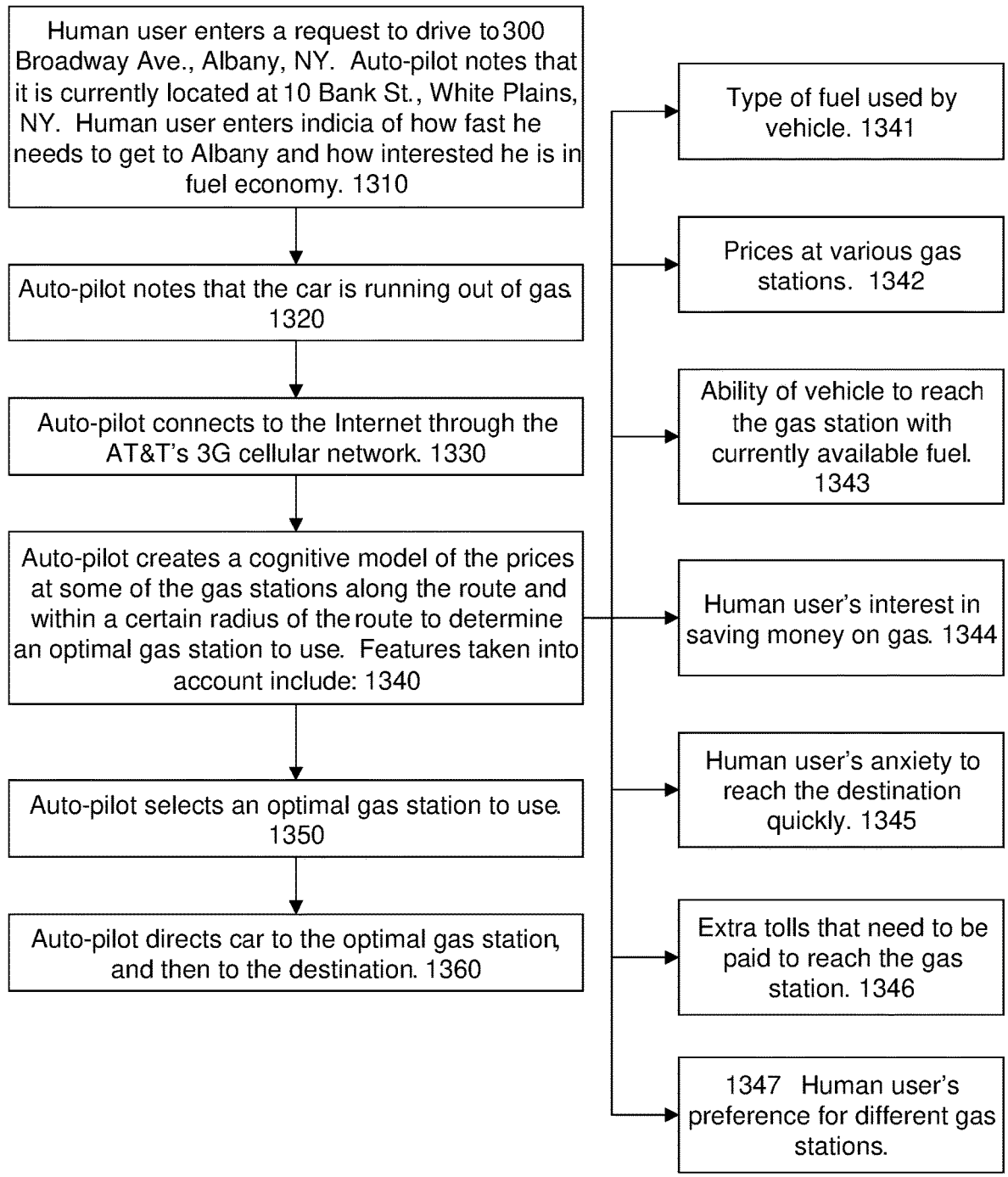
FIG. 14 illustrates an embodiment of the invention where an auto-pilot selects an optimal gas station to use along a route.

FIG. 14 illustrates an embodiment of the invention where an auto-pilot selects an optimal gas station to use along a route.

In step 1310, the human user enters a request to drive to a destination address, such as 300 Broadway Ave., Albany, NY. The auto-pilot notes that it is currently located at a starting location, such as 10 Bank St., White Plains, NY. The auto-pilot can determine its present location through many different methods. For example, global positioning system (GPS) satellite or cellular tower based triangulation techniques could be used. Such methods are implemented by TomTom Corporation in GPS devices and by Apple Corporation in iPhone Apps such as Google Maps and others.

In step 1320, the auto-pilot notes that the car is running out of gasoline. There are many ways of making this determination. For example, the auto-pilot could note that the car has less than a quarter of a tank of gas, less than a certain volume of gas, or not enough gas to reach the destination, based on the average miles per gallon (MPG) rating of the vehicle or the manufacturer's expected city and highway MPG ratings. It is noted that many modern vehicles, such some models of the Chevrolet HHR 2010, track their own instantaneous MPG rating, lifetime average MPG rating, and average MPG rating during a given trip (where the start and end of the trip is provided by the driver).

In step 1330, the auto-pilot connects to the Internet through AT&T's 3G cellular network. Of course, other methods of connecting to the Internet, such as Verizon's cellular network, public WiFi networks, or satellite-based Internet connections can also be used.

In step 1340, the auto-pilot creates a cognitive model of the prices at some of the gas stations along the route and within a certain radius of the route to determine an optimal gas station to use to refuel the vehicle. This cognitive model can take many different features into a account. For example, the type of fuel used 1341—regular, premium, or diesel—is an important variable. The price of the fuel at various gas stations 1342 is also taken into account. Internet databases of gas prices are available or can be developed. An exemplary internet gas price database is provided at autos.msn.com/everyday/GasStationsBeta.aspx (last visited Jun. 9, 2011), which allows one to search for gas prices by city and state or zip code. Other considerations include: the ability of the vehicle to reach the gas station on available fuel 1343, a human user's interest in saving money on gas 1344, a human user's anxiety to reach the destination quickly 1345, extra tolls that need to be paid to reach the gas station 1346 (if the gas station requires a detour off a toll road), and the human user's preference for different gas stations 1347 (e.g. some human users prefer ExxonMobil gas to Gulf Gas). In one embodiment, the auto-pilot may recommend that the human user not fill the gas tank all the way. For example, if the vehicle is nearly out of gas and a price sensitive human user who is not anxious to reach his destination is involved, the auto-pilot may recommend that the human user purchase a few gallons of gas at an expensive gas station that is nearby, and then drive to a cheaper gas station a few miles off the route to fill the gas tank.

In step 1350, the auto-pilot selects an optimal gas station to use on the basis of the cognitive model developed in step 1340.

In step 1360, the auto-pilot directs the car to the optimal gas station, and then to the destination.

It is noted that this system and method may be subsidized to the consumer by advertising. For example, a gas station company, such as Shell, could provide compensation in exchange for notifying users of Shell gas stations along the route and offering to navigate the vehicle to the Shell gas station. In another embodiment, Shell could be the default gas station to which the vehicle auto-pilot drivers whenever the vehicle needs gas. The human user is able to modify or override this setting.

In other embodiments of the invention, the system and method for the gas station optimizer could be modified to select an optimal speed to travel, optimal locations for rest stops during a road trip, a system and method for avoiding potholes, etc. In one embodiment, each of these involves creating a cognitive model of the unique needs of a user.

Neural Network Router Controller

According to one embodiment, the inventive hierarchical stacked neural network can be used to control a WiFi or cellular router. These routers typically use orthogonal frequency-division multiplexing (OFDM) technology for high data rate wireless transmissions. OFDM is well-known in the art and is described, for example, in U.S. Pat. Nos. 5,694,389, and 5,732,113, each of which is expressly incorporated herein by reference.

OFDM (orthogonal frequency division multiplexing) brings many benefits to wireless networking, and will be a part of the next-generation (4G) of mobile wireless systems. The technology however imposes a challenge due to the increased complexity of channel equalization. Wireless channels are multipath fading channels, causing deformation in the signal. To remove the effect (imposed by channel) from received signal, the receiver needs to have knowledge of CIR (Channel impulse response) that is usually provided by a separate channel estimator. One of the many goals of this invention the use of the inventive hierarchical stacked neural networks disclosed herein as a tool for MIMO-OFDM channel estimation and compensation.

OFDM-based routers often need to make decisions based on a large amount of input data. For example, in channel coding or forward error correction technology, some of the other bits in a transmission may need to be considered. Under the Shannon Noisy Channel Theorem, if there exists a noisy channel with capacity C and data transmitted at rate R, where R<C, there exist codes that allow the probability of error at the receiver to be arbitrarily small. These error correction codes have traditionally been implemented through statistical methods. However, a problem with the statistical methods is that they often fail to take into account all of the nuances of the large data sets which they are provided, and assume a system which is consistent with the statistical methods employed.

The hierarchical stacked neural networks are useful for error correction. The lowest level neural network would detect the signals being provided and immediately filter the pure noise. Similar to the manner in which the written character filter distinguishes between letters that look like they could represent two or more different letters at the next highest layer, the error correction neural network provides data that is capable of having multiple interpretations to the next highest level to derive the best interpretation.

Benediktsson, "Neural Network Approaches Versus Statistical Methods in Classification of Multisource Remote Sensing Data," IEEE Transactions on Geoscience and Remote Sensing, Vol. 28, No. 4, July 1990, compares statistical methods and neural network methods in error correction. An advantage of neural networks, over statistical error detectors and correctors, is that neural networks are distribution-free and no prior knowledge is needed about the statistical distributions of classes in the data sources in order to apply neural network classification methods. Neural networks can also adjust the weight given to each data source in the classification. In one embodiment, input from various data sources is processed independently, and each input is characterized by an appropriate model in the neural network. In another embodiment, a layer of the neural network is responsible for selecting a model to use to classify the data.

Hassoun discusses neural network technology data compression and error correction technologies, which are useful in wireless networking. Mohamed Hassoun, Fundamentals of Artificial Neural Networks (MIT Press, 1995) (Hereinafter Hassoun). Data compression techniques exploit the redundancy that naturally exists in most data for efficient storage and/or transmission purposes. Here, a data set is encoded with a much smaller number of bits than the total number of bits required to describe it exactly (i.e., lossy compression). After retrieval or at the receiver end of a transmission link, the encoded or "compressed" data may then be decoded into an approximation of the original data. The compression of images can be posed as an optimization problem where, ideally, the encoding and decoding is done in a way that optimizes the quality of the decoded data.

In a neural network image processor having an input forced to be reproduced through a narrow hidden layer (bottleneck), back propagation attempts to extract significant features from the input vectors. Here, the hidden layer, which is also known as the representation layer, is expected to evolve an internal low-dimensional distributed representation of the training data. Empirical analysis of the trained compression network shows that the hidden unit activities span the principal component subspace of the image vector (s), with some noise on the first principal component due to the nonlinear nature of the hidden unit activations.

The addition of one or more encoding hidden layers with nonlinear units between the inputs and the representation layer, and one or more decoding layers between the representation layer and the output layer provides a network which is capable of learning nonlinear representations. Such networks can perform the nonlinear analog to principal component analysis, and extract "principal manifolds." These principal manifolds can, in some cases, serve as low-dimensional representations of the data which are more useful than principal components. A three hidden layer auto-associative net can, theoretically, compute any continuous mapping from the inputs to the second hidden layer (representation layer), and another mapping from the second hidden layer to the output layer. Thus, a three hidden layer auto-associative net (with a linear or nonlinear representation layer) may, in principle, be considered as a universal nonlinear PCA net.

Another way of interpreting the above auto-associative feed forward network is from the point of view of feature extraction. Here, the outputs from the representation layer are taken as low-dimensional feature vectors associated with complete images or data sets (or any other high-dimensional raw data vectors) presented at the input layer. Whereas, the decoder (reconstruction) subnet is only needed during the training phase and is eliminated during retrieval. The output from the representation layer can now be used as an information-rich, low-dimensional feature vector which is easy to process/classify. Reducing dimensionality of data with minimal information loss is also important from the point of view of computational efficiency. Here, the high-dimensional input data can be transformed into "good" representations in a lower dimensional space for further processing. Since many algorithms are exponential in the dimensionality of the input, a reduction by even a single dimension may provide significant computational savings.

Similar techniques to those presented by Hassoun can be used in error correction neural networks applied to WiFi and cellular receivers running OFDM. The neural network can be implemented directly on an embedded processor within the receiver. Alternatively, these neural networks can be implemented in machine instructions stored on a computer readable medium external to the receiver that communicates with it. For example, if the receiver has a universal serial bus (USB) port, the instruction can be stored on a USB memory drive that is connected to the receiver to improve its operation. The receiver may be part of a router, and the USB port may be part of the router. In yet another embodiment, a router communicates with the computer readable medium containing these instructions over a wireless means, such as WiFi or Bluetooth.

Hardware Overview

FIG. 4 (see, Chan, U.S. Pat. No. 7,702,660, expressly incorporated herein by reference) shows a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The computer system 400 may be used to implement the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Tangible media are provided to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, paper tape, any other physical medium with readable physical patterns, a RAM, a PROM, and EPROM, a FLASH-EPROM, any other memory chip or cartridge, quantum physics effect processing elements, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented, such as WiFi (a/b/g/n), DSRC, GSM, CDMA, 2G, 3G, 4G, LTE, etc.

In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

TABLE 1

A sequence of behaviors placed into different orders of hierarchical complexity

| Order/Stage | Name of Order of Hierarchical Complexity | Example |
| --- | --- | --- |
| 0 | Calculatory | Simple Machine Arithmetic on 0's and 1's |
| 1 | Sensory & Motor | Seeing circles, squares, etc. or touching them. |
| 2 | Circular Sensory-motor | Reaching and grasping a circle or square.<br>* * * * *<br>▢ ▢ ▢ ▢ ▢<br># # # # #<br># / " } Q |
| 3 | Sensory-motor | A class of filled in squares may be made |
| 4 | Nominal | That class may be named, "Squares" |
| 5 | Sentential | The numbers, 1, 2, 3, 4, 5 may be said in order |
| 6 | Pre-operational | The objects in row 5 may be counted. The last count called 5, five, cinco, etc. |
| 7 | Primary | There are behaviors that act on such classes that we call simple arithmetic operations:<br>$1 + 3 = 4; 5 + 15 = 20; 5(4) = 20; 5(3) = 15; 5(1) = 5$ |
| 8 | Concrete | There are behaviors that order the simple arithmetic behaviors when multiplying a sum by a number. Such distributive behaviors require the simple arithmetic behavior as a prerequisite, not just a precursor: $5(1 + 3) = 5(1) + 5(3) = 5 + 15 = 20$ |
| 9 | Abstract | All the forms of five in the five rows in the example are equivalent in value, $x = 5$. Forming class based on abstract feature |
| 10 | Formal | The general left hand distributive relation is<br>$x \times (y + z) = (x \times y) + (x \times z)$ |
| 11 | Systematic | The right hand distribution law is not true for numbers but is true for proportions and sets.<br>$x + (y \times z) = (x \times y) + (x \times z)$<br>$x \cup (y \cap z) = (x \cap y) \cup (x \cap z)$ |
| 12 | Meta-systematic | The system of propositional logic and elementary set theory are isomorphic<br>$x \;\&\; (y \text{ or } z) = (x \;\&\; y) \text{ or } (x \;\&\; z)$ Logic<br>$\leftrightarrow x \cap (y \cup z) = (x \cap y) \cup (x \cap z)$ Sets<br>$T(\text{False}) \leftrightarrow \varphi$ Empty set<br>$T(\text{True}) \leftrightarrow \Omega$ Universal set |

TABLE 1-continued

A sequence of behaviors placed into different orders of hierarchical complexity

| Order/ Stage | Name of Order of Hierarchical Complexity | Example |
| --- | --- | --- |
| 13 | Paradigmatic | Distributive Systems are part of the Mathematical Paradigm. Mathematics integrates algebra, set theory, elementary probability theory, analysis, and based upon such an integration generates measure theory, and the mathematics used in physics. |
| 14 | Cross-paradigmatic | Mathematics and Physics are integrated in the Mathematical Physics of Quantum Mechanics (Einstein, 1950; Planck, 1922; Bohr, 1934) including the Standard Theory of Particles (Gell-Mann, 1964, Weinberg, 1983, Salam, 1972) Special and General Relativity Theory (Einstein, 1950) |

TABLE 2

General Description of Sequence

| MHC | Kohlberg | Discriminations | Verbal relationships | Vocalizations and Words | Examples | Receptive Speech Examples |
| --- | --- | --- | --- | --- | --- | --- |
| 0 | −1 | Calculatory | None | Exact-no generalization | None | None |
| 1 | 0 | sensory & motor actions | Babbling (Universal) | Rote, Generalized | None | None |
| 2 | 0 | circular sensory-motor actions | Phonemes | Open-Ended Classes | | Gestures, "aa" Follows one act directions |
| 3 | 0/1 | sensory-motor | Morphemes | Concepts | Phoneme action relationships | Holding cup out and saying "wa" Follows simple commands |
| 4 | — | Nominal | Single words: ejaculatives & exclamations, verbs, nouns, number names, letter names | Relations among concepts | Relating concepts to others through a word | Says "water" Follows simple chain of commands. |
| 5 | 1 | Sentential | Pronouns: my, mine, I; yours, you; we, ours; they, them | Imitates and acquires sequences. Follows short sequential acts | Incomplete sentences; then complete sentences, crude dichotomies, ordered numbers & letters | States a rule "Don't touch" Follows instructions: "Turn off VCR when tape is over" |
| 6 | 1/2 | preoperational | Connectives: as, when, then, why, before | Simple deduction but contradiction is not excluded. Follows lists of sequential acts | Multiple sentence stories with logically order sequenced events. Counting materials laid out in a line | Says "The water is filling the bathtub" |
| 7 | 2 | Primary | Times, places, acts, actors | Simple logical deduction empirical rules involving time sequence. Simple arithmetic | Stories with logically order sequenced events connected solidly to reality with some specified times, places, acts, actors. Either perspective of self or other. | The water is filling the bathtub so I can take a bath Can follow directions without being supervised for an extended period of time. |
| 8 | 2/3 | Concrete | Interactions, social events, what happened among others | Full arithmetic | Stories with some specified times, places, acts, actors, and the relationship of the above. Things, incidents, events, actors, actions, places in the context of the interaction between self and other. | If I turn on the faucet, the water will run out and fill the bathtub. My parents like it when I fill the tub myself. They are more willing to buy me clothes when I am always clean. |
| 9 | 3 | Abstract | Variable time, place, act, actor, state, type; Quantifies (all, none, some) play an important role in the preadolescent's formulation of categorical assertions (e.g., "All teachers do that!"). | Discriminates variables such as Stereotypes; Logical Quantification; (all, none, some) | Variable time, places, acts, actors, state, type Variables such as Stereotypes, Logical Quantification Words: all, none, some, never, sometimes, always, no one, somebody, everyone. Propositions with variables | The water can run out quickly or slowly and the temperature may get colder after awhile. All teachers do that! |
| 10 | 3/4 | Formal | Words: linear, logical, one dimensional, if . . . then, thus, therefore, because. | Argue using empirical or logical evidence. Logic is linear, 1 dimensional. | Variables connected by "if . . . then" and other relations; Empirical, or logical evidence and argument. Relations among Variables Single variables on input side. Empirical, or logical evidence and argument. | Turning of a faucet changes the size of the opening of the passage way and thereby controlling the amount of flow. |

TABLE 2-continued

General Description of Sequence

| MHC | Kohlberg | Discriminations | Verbal relationships | Vocalizations and Words | Examples | Receptive Speech Examples |
|---|---|---|---|---|---|---|
| 11 | 4 | Systematic | Systems words appear in adult's utterances: legal system, society, our company, the economy, the country. | Constructs multivariate systems and matrices, coordinating more than one variable. Events and ideas situated in a larger context. | Systems of relations. Relations among relationship among variables | Can follow directions without being supervised for an extended period of time. |
| 12 | 5 | metasystematic | Metalogical, meta-analytic words appear. Properties of systems can be considered: homomorphic, isomorphic, incomplete, inconsistent system, consistent system, incomplete system, complete system, incommensurable system, orders of complexity of the system, commensurable systems, etc. | Integrate systems to construct multisystems. Compare systems and perspectives in a systematic way (across multiple domains). Reflects on systems. | Supersystems of systems | The systems that describe non-turbulent water flow and electric flow (amperes) are isomorphic. Flow equals pressure (volts) x resistence (ohms) |
| 13 | 6 | paradigmatic | Newly created paradigmatic words are used whether metasystems may be integrated. There are a few adults who can discriminate how to fit metasystems together to form new paradigms | Discriminate how to fit metasystems together to form new paradigms | | There are many metasystems that belong to non-relativistic and non statistical mechanics |
| 14 | 7 | cross-paradigmatic | Newly created word about integration of paradigms. Historically there a few people who have discriminated how to form new fields by crossing paradigms. | Discriminate how to form new fields by crossing paradigms. | | By crossing mathematics and physical experimentation, classical mechanics arises. |

The invention claimed is:

1. An artificial neural network system, comprising:
an input port configured to receive input data;
a first neural network, comprising at least one automated processor and a memory configured to store coefficients defining a first input layer, at least one first hidden layer, and a first output layer of the first neural network, trained with training data to produce the stored coefficients connecting the first input layer to the at least one first hidden layer, and connecting the at least one first hidden layer to the first output layer, to produce:
a first nonarbitrary organization of actions at the first output layer having an organization selectively dependent on the training of the first neural network with the training data, and being responsive to a first subset of information present in the input data and unresponsive to a residual second subset of information present in the input data, selectively dependent on a feedback signal, and
a first arbitrary action not being organized selectively dependent on the training data, comprising a first noise vector output with respect to the first nonarbitrary organization of actions and which comprises the residual second subset of information present in the input data;
a second neural network, comprising the least one automated processor and a memory configured to store data defining a second input layer, at least one second hidden layer, and a second output layer of the second neural network, trained to produce a second nonarbitrary organization of actions and the feedback signal, selectively dependent the first nonarbitrary organization of actions.

2. The artificial neural network system according to claim 1, further comprising a third noise vector output of the first neural network comprising information from the input data present at the first input layer which is incompletely represented in the non-arbitrary organization of actions.

3. The artificial neural network system according to claim 2, further comprising a pattern recognizer configured to process the third noise vector output of the first neural network.

4. The artificial neural network system according to claim 1, wherein the first input layer is configured to receive at least image information, and to recognize objects represented in the at least image information.

5. The artificial neural network system according to claim 1, wherein the artificial neural network system is configured to;
perform autonomous driving tasks, and first input layer is configured to receive at least image information, and recognize at least road signs, traffic control devices, other vehicles, and pedestrians represented in the at least image information.

6. The artificial neural network system according to claim 1, wherein the artificial neural network system is configured to determine motion vectors of objects represented within the input data.

7. The artificial neural network system according to claim 6, wherein the artificial neural network system is configured to determine a likely collision of the objects based on the determined motion vectors.

8. The artificial neural network system according to claim 7, wherein the artificial neural network system is configured to generate a signal to initiate an action to avoid the likely collision of the objects.

9. The artificial neural network system according to claim 8, further comprising a rule-based system configured to determine an appropriate response to avoid the likely collision of the objects, based on the generated signal.

10. The artificial neural network system according to claim 9, wherein the rule-based system comprises a plurality of hierarchically organized rules, wherein at least one hierarchically superior rule supersedes at least one hierarchically inferior rule.

11. The artificial neural network system according to claim 10, wherein hierarchically organized rules are automatically responsive to a perceived threat of an accident.

12. The artificial neural network system according to claim 1, wherein the neural network system produces an output for an automatic car pilot for a vehicle and the first neural network and the second neural network comprise weights that are stored locally with respect to the vehicle.

13. The artificial neural network system according to claim 1, wherein the neural network system produces an output for an automatic car pilot for a vehicle, configured to implement jurisdiction dependent rules dependent on a location of the vehicle.

14. The artificial neural network system according to claim 1, wherein the neural network system is configured to control at least steering, braking, and acceleration of a vehicle.

15. The artificial neural network system according to claim 1, wherein the input data of the neural network system comprises location information from a global positioning system receiver.

16. The artificial neural network system according to claim 15, wherein the neural network system is configured to determine an efficiency and an available range of a vehicle.

17. The artificial neural network system according to claim 15, wherein the neural network system is configured to perform vehicle route optimization.

18. The artificial neural network system according to claim 15, wherein the neural network system is configured to navigate a vehicle to avoid potholes.

19. An artificial neural network method, comprising:
receiving environmental sensor data through an input port;
providing a first neural network, comprising a first input layer, a first hidden layer, and a first output layer, trained with training data to produce a first nonarbitrary organization of actions at the first output layer selectively dependent on environmental sensor data and a feedback signal received at the first input layer;
providing a second neural network, comprising a second input layer, a second hidden layer, and a second output layer, trained to produce a second nonarbitrary organization of actions and the feedback signal at the second output layer selectively dependent the first nonarbitrary organization of actions received at the second input layer;
generating the first nonarbitrary organization of actions dependent on the environmental sensor data and the feedback;
generating the second nonarbitrary organization of actions and the feedback dependent on the first nonarbitrary organization of actions; and
generating a noise vector from at least one of the first neural network and the second neural network comprising a processed arbitrary organization of actions dependent on information from the input layer of the respective neural network which is incompletely represented in the non-arbitrary organization of actions of the respective neural network.

20. An artificial neural network, comprising:
an input port configured to receive real time environmental sensor data;
a stacked neural network, comprising a plurality of hierarchically organized neural networks, each respective neural network comprising an input layer, at least one hidden layer, and an output layer, each respective neural network being trained to produce a nonarbitrary organization of actions organized dependent on the training, which is passed to a hierarchically superior neural network and at least one respective neural network having a feedback signal that passed to a hierarchically inferior neural network; and
at least one respective neural network producing, in addition to the nonarbitrary organization of actions organized dependent on the training, an arbitrary organization of actions organized independent of the training, comprising a noise vector comprising processed information from the input layer of the respective neural network which is incompletely represented in the non-arbitrary organization of actions of the respective neural network.

* * * * *